(12) United States Patent
Bell et al.

(10) Patent No.: US 12,516,853 B2
(45) Date of Patent: Jan. 6, 2026

(54) CONTAINERS FOR TRANSPORT AND STORAGE OF TEMPERATURE SENSITIVE CONTENTS USING SOLID STATE HEAT PUMPS

(71) Applicant: DTP Thermoelectrics LLC, Pasadena, CA (US)

(72) Inventors: Lon Bell, Altadena, CA (US); Douglas Crane, El Cerrito, CA (US)

(73) Assignee: DTP Thermoelectrics LLC, Pasadena, CA (US)

( * ) Notice: Subject to any disclaimer, the term of this patent is extended or adjusted under 35 U.S.C. 154(b) by 0 days.

(21) Appl. No.: 18/253,127

(22) PCT Filed: Nov. 16, 2021

(86) PCT No.: PCT/US2021/059583
§ 371 (c)(1),
(2) Date: May 16, 2023

(87) PCT Pub. No.: WO2022/108952
PCT Pub. Date: May 27, 2022

(65) Prior Publication Data
US 2024/0003598 A1 Jan. 4, 2024

Related U.S. Application Data

(60) Provisional application No. 63/115,277, filed on Nov. 18, 2020.

(51) Int. Cl.
*F25B 21/02* (2006.01)
(52) U.S. Cl.
CPC ...... *F25B 21/02* (2013.01); *F25B 2321/0212* (2013.01); *F25B 2321/023* (2013.01); *F25B 2321/025* (2013.01)

(58) Field of Classification Search
CPC .............. F25B 21/02; F25B 2321/0212; F25B 2321/023; F25B 2321/025; B65D 81/3816
See application file for complete search history.

(56) References Cited

U.S. PATENT DOCUMENTS

| 4,364,234 A | 12/1982 | Reed |
| 4,407,133 A | 10/1983 | Edmonson |

(Continued)

FOREIGN PATENT DOCUMENTS

| DE | 102017004722 A1 | 1/2018 |
| EP | 3410045 A1 | 12/2018 |

(Continued)

OTHER PUBLICATIONS

International Search Report and Written Opinion of the International Searching Authority dated Feb. 7, 2022 in Int'l PCT Patent Appl. Serial No. PCT/US2021/059583 (12 pages).

*Primary Examiner* — Ana M Vazquez
(74) *Attorney, Agent, or Firm* — Sheppard, Mullin, Richter & Hampton LLP; Jaime D. Choi

(57) ABSTRACT

A temperature controlled system for storing, transporting and/or delivering temperature-sensitive contents includes a temperature controlled package; a solid state heat pump; and a heat transport element in thermal communication with the heat pump. The heat transport element is insertable into the package to couple the package to the heat pump. The heat transport element is removable from the package to decouple the package from the heat pump. A temperature controlled chamber may be located within the package, an electrical energy storage system may provide electrical power to the heat pump, an electrical connector may accept electrical power from a source of electricity other than the electrical energy storage system to provide electrical power to the heat pump, a thermal energy storage system may be located within the package, an electronic control/energy (Continued)

management system may control the heat pump, and/or an input/output feature may control the heat pump.

22 Claims, 34 Drawing Sheets

(56) References Cited

U.S. PATENT DOCUMENTS

| | | | |
|---|---|---|---|
| 4,759,190 A | | 7/1988 | Trachtenberg et al. |
| 4,823,554 A | * | 4/1989 | Trachtenberg .......... F25D 15/00 62/3.61 |
| 5,217,064 A | | 6/1993 | Kellow et al. |
| 5,301,508 A | * | 4/1994 | Kahl ....................... F25B 21/02 220/592.2 |
| 5,572,873 A | | 11/1996 | Lavigne et al. |
| 5,661,978 A | | 9/1997 | Holmes et al. |
| 6,260,360 B1 | | 7/2001 | Wheeler |
| 6,658,857 B1 | | 12/2003 | George |
| 8,978,392 B2 | * | 3/2015 | Blackway ............... F25B 21/02 62/3.62 |
| 9,874,377 B1 | | 1/2018 | Ilercil |
| 10,288,355 B2 | | 5/2019 | Mulinti et al. |
| 11,067,327 B2 | * | 7/2021 | Alexander .............. F25B 21/04 |
| 11,464,706 B2 | * | 10/2022 | Moberg .................. A61J 1/165 |
| 2007/0119187 A1 | * | 5/2007 | Kitchens ................. F25D 19/00 62/298 |
| 2007/0295733 A1 | | 12/2007 | Balva et al. |
| 2010/0084119 A1 | | 4/2010 | Becklin |
| 2011/0266287 A1 | | 11/2011 | Groesbeck |
| 2012/0312031 A1 | | 12/2012 | Olsen et al. |
| 2016/0243000 A1 | * | 8/2016 | Gray ..................... F25D 11/006 |
| 2017/0259648 A1 | | 9/2017 | Putcha et al. |
| 2020/0128991 A1 | | 4/2020 | Jessie |
| 2021/0063062 A1 | * | 3/2021 | Alexander ........... A01N 1/0273 |
| 2021/0310729 A1 | * | 10/2021 | Alexander ........... F25D 31/006 |

FOREIGN PATENT DOCUMENTS

| | | |
|---|---|---|
| KR | 200450277 Y1 * | 9/2010 |
| WO | 2020055553 A1 | 3/2020 |
| WO | 2020160494 A1 | 8/2020 |
| WO | 2020210094 A1 | 10/2020 |

* cited by examiner

Side View

Front View

CONTAINERS FOR TRANSPORT AND STORAGE OF TEMPERATURE SENSITIVE CONTENTS USING SOLID STATE HEAT PUMPS

CROSS-REFERENCE TO RELATED APPLICATIONS

This application is a U.S. national phase application under 35 U.S.C. § 371 of PCT/US2021/059583 filed on Nov. 16, 2021 and entitled "CONTAINERS FOR TRANSPORT AND STORAGE OF TEMPERATURE SENSITIVE CONTENTS USING SOLID STATE HEAT PUMPS," which claims the benefit of U.S. Provisional Patent Application No. 63/115,277, filed entitled "Temperature Control Using DTP Thermoelectrics," the entire content of each of which application is incorporated herein by reference.

FIELD

Temperature controlled transport and/or storage systems and devices as disclosed herein relate to devices and systems that are configured to accommodate the transport and/or storage of temperature-sensitive materials and contents and, more specifically, relates to temperature controlled transport systems and devices comprising solid state heat pumps, heat transport elements, electrical energy storage systems and/or thermal energy storage systems configured in a manner that permits viable temperature controlled storage and transport of temperature-sensitive materials to a point-of-use location.

BACKGROUND

Devices or systems for storing temperature sensitive materials or contents are known. However, an issue with such existing devices is that conventional refrigerators or freezers are not designed to operate to provide low controlled temperatures called for by certain temperature-sensitive materials or contents. For example, when it was first announced that the first vaccines available to fight Covid-19 needed to be stored and transported at −70 C, it was apparent that there would be logistical issues as such conventional refrigerators and freezers could not be used. While special ultra-cold freezers and Stirling coolers exist and can be used to such temperatures, they do not scale well to smaller sizes and are often prohibitively expensive. Ice packs have often been used to provide inexpensive, chilled packaging for smaller packages, but conventional ice packs would not be able to get down to the colder controlled temperatures called for by such temperature-sensitive materials or contents. Also, while dry ice may be used for smaller packages at the lower temperatures, there is no ability to provide precise temperature control, and dry ice would be a finite cooling resource.

The need for compact, precise temperature control for transport and storage goes beyond the Covid-19 vaccine. Many temperature-sensitive materials or contents require precise temperature control both above and below ambient temperatures. Many temperature-sensitive materials also require the ability to have prolonged and renewable temperature control beyond what a dry ice or conventional ice pack can provide. Further, the ability to have increased flexibility in transport options for such temperature-sensitive materials or contents is desired that is not practical using known refrigeration or freezer systems. For example, it is desired to transport and deliver certain temperature-sensitive materials or contents to difficult to reach areas, e.g., using delivery vehicles that may or may not be manned, e.g., such as by aerial drones. To enable the transport and delivery of temperature-sensitive materials or contents it would be desired that the weight and/or size of the temperature controlled package be minimal. Additionally, it may also be desired that such temperature controlled package, e.g., configured for transport and delivery by vehicle such as by drone or the like be relatively inexpensive as it may be discarded after the package is delivered.

It is, therefore, desired that temperature controlled systems be specially designed and configured to promote use for storing and transporting temperature-sensitive materials or contents while providing both an enhanced degree of temperature control when compared to conventional devices, and control temperatures below control temperatures offered by such conventional devices. It is further desired that such temperature controlled systems be designed to provide such controlled temperature storage and transport at such low temperatures in a manner that is more efficient than conventional devices. It is further desired that temperature controlled systems be configured to enhance the flexibility of accommodate storage and transportation of such temperature-sensitive materials to enable transport and delivery to remote locations, e.g., by vehicle delivery such as by drone or the like, as may be called for certain end-use applications.

SUMMARY

Temperature controlled systems as disclosed herein are configured for transporting and/or storing temperature-sensitive contents. In an example the system comprises at least one temperature controlled chamber for accommodating placement of the temperature-sensitive contents therein. The system includes at least one solid state heat pump that is in thermal communication with the at least one temperature controlled chamber. In an example, the at least one temperature controlled chamber is disposed in a housing, and wherein the location of the housing is traceable. In an example, the system comprises thermal insulation between the at least one temperature controlled chamber and the housing. The thermal insulation may be is selected from the group including of aerogel, vacuum, and combination thereof. In an example, the housing comprises extended surfaces or fins to enable thermal power dissipation to an external environment. In an example, the temperature controlled system comprises at least one of the following: a thermal energy storage system in thermal communication with the at least one solid state heat pump; an electrical energy source or an electrical storage system configured to provide electrical power to the at least one solid state heat pump. In an example, at least part of the solid state heat pump employs thermoelectric technology. In an example, at least part of the solid state heat pump employs distributed transport property thermoelectric technology. In an example, the at least one solid state heat pump comprises a cascade of at least two solid state heat pumps in thermal series arrangement.

In an example, the temperature controlled system comprises the thermal energy storage system, and wherein at least part of the thermal energy storage system comprises a phase change material. In an example, the temperature controlled system comprises two or more temperature controlled chambers, wherein one of the temperature controlled chambers is controlled to a temperature that is different than the controlled temperature of another temperature controlled chamber. In an example, the temperature controlled system is configured to control the temperature of the at least one temperature controlled chamber temperature, or to control the temperatures of the two or more temperature controlled chambers, above and/or below ambient temperature.

In an example, the temperature controlled system is configured to receive an input command that changes the temperature of the temperature controlled chamber, e.g., towards an external ambient temperature. In an example, the temperature controlled system is configured to read a barcode or other type of input for setting control information. In an example, the temperature controlled system is configured to program temperature control information. In an example the temperature controlled system comprises the electrical energy storage system, wherein the electrical energy storage system may be in the form of at least one battery. In an example, the temperature controlled system comprises an electronic control system that is configured to record information about at least one of the following: temperature history of contents placed in the at least one temperature controlled chamber; accessible retention of fault conditions experienced by the temperature controlled system; a location of the temperature controlled system; and transmission of at least some of information that is collected by the temperature controlled system. In an example, the electrical control system is configured to receive and/or respond to external signals, transmit signals, and/or provide display information. In an example, the temperature controlled system comprises an electrical connector for accepting electrical power from a source of electricity other than the electrical energy storage system. In an example, the temperature controlled system comprises the thermal energy storage system, and wherein the thermal energy storage system is removable or reusable. In an example, the at least one temperature controlled chamber is disposed in a package, and wherein the package is configured to connect with and/or be carried by, a vehicle. In an example, the temperature controlled system is configured to control humidity. In an example, the temperature controlled system comprises more than one temperature controlled chambers, and wherein the temperature controlled system comprises a distributed bank of storage compartments that are configured to separately store and/or transport temperature controlled packages.

In an example, temperature controlled system comprises at least one separable temperature controlled package, at least one separable solid state heat pump in thermal communication with the at least one temperature controlled chamber. In an example the at least one temperature controlled package comprises a temperature controlled chamber and a housing, wherein thermal insulation is disposed between the temperature controlled chamber and the housing. In an example, the temperature controlled system further comprises at least one of: a thermal energy storage system in thermal communication with the at least one separable solid state heat pump; a separable electrical power source for providing electrical power to the at least one solid state heat pump; a separable electronic control/energy management system; and an input/output feature. In an example, the at least one temperature controlled package is separable from one or more of the at least one solid state heat pump, the electrical power source, the electronic control/energy management system, and the input/output feature. In an example, the at least one temperature controlled package is configured to be stored and/or transported in a distributed bank of storage compartments. In an example, at least some of the distributed bank of storage compartments is configured to provide independent temperature control of the at least one temperature controlled package. In an example, the at least one solid state heat pump, the at least one of the thermal energy storage system, the electrical power source, the electronic control/energy management system, and the input/output feature are part of a delivery system, wherein the delivery system is separable from the at least one temperature controlled package, and wherein the at least one temperature controlled package is disposable. In an example, the delivery system comprises a distributed bank of storage compartments, and wherein the at least one temperature controlled package is separable from a distributed bank of storage compartments. In an example, the at least one solid state heat pump and the electrical power source are external from the thermally controlled package, and wherein the at least one solid state heat pump is in thermal communication with a temperature controlled chamber within the at least one temperature controlled package by at least one heat transport element that extends through a portion of the at least one temperature controlled package to the temperature controlled chamber.

Temperature controlled systems as disclosed herein may be used according to the following method for storing or transporting a temperature-sensitive content, wherein the method comprises charging a thermal energy storage system and/or an electrical energy storage system, placing the temperature-sensitive content in a temperature controlled chamber of a temperature controlled system comprising a housing, and directing electrical power from an electrical power source to at least solid state heat pump that is in thermal communication with the temperature controlled chamber to maintain the temperature controlled chamber at a control temperature, wherein the step of operating takes place before or after the step of placing. In an example, the method may comprise inputting temperature information into the temperature controlled system that includes the control temperature. In an example, the method may comprise receiving information from the temperature controlled system that includes at least one of; temperature history information of the temperature controlled chamber, fault conditions of the temperature controlled system, location information of the temperature controlled system, and transmission information of at least some temperature controlled system information. In an example, the method may include positioning the housing into contact with at least one heat transport element that is in thermal communication with the at least one solid state heat pump, wherein the at least one heat transport element extends through a portion of the housing and to the temperature controlled chamber.

Temperature controlled systems as disclosed herein are specially designed and configured to store and/or transport temperature-sensitive materials or contents while providing both an enhanced degree of temperature control when compared to conventional devices, and control temperatures below control temperatures offered by such conventional devices. Temperature controlled systems as disclosed herein are designed and configured to provide such controlled temperature storage and transport at such low temperatures in a manner that is more efficient than conventional devices. Further, temperature controlled systems as disclosed herein are configured to enhance flexibility of storing and/or transporting temperature-sensitive materials to enable transport and delivery to remote locations, e.g., by vehicle delivery such as drone delivery or the like, as may be called for certain end-use applications.

BRIEF DESCRIPTION OF DRAWINGS

Features and advantages of the devices, systems, and methods as disclosed herein will become appreciated as the same become better understood with reference to the specification, claims, and appended drawings wherein:

DETAILED DESCRIPTION

Figure 1A:
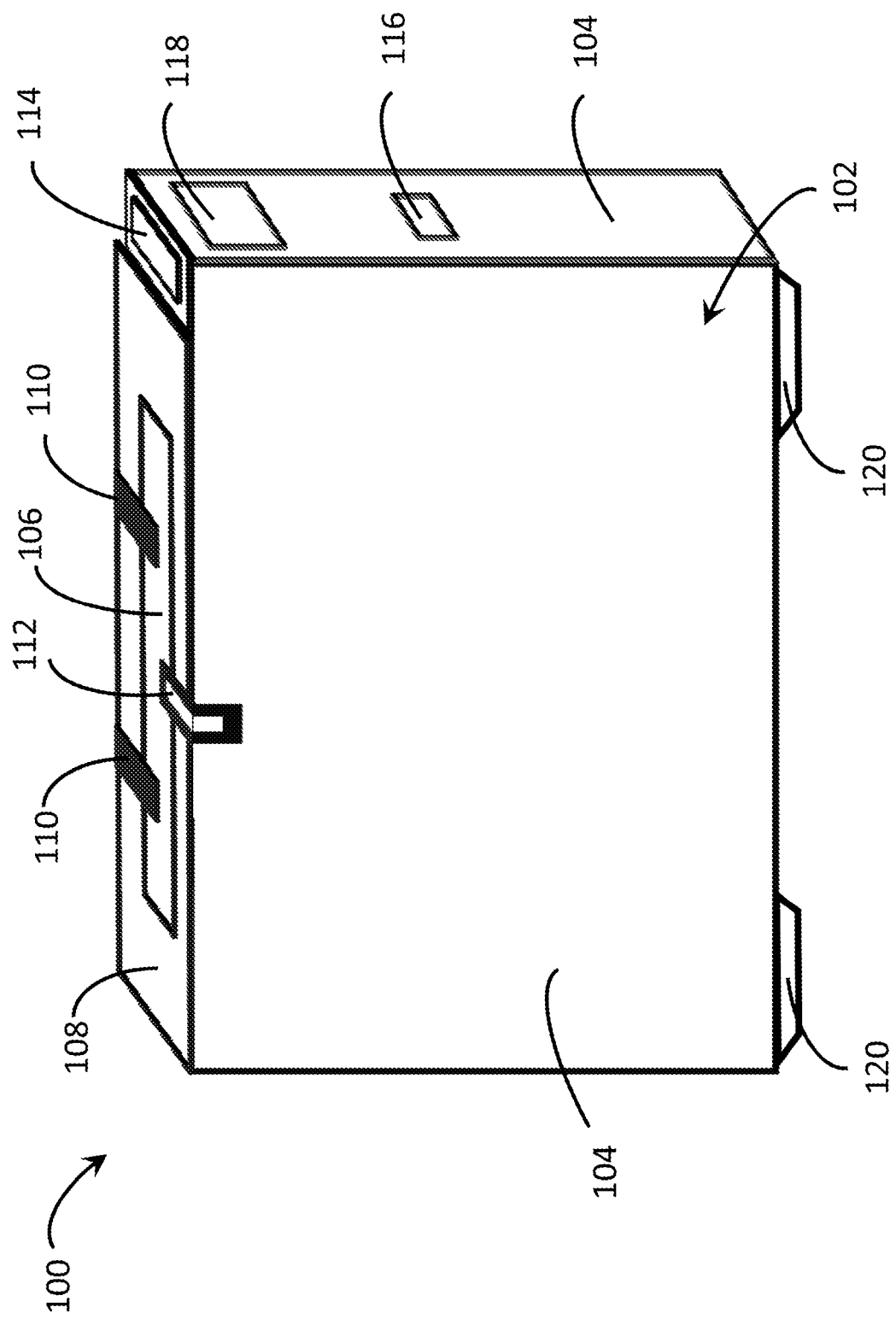
FIG. 1A is a perspective side view of a first example temperature controlled transport system as disclosed herein.

Containers for transport and storage of thermally-sensitive materials and contents using solid state heat pumps as disclosed herein are referred to in this description as temperature controlled transport systems. Temperature controlled transport systems as disclosed herein utilize solid state heat pumps (e. g. thermoelectric, thermionic, electrocaloric or thermomagnetic devices) to control temperature of a temperature-sensitive material or content during transport and storage. Temperature controlled transport systems as disclosed herein are well suited for storage and transport of materials or contents that include, and that is not limited to, vaccines, medicines, biologics, temperature sensitive materials such as solder pastes, epoxies and the like, organic perishables, living organisms, and other materials that benefit from temperature control during transport or storage. Temperature controlled transport systems as disclosed herein provide either heating or cooling temperature control of materials to be stored at specific temperatures within the system's operating capability. Temperature controlled transport systems may be programmed to control to a first designated temperature at one operating condition, and switch to one or more other temperatures under other designated operating conditions. Temperature controlled transport systems as disclosed herein comprise temperature control systems that may be programmed to operate over a broad range of temperatures. Temperature controlled transport systems as disclosed herein comprise one or more temperature controlled chambers, and the temperature controlled transport system may be configured to control the temperature of such temperature controlled chambers to temperatures not obtainable with water, ice, dry ice, liquid nitrogen and other material systems currently used for portable temperature control. Further, temperature controlled transport systems as disclosed herein may incorporate more than one temperature controlled chamber, wherein the more than one temperature controlled chambers may be simultaneously controlled to different temperatures. Also described are temperature controlled transport systems that utilize thermoelectric technology having distributed transport properties (DTP). Temperature controlled transport systems as disclosed herein may be configured to operate at very cold conditions without the need for utilizing dry ice, liquid nitrogen or other thermal energy storage materials. Further, the temperature controlled transport systems can be designed to operate as efficient control of temperatures above ambient.

The temperature controlled transport systems as disclosed herein may be used within an existing refrigerator or freezer and provide a cold chamber that operates at a temperature such as −60° C. or −70° C., much colder than the temperature within the refrigerator or freezer. Further, the use of temperature controlled transport systems as disclosed herein in refrigerators and freezers provides the capability to maintain the desired operating temperature if the refrigerator or freezer fails, power is temporarily interrupted, or during times when the temperature controlled transport system is transported from one refrigeration system to another. In the above cases and others, temperature controlled transport systems as disclosed herein may provide a temperature history and an alarm output if temperatures deviate from a set temperature by more than a specified amount. Temperature controlled transport systems as disclosed herein may be configured so that location, temperature profile history, available remaining operating time, and other desired metrics related to status and/or performance can be transmitted wirelessly or by other methods.

Temperature controlled transport systems as disclosed herein generally comprise an outer case or housing having one or more temperature controlled chambers disclosed within and thermally insulated from the environment. The temperature controlled chamber is configured to accommodate placement, storage, and transport of a temperature-sensitive material or content therein. Temperature controlled transport systems as disclosed herein may comprise heat pump technology such as conventional solid state thermoelectric, electro-caloric, magnetocaloric, or thermionic devices, or DTP thermoelectric technology. DTP thermoelectric technology having material structuring can provide a larger temperature difference than conventional thermoelectric materials, and can operate at a higher coefficient of performance (COP) and a larger heat pumping capacity than conventional thermoelectric material. As a result, less electric power is used per unit time and the associated temperature controlled transport system can operate for some combination of longer time, higher or lower temperatures, or with a smaller power source. In an example, temperature controlled transport systems as disclosed herein use one or more heat pumps, e.g., solid state thermoelectric devices, to provide cooling to the temperature controlled chamber. Heat transport elements or heat spreaders may be interposed between a cooling side or surface of the one or more heat pumps and a wall surface of the temperature controlled chamber to achieve a desired temperature to the temperature controlled chamber. Temperature controlled transport systems as disclosed herein may optionally comprise a thermal energy storage system, such as a phase change material, disposed therein and positioned to receive thermal energy from the one or more solid state heat pumps. The thermal energy storage system may minimize the amount of electrical power directed to the heat pumps needed to maintain the desired control temperature of the temperature controlled chamber, thereby reducing energy consumption to enable temperature controlled transport systems to provide a prolonged duration of temperature controlled transport and storage. Temperature controlled transport systems as disclosed herein can comprise an energy storage system, e.g., in the form of a battery or the like, and can comprise an electronic control/energy management system (EMS), and an input/output (I/O) feature or system that may be configured to control the flow of power to the heat pumps to maintain the temperature controlled chamber and its contents at the desired control temperature, and may also be configured to receive input data such as temperatures and the like, and also provide output information such as temperature history, location history, system performance data, and the like. Temperature controlled transport systems as disclosed herein are configured to operate under portable power and/or from power provided by an external electricity source. Temperature controlled transport systems as disclosed herein are configured in a manner optimizing the ability to maintain the temperature controlled chamber temperature for long durations through the electronic control/EMS powering the solid state heat pumps. In an example, the solid state heat pumps may be configured and/or controlled in a manner enabling temperature control of the temperature controlled chamber at reduced temperatures within of less than about −60° C. or −70° C.

PCT International Patent No. PCT/US2020/016247, filed on Jan. 31, 2020, entitled "Thermoelectric Elements and Devices with Enhanced Maximum Temperature Differences Based on Spatially Varying Distributed Transport Properties," is hereby incorporated herein by reference in its entirety. U.S. Provisional Patent Application No. 63/039,107, filed on Jun. 15, 2020, entitled "Increased Heat Pumping Capacity and Maximum Power Output from Using DTP Thermoelectrics," is hereby incorporated herein by reference in its entirety. U.S. patent application Ser. No. 17/385,241 filed on Jul. 26, 2021, entitled "Thermoelectric Elements and Devices with Enhanced Maximum Temperature Differences based on Spatially Varying Distributed Transport Properties," is hereby incorporated herein by reference in its entirety.

The following terms as used herein are defined as follows:

Electrical energy storage systems—include and are not limited to batteries, fuel cells, ultra-capacitors, and any other suitable electrical energy storage component or source, that provides transportable and portable electrical power.

Heat transport elements or members—include and are not limited to material systems that provide good thermal connection between parts such as heat pumps and thermal energy storage systems, a first heat pump and a second heat pump, thermal energy storage systems and heat spreaders. They can also be any other material or material system that provides low thermal resistance coupling between temperature controlled parts. They are material systems with high thermal conductivity such as aluminum, copper, graphite, flat heat pipes, thermosyphons, vapor chambers, thermal greases, thermal gels, thermal gaskets, thermal pads, and any other good heat transport medium.

Heat spreaders—include and are not limited to high thermal conductivity materials such as aluminum, copper, graphite, heat pipes, thermosyphons, vapor chambers and/or any other suitable high thermal conductivity heat transport medium or system. Heat spreaders are principally used to distribute heat more widely and uniformly from a heat source or sink. The heat source or sink can be a heat pump or thermal energy storage system. Heat spreaders are the conduit for the temperature conditioning of a temperature controlled chamber. Heat spreaders also can distribute thermal power for more effective heat rejection.

Electronic control and I/O systems—include and are not limited to controls and systems for providing connectivity to other locations, tracking information, state of on board systems including temperature history, location, state of readiness of thermal energy stored, electric power system available capacity, and other output functions useful to storage system operation, communication, state of readiness and control. The systems can also be designed to accept information in all forms, including bar code and magnetic strip scanning, wireless communications, manual inputs and inputs from any other communication tools. Further, the systems can be designed to perform control functions including responding to external environment changes, instructions received, removals and additions of stored materials requiring temperature changes and any other control functions designed into the system. Electronic controls can determine how much power a heat pump receives and whether one or more heat pumps in a system receive power. Electronic controls can also change the direction of electrical current provided to a heat pump to reverse the direction of heat pumping (i.e. from cooling to heating or vice versa). Electronic controls can recharge the electrical energy storage system while also providing power to one or more heat pumps. Electronic controls receive power from either the electrical energy storage system or the electrical connector.

Insulation—includes and is not limited to being an aerogel, vacuum, insulating fiber material, foam insulation, high reflectivity film or any other suitable efficient thermal insulation material or material system combination thereof.

Temperature controlled package—includes and is not limited to an environmentally protected enclosure that is suitable for protecting and/or containing temperature sensitive materials/contents such as vaccines, complex organic compounds, frozen specimens, living organisms, or any other temperature sensitive materials or content. The temperature controlled package can be reusable or disposable depending on the design.

Thermal energy storage system—includes and is not limited to any material system with high heat of transformation or phase change at a desired temperature or over one or more desired temperature ranges. Examples include: phase change media with high heat of transformation from a first phase to a second phase, including changes between solid phase and liquid phase or between liquid phase and gas phase; storage medium such as ice which converts to water at 0° C.; water and water/salt solutions (or any other soluble compound that changes the freeze point of water or another liquid); waxes which change phases at temperatures generally above 0° C. Dry ice is another example of thermal energy storage where the phase change is from solid directly to gas.

Heat pumps—include and are not limited to solid state systems and devices which move, pump or transport heat from one portion (e.g., side) of a device to another without any moving parts, such as a compressor, or two-phase refrigerants. Heat pumping can be such that the side of the device where heat is removed can be below ambient temperature. For thermoelectric (TE) devices, the heat can be moved in the opposite direction from the initial direction (i.e., change from cooling to heating) if the direction of electrical current or polarity of the electric source is reversed. Heat pumps can be used to control temperature during transport and storage. Heat pump technology may be conventional TEs, thermionic or electro-caloric devices, and in particular, they can be constructed using distributed transport property (DTP) TE technology and materials.

FIG. 1A illustrates a first example temperature controlled transport system 100 as disclosed herein. The temperature controlled transport system 100 comprises a housing 102 that may be a formed material having a desired degree of rigidity, strength and durability, such as metal or plastic or the like. In an example the housing is formed from ABS plastic, polycarbonate plastic or any other suitable material usable for fabricating transportable housings. In an example, the housing 102 is configured to accommodate the elements, devices, and systems that will be disclosed below. In the example, the housing is illustrated having a generally rectangular shape, but it is to be understood that the housing may be shaped or configured other than as illustrated, and that such different shapes or configurations is within the scope of this description. In an example, the housing 102 may be configured comprising closed exterior side surfaces 104, and a lid or cover 106 that is movably attached to the housing and positioned over a top surface 108. In an example, the lid 106 may be attached to the housing by hinges 110 or the like positioned along a common edge to permit the lid 106 to be moved away from and towards the housing top surface 108 for purposes of gaining and restricting access to within the housing 102. An attachment mechanism 112 in the form of a latch or the like may be used for purposes of securing the lid 106 in a closed position relative to the housing 102, and for purposes of securing the contents of the temperature controlled transport system 100 inside the housing 102. In an example, the lid 106 may be formed from a material having a desired degree of structural rigidity, and may also be configured to contain thermal insulation to help maintain temperature control within the temperature controlled transport system 100. In an example, the housing 102 may include an optional input/output (I/O) feature 114 that may be configured to enable user input and status output to a user for temperature control or other information such as that discussed below. The housing includes an electrical connector 116 configured to provide access with an external electrical energy source to enable the temperature controlled transport system 100 to receive electric power. The housing 102 may include an optional label or other type of indicia 118 attached to a housing surface that can include information relating to the temperature controlled transport system 100, operating conditions, and/or its contents, such as temperature set point, the type of contents within the temperature controlled transport system 100, temperature controlled transport system model number, or other information that may be typical for a technical device. The housing may include standoffs 120 attached to a housing surface, such as a bottom surface, for purposes of setting or mounting the housing to a support surface.

Figure 1B:
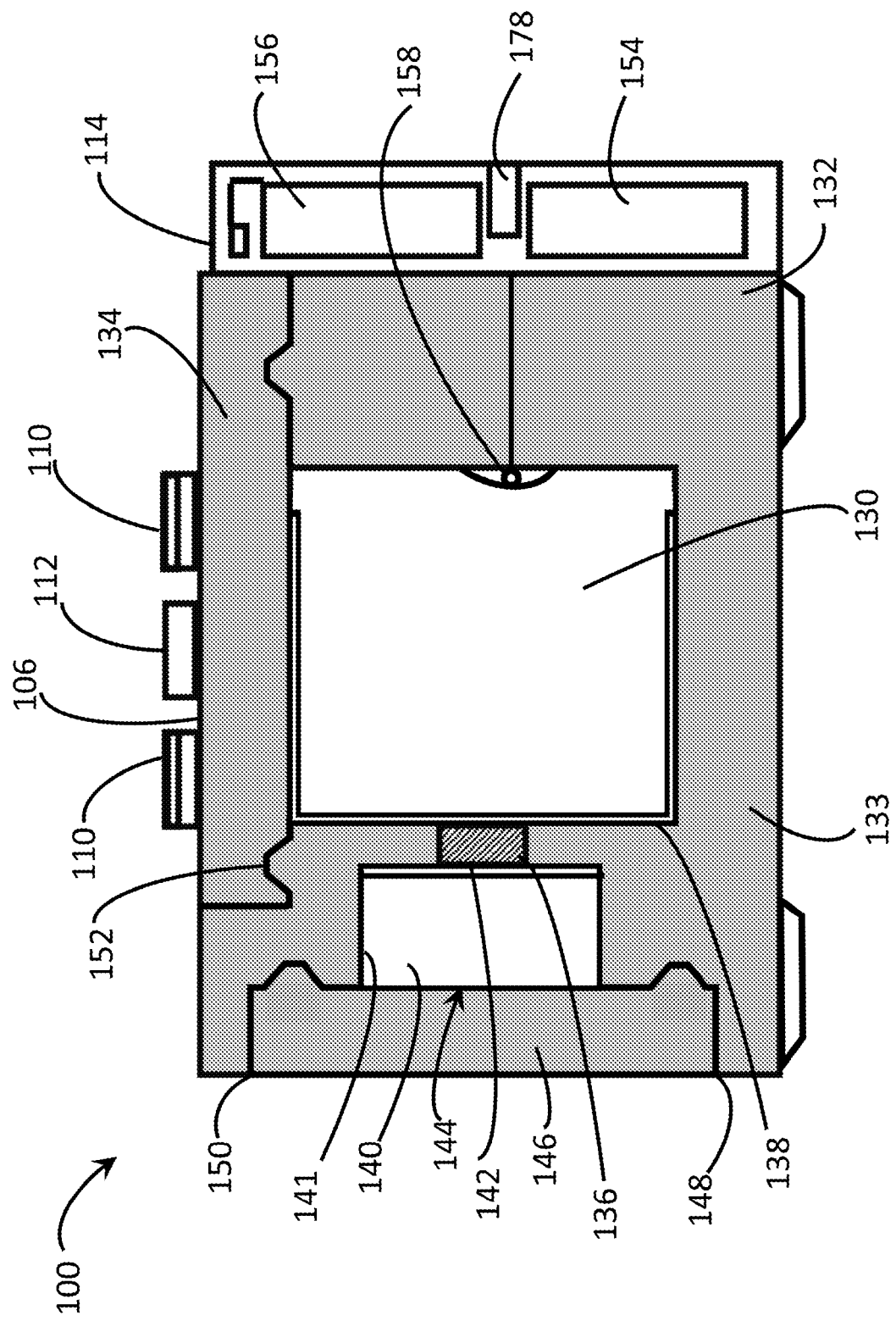
FIG. 1B is a cross-sectional side view of the first example temperature controlled transport system of FIG. 1A.

FIG. 1B illustrates a first example temperature controlled transport system 100 showing various elements, devices, and systems of the temperature controlled transport system 100 useful for transporting and storing temperature sensitive materials therein. The temperature controlled transport system 100 comprises a temperature controlled chamber 130 configured having a desired volume for accommodating the transport and storage of contents that are thermally or temperature sensitive. In an example, the temperature controlled chamber 130 is surrounded by thermal insulation 132. In an example, the insulation 132 may be provided in the form of a first insulating member 133 that surrounds the bottom and side surfaces of the inner chamber 130, and a second insulating member 134 that is positioned long a top portion of the inner chamber 130 and that may be attached with or otherwise associated with the housing lid 106 that may be movably attached with the housing by the hinges 110 and the latch 112. Configured in this manner, the second insulating member 134 is separate from the first insulating member 133 to thereby enable access to the temperature controlled chamber 130 by opening the housing lid 106. The temperature controlled transport system 100 includes a solid state heat pump 136 that is configured to provide thermal power to control the temperature in the temperature controlled chamber 130. The heat rejection side (i.e. outer) of heat pump 136 is in good thermal contact with a thermal energy storage system 140 adjacent the temperature controlled chamber and a heat spreader 138 is in contact with the control (i.e. inner) surface of the heat pump 136 and is interposed between the heat pump 136 and the temperature controlled chamber 130. The heat spreader 138 is configured to transport thermal power from the heat pump 136 to the temperature controlled chamber 130 to create a desired uniform temperature within temperature controlled chamber 130. In an example, the heat spreader 138 is sized having a larger surface area than that of the heat pump control surface it is in good thermal contact with, and extends along a wall surface of the temperature controlled chamber 130. In an example, the heat rejection side of heat pump 136 may be in good thermal contact along a surface opposite the heat spreader 138 with an optional thermal energy storage system 140. In an example, the thermal energy storage system 140 may comprise a phase change material having a high heat of transformation from one phase to a second phase at a desired temperature, as an example, between solid phase and liquid phase or between liquid phase and gas phase. As examples, the thermal energy storage system 140 may be ice that converts to water at 0° C., water and salt solution (or any other soluble compound that changes the freeze point) with a phase change temperature other than C. In some cases, it may be desirable to have a sodium chloride and water mixture as the thermal energy storage system 140 and a phase change temperature between 0° C. and −20° C. Similarly, waxes can be employed for phase change temperatures above 0° C. More generally, the thermal energy storage system 140 may be any material system having a high heat of transformation at a desired temperature or over one or more desired temperature ranges. In an example, the thermal energy storage system 140 is disposed in a cavity 141 of the insulation 133 The thermal energy storage system 140 may be secured in good thermal contact with the heat pump 136 through the action of a compression member 142 that is positioned adjacent a surface of the thermal energy storage system 140 that is opposite the heat pump 136, and that is configured to transfer a pressure force onto the thermal energy storage system 140 towards the heat pump 136 to ensure good thermal contact therebetween. In an example, the temperature controlled transport system 100 may include an optional access port 144 that is positioned along a side of the surface adjacent the thermal energy storage system 140. The access port 144 is configured to enable access to the thermal energy storage system 140. Configured in this manner, thermal energy storage system 140 may be replaced when its thermal capacity is exhausted with fresh thermal energy storage system 140 or with thermal energy storage system 140 with a different capacity or phase change temperature. An insulated door 146 is disposed in the access port 144 and may be movably attached within the port by an optional pivot or hinge mechanism 148 and a latch mechanism 150. Configured in this manner, when placed into a closed state in the access port 144, the insulated door 146 contacts the compression member 142 to secure the desired placement position of the thermal energy storage medium 140 and ensure desired thermal contact with the heat pump 136. The temperature controlled transport system 100 may include optional seals 152 that are configured to provide low thermal loss movable interfaces, for example between the first and second insulating members 133 and 134, for temperature control. The temperature controlled transport system 100 includes an electrical energy storage system 154 that is configured to provide electrical power to operate the heat pump 136. In an example, the electrical energy storage system 154 may be configured to provide electrical power to the heat pump 136 from a remote power source such as a battery and/or from an external power source through the use of one or more electrical conduits (not shown). The temperature controlled transport system 100 optionally can include an electronic control/energy management system (EMS) 156 that is configured to control the electrical energy storage system 154, optionally receive user input from the I/O feature 114, and optionally provide temperature controlled transport system 100 information to optional I/O 114 feature, e.g., for display. The temperature controlled transport system 100 may include an optional temperature sensor 158 that includes an element positioned within the temperature controlled chamber 130 and that is configured to sense the temperature in the temperature controlled chamber 130 and provides temperature information to the optional electronic control/EMS 156. The electrical connector 116 is configured as a power inlet to provide temperature controlled transport system 100 access to external electric power to power the heat pump 136 and/or charge the electrical energy storage system 154. In an example, the I/O feature 114 is configured having a mechanism to enable a user to receive operation information and communicate with and control the operation of the temperature controlled transport system 100. In an example, the electronic control/EMS 156 may be configured to provide stored temperature information (as measured by the temperature sensor 158) data versus time, the state of readiness of the electrical energy storage system 154, energy storage time remaining, and other information through the I/O feature 114 by display and/or by wireless communication to an external device (not shown). In an example, the electronic control/EMS 156 may be configured to store temperature setpoints and profiles that may be programmable by the user through the I/O feature 114. An optional barcode or other information providing feature (not shown) can enable provision of the desired temperature setpoints and profiles and can be also part of the I/O feature 114.

Figure 2A:
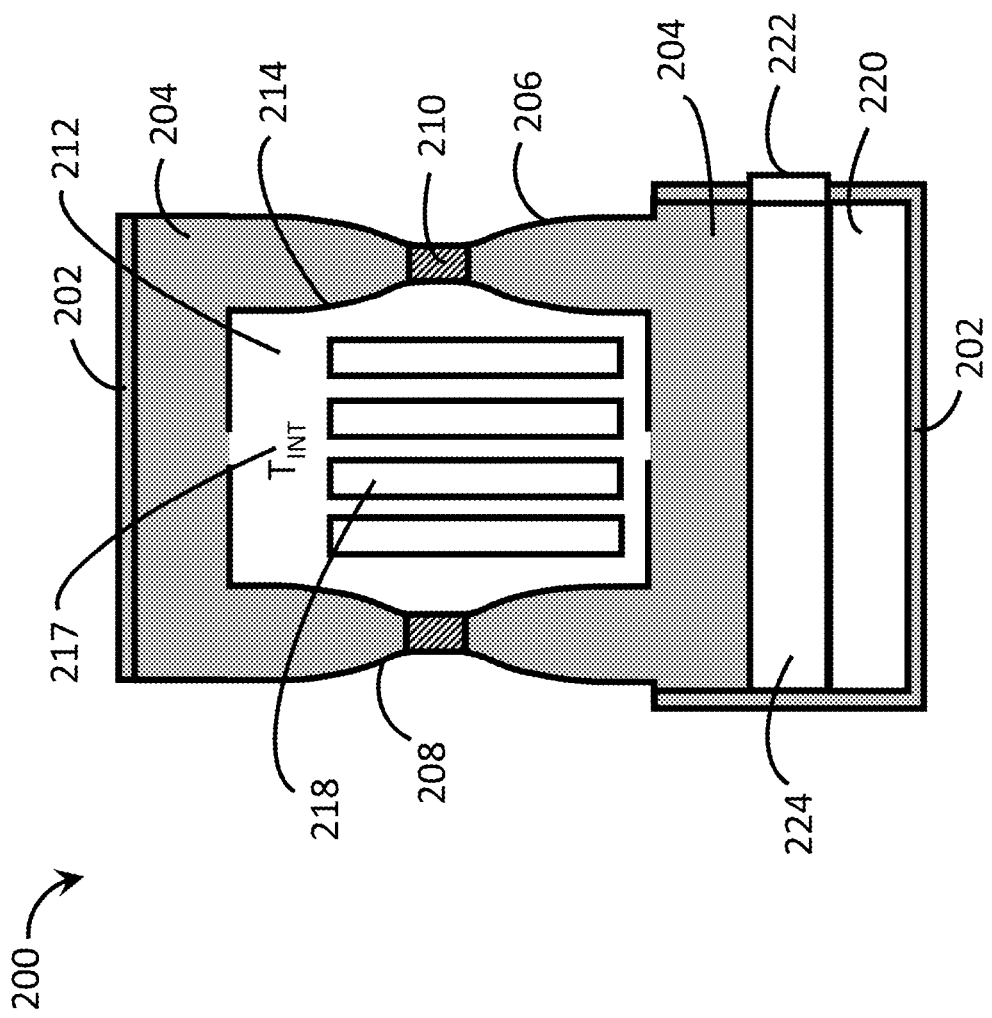
FIG. 2A is a cross-sectional side view of a second example temperature controlled transport system as disclosed herein.

FIG. 2A illustrates a second example temperature controlled transport system 200 as disclosed herein, comprising a housing or outer case 202 that forms external side, top, and bottom surfaces of the temperature controlled transport system 200. Thermal insulation 204 is placed in contact with an inside surface of the housing 202 and is interposed between the housing 202 and one or more heat spreaders 206. The thermal insulation 204 is positioned to insulate the one or more heat spreaders 206 from heat loss to the external environment. In an example, the heat spreaders 206 are configured and positioned to distribute or spread rejected waste thermal power generated from heat pumps 210. In an example, the heat spreaders 206 may be made of high thermal conductivity materials. In an example, the heat spreaders 206 are in good thermal contact with a waste thermal power rejection side/surface of one or more heat pumps 210. In an example, the heat spreaders 206 are configured having a surface area that is greater than that of the heat pump 210 surface the heat spreaders 206 is in thermal contact with. In an example, the heat spreaders 206 may be configured to extend along a majority of a surface area. The temperature controlled transport system 200 includes an temperature controlled chamber 212 configured to accommodate the transport and storage of temperature sensitive content therein. In an example, the temperature controlled chamber 212 comprises opposed side, top and bottom temperature controlled outer walls 214 that are proportioned and positioned to provide a uniform temperature to the temperature controlled chamber 212. In an example, the inner chamber temperature controlled outer walls 214 extend along an entirety of the temperature controlled chamber 212 respective walls. In an example, the inner chamber temperature controlled outer walls 214 may be made of high thermal conductivity materials. The housing 202 is configured having a lid or cover (not shown) for the purposes of accessing the temperature controlled chamber 212 as described in the above example. The temperature controlled transport system 200 comprises one or more heat pumps 210 that are interposed or positioned between the heat spreaders 206 and the inner chamber temperature controlled outer wall 214. In an example, the temperature controlled transport system 200 comprises two heat pumps 210 one located on one side of the temperature controlled chamber 212 and one located on the other side of the temperature controlled chamber 212. Each heat pump 210 has a first surface (e.g., a waste thermal power generating surface) in good thermal contact with a respective heat spreader 206, and has a second opposite surface (a temperature control surface) in good thermal contact with a respective inner chamber temperature controlled outer wall 214. Thermal insulation 204 is disposed within a cavity formed between opposed surfaces of the heat spreaders 206 and the inner chamber thermal control outer walls 214 not occupied by the heat pumps 210. The temperature controlled chamber 212 is controlled to a desired temperature of TINT 217 by operation of the heat pumps 210 to facilitate the transport and storage of temperature sensitive contents or materials 218 disposed inside the temperature controlled chamber 212 such as vaccines, complex organic materials, frozen specimens, living organisms, or any other types of temperature sensitive materials or content.

In an example, the heat pump 210 receives electric power from an electrical energy storage system 220 or from an external power source (not shown) through an electrical connector 222. In an example, the electrical energy storage system 220 is a high power density electric energy source, such as a lithium battery or the like. The temperature controlled transport system 200 can have an electronic control/EMS 224 that is configured to perform several functions that include control of the power from electrical energy storage system 220 to the heat pumps 210 to thereby maintain the desired control temperature, TINT 217 over a range of external ambient conditions. In an example, the electrical connector 222 may function to provide external electric power to the temperature controlled transport system 200 under certain operating conditions as described further below. Optionally, the electronic control/EMS 224 may be configured to have the ability to control one or more of the heat pumps 210 to change the temperature TINT 217 of the temperature controlled chamber 212 under specified conditions. In an example, the electronic control/EMS 224 may control the operation of heat pumps 210 to maintain the contents 218 of all or a portion of temperature controlled chamber 212 to a designated temperature. In another example, after maintaining the contents 218 at a designated temperature during a period of transport or storage, the electronic control/EMS 224 may modify the performance of heat pumps 210 to bring the contents 218 to a second desired temperature prior to usage or removal of the contents 218.

Figure 2B:
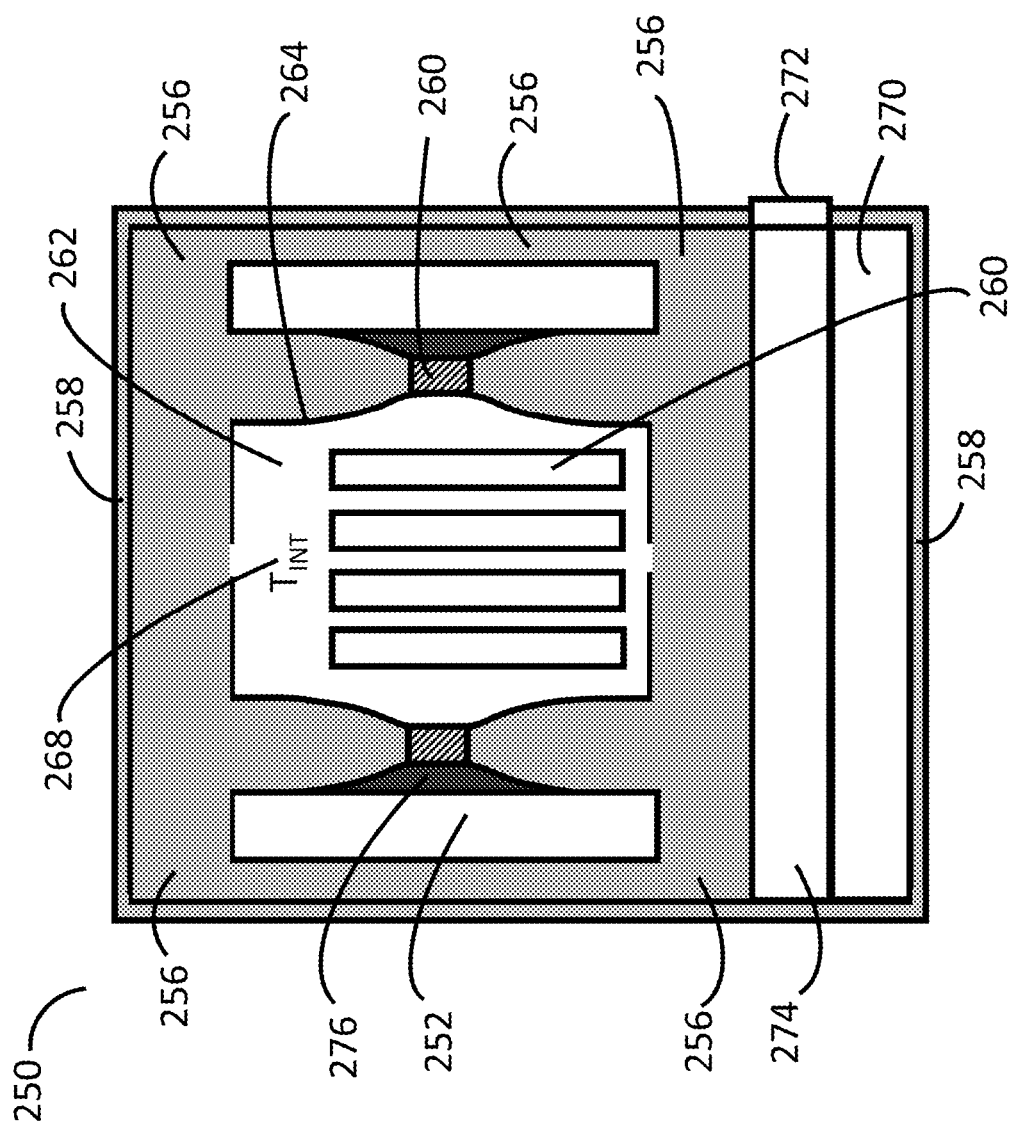
FIG. 2B is a cross-sectional side view of a third example temperature controlled transport system as disclosed herein.

FIG. 2B illustrates a third example temperature controlled transport system 250 as disclosed herein that is somewhat similar to the second temperature controlled transport system 200 of FIG. 2A described above. Unlike the example of FIG. 2A, this example temperature controlled transport system 250 includes a thermal energy storage system 252 disposed therein. The thermal energy storage system 252 may be made of the same type of materials in the description of FIGS. 1A and 1B. The thermal energy storage system 252 is disposed within a cavity formed between a heat transport element 276 and thermal insulation 256 that is positioned adjacent an inside surface of the housing or outer case 258. The thermal energy storage system 252 is in good thermal contact with the heat transport element 276. As with the example of FIG. 2A, the temperature controlled transport system 250 comprises two heat transport elements 276 that are each in good thermal contact with the heat rejection side or surface of a respective heat pump 260, and are positioned to spread rejected thermal power from the heat pump 260 through the thermal insulation 256 and to the housing or outer case 258. The temperature controlled transport system 250 comprises a temperature controlled chamber 262 that is configured to accommodate temperature sensitive material or contents 260 therein. In an example, the temperature controlled chamber 262 includes one or more temperature controlled outer walls 264 that are good thermal conductors and are sized and positioned to provide a uniform temperature within the temperature controlled chamber 262. The temperature controlled chamber 262 is controlled to a desired temperature TINT, 268, by the heat pumps 260. In an example, the inner chamber temperature controlled outer walls 264 are located around the temperature controlled chamber 262, and the heat pumps 260 are disposed within respective cavities that are formed between each inner chamber temperature controlled outer wall 264 and an opposed heat transport element 276. With the exception of the spaces occupied by the heat pumps 260, the cavity is filled with thermal insulation 256. In an example, the temperature controlled chamber 262 may be maintained at a controlled temperature TINT 268 for transport and storage of temperature sensitive materials 260, such as vaccines, complex organic materials, frozen specimens, living organisms or any other temperature sensitive materials or content.

As with the example temperature controlled transport system of FIG. 2, the heat pump 260 receives electric power from an electrical energy storage system 270 or external power source (not shown) through an electrical connector 272, wherein the electrical energy storage system 270 may be the same as described above. An electronic control/EMS 274 may function and operate in the same manner described above. A feature of the temperature controlled transport system 250 comprising the thermal energy storage system 252 is that it may operate to maintain the desired temperature TINT 268 of the temperature controlled chamber 262 for a prolonged duration or with lower required electric power consumption as compared with the temperature controlled transport system 200 of FIG. 2A.

Figure 3A:
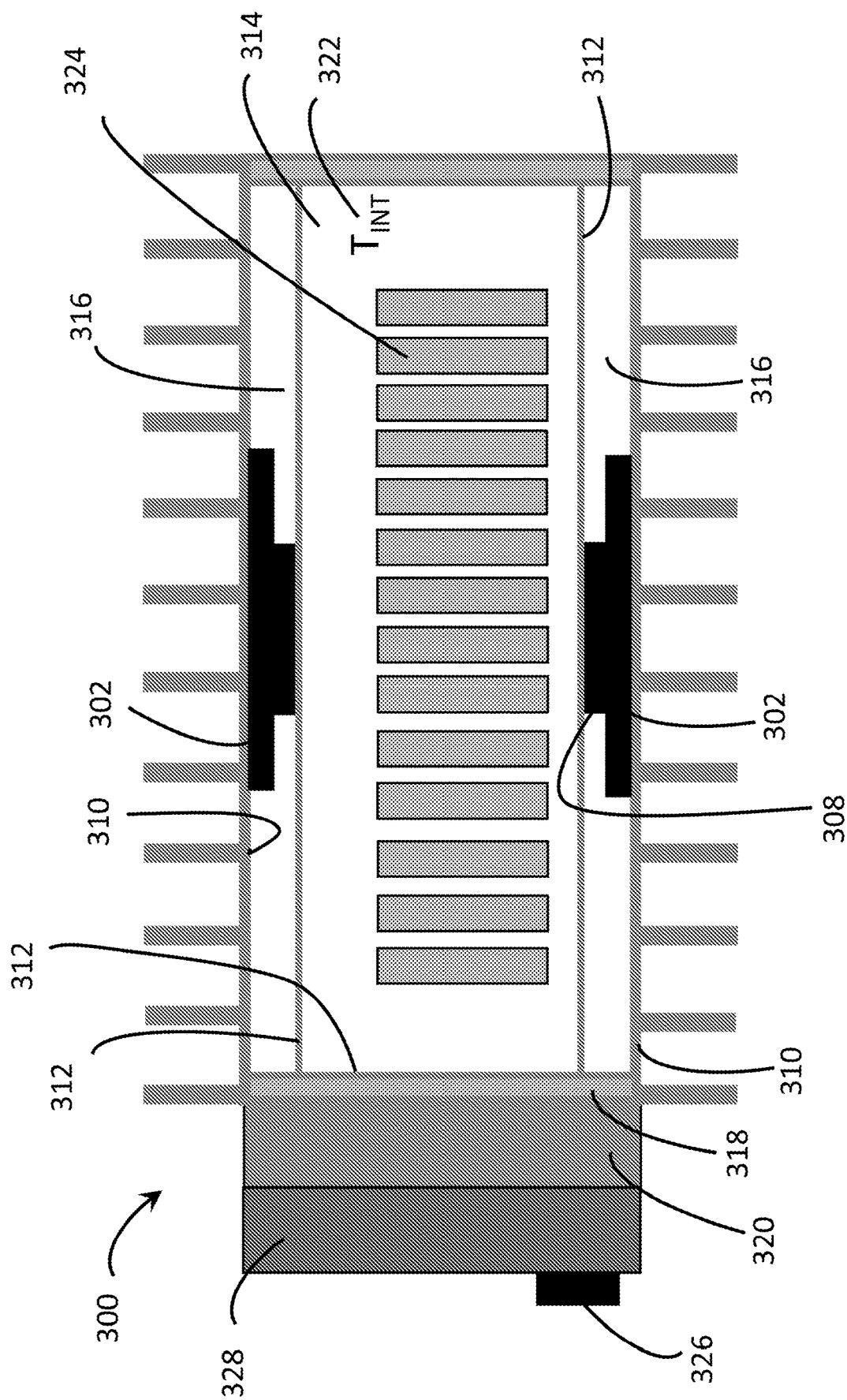
FIG. 3A is a cross-sectional side view of a fourth example temperature controlled transport system as disclosed herein.

FIG. 3A illustrates a fourth example temperature controlled transport system 300 as disclosed herein that is somewhat similar to the temperature controlled transport system 200 of FIG. 2A. However, this example temperature controlled transport system 300 is configured comprising one or more first stage heat pumps 302 that are in good thermal contact with one or more respective heat sink assembly 310. In an example, the one or more heat sink assembly 310 are formed from a thermally conductive material such as Aluminum, Copper or the like and are configured having a desired surface area to transfer thermal power from the one or more first stage heat pumps 302 to the external environment. The first stage heat pumps 302 are in good thermal contact with one or more second stage heat pumps 308 in a stacked or cascade arrangement as illustrated. In an example, the heat sink assembly 310 may be configured to surround the system or be selectively positioned to maximize heat removal from the first stage heat pumps 302. Each of the stacked first and second stage heat pumps 302 and 308 are disposed within a respective cavity that is formed between a respective heat sink assembly 310 and an opposed temperature controlled outer wall 312 of a temperature controlled chamber 314. Thermal insulation 316 is disposed within each cavity to reduce heat transport between each temperature controlled outer wall 312 and respective heat sink assembly 310. Optionally, at thermal conduction paths where heat sink assembly 310 is not present, thermal insulation 318 may be positioned to reduce heat flow between an electrical energy storage system 320 and an opposed temperature controlled outer chamber wall 312. The temperature controlled outer chamber walls 312 are in good thermal contact with the second stage heat pumps 308. The temperature controlled outer walls 312 generally surround the temperature controlled chamber 314. The temperature controlled chamber 314 is controlled at desired temperature TINT 322 by heat pumps 308. The temperature controlled chamber 314 is configured to accommodate temperature sensitive materials or contents 324 for transport and storage. As with the example temperature controlled transport systems described above, the temperature controlled transport system 300 is configured having a lid or opening (not shown) for purposes of accessing the temperature controlled chamber 314.

The first stage heat pumps 302 and second stage heat pumps 308 receive electric power from the electrical energy storage system 320 or from an external power supply through electrical connector 326 as described above for the other examples. The example temperature controlled transport system 300 comprises an electronic control/EMS 328 configured to perform several functions that can include control of the electric power from electrical energy storage system 320 to the first and/or second stage heat pumps 302 and 308. Typically, first stage heat pumps 302 are of similar design to second stage heat pumps 308 but typically have larger heat pumping capacity to provide sufficient heat pumping to create a temperature at the interface between first stage heat pumps 302 and second stage heat pumps 308 to optimize overall heat pumping efficiency and/or maximize temperature difference between the external environment and TINT 322. First stage heat pumps 302 must not only be able to reject the waste thermal power that they create but also the waste thermal power from second stage heat pumps 308. Such performance and design considerations are well known to those familiar with cascade heat pump design.

Figure 3B:
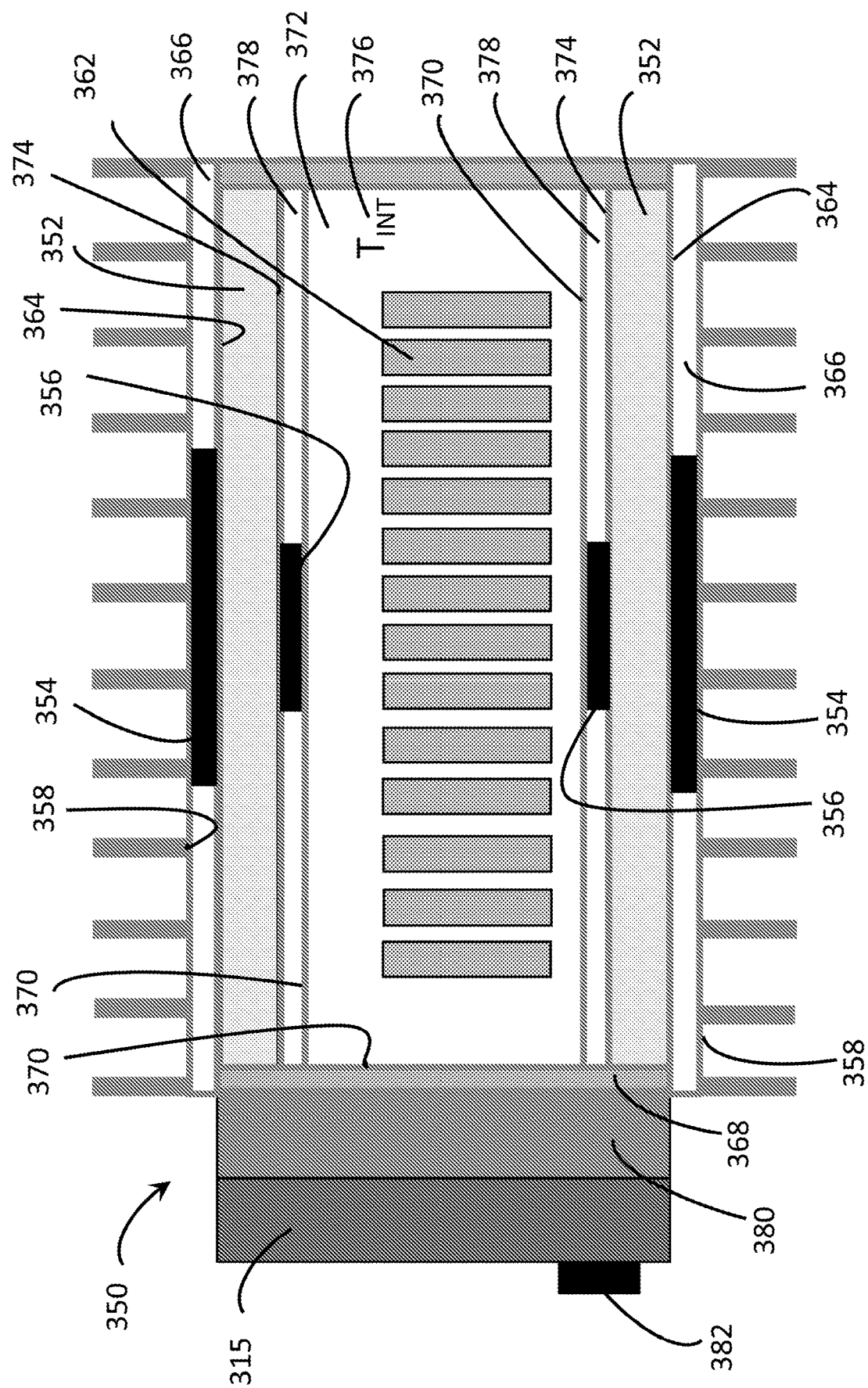
FIG. 3B is a cross-sectional side view of a fifth example temperature controlled transport system as disclosed herein.

FIG. 3B illustrates a fifth example temperature controlled transport system 350 as disclosed herein that is somewhat similar to the example described above and illustrated in FIG. 3A. Unlike the example temperature controlled transport system of FIG. 3A, this example temperature controlled transport system makes use of a thermal energy storage system 352 in addition to first stage heat pumps 354 and second stage heat pumps 356 to increase the temperature control capability for longer time periods or with lower required stored electric power consumption, wherein the thermal energy storage system 352 and heat pumps 354 and 356 are arranged to replenish all or a portion of the thermal energy exchanged with the thermal energy storage system 352. In an example, the temperature controlled transport system 350 comprises one or more first stage heat pumps 354 that are in good thermal contact with one or more respective heat sink assembly 358 that extends outwardly into the external environment. The heat sink assembly 358 are configured to transfer thermal power from the first stage heat pumps 354 to the external environment. The control temperature side of the one or more first stage heat pumps 354 are in good thermal contact with one or more heat transport elements 364. The heat sink assembly 358 and heat transport elements 364 in contact with opposed surfaces of the first stage heat pumps 354 are made from high thermal conductivity heat spread materials. The heat sink assembly 358 may surround the system or be selectively positioned to maximize thermal power removal from the first stage heat pumps 354. Thermal insulation 366 is disposed within a cavity formed between the heat sink assembly 358 and heat transport elements 364 to reduce heat transport therebetween. The amount of thermal leakage between the heat sink assembly 358 and heat transport elements 364 may be reduced by generally increasing the distance between the adjacent heat sink assembly 358 and heat transport elements 364 and adding more or superior performing insulation 366 where other design considerations allow. Thermal insulation 378 is provided to reduce heat flow between heat transport element 374 and a thermal control outer chamber wall 370 of a temperature controlled chamber 372.

Advantageously, thermal energy storage system 352 comprises a phase change material as disclosed above and is disposed in a cavity formed between the heat transport element 364 and an opposed heat transport element 374. In an example, the thermal energy storage system 352 is in good thermal contact with each of the heat transport elements 364 and 374, and the heat transport elements 364 and 374 are positioned to maintain uniform temperature on the inside of a portion of the thermal energy storage system 352. Each heat transport element 374 is in good thermal contact with the heat rejection side or surface of a respective second stage heat pump 356. Configured in this manner, the thermal energy storage system 352 receives waste thermal power from the second stage heat pump 356 via the heat transport element 374 and receives thermal power from the first stage heat pump 354 via the heat transport element 364. One or more temperature control outer chamber walls 370 are in good thermal contact with the temperature control side or surface of the respective second stage heat pumps 356 and are configured and positioned to provide a uniform desired control temperature TINT 376 to the temperature controlled chamber 372. Thermal insulation 378 is disposed within a cavity formed between the temperature control outer chamber walls 370 and opposed heat transport elements 374 to minimize the amount of thermal energy transfer therebetween. The temperature controlled transport system 350 comprises an electrical energy storage system 380, an electrical connector 382, and can contain an electronic control/EMS 315 that are configured and that function in a manner similar to that disclosed above for the example temperature controlled transport system illustrated in FIG. 3A. The operation of the first and second stage heat pumps 354 and 356 is similar to that described above for FIG. 3A.

Figure 4:
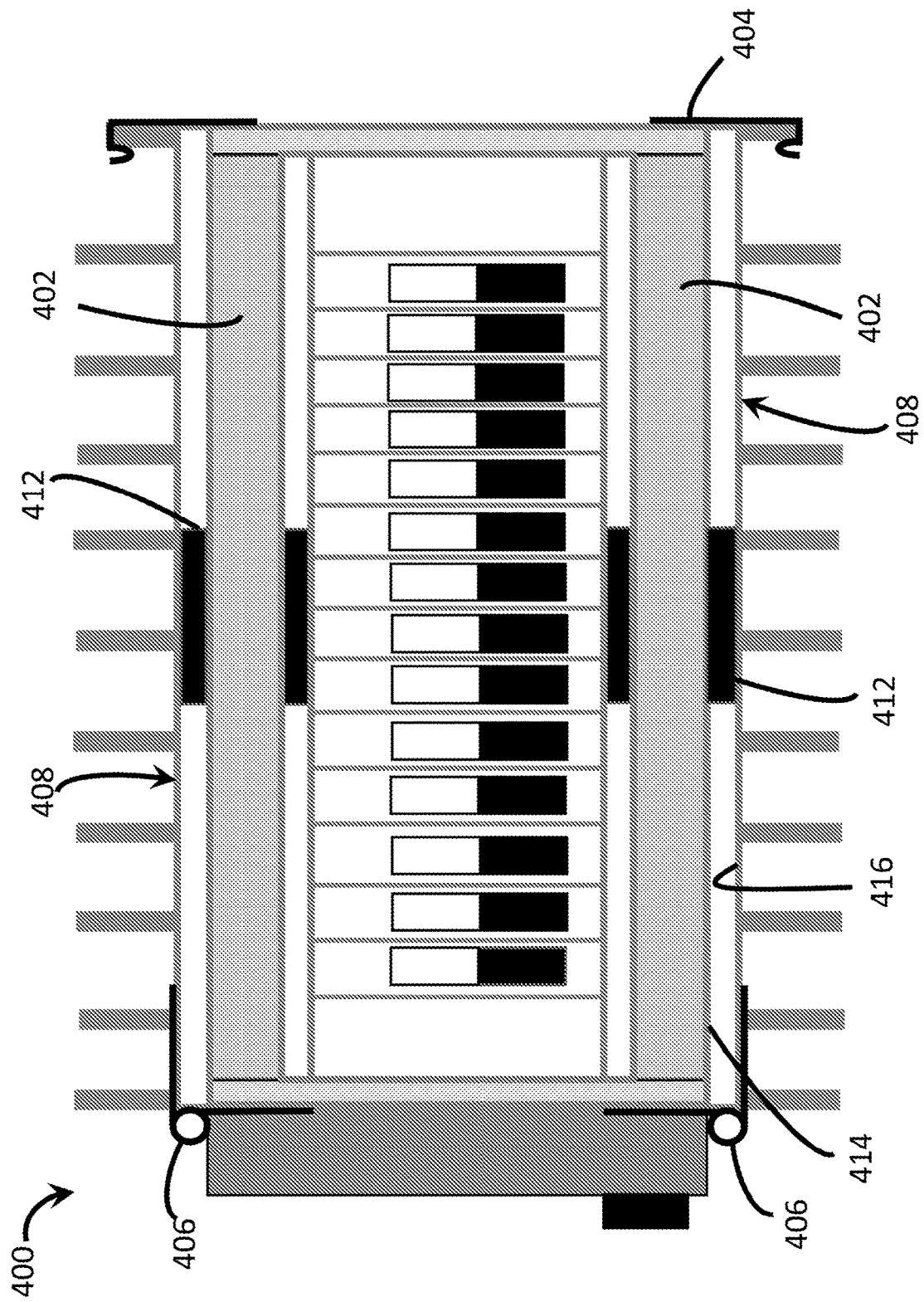
FIG. 4 is a cross-sectional side view of a sixth example temperature controlled transport system as disclosed herein.

FIG. 4 illustrates a sixth example temperature controlled transport system 400 as disclosed herein that is somewhat similar to the example temperature controlled transport system 350 of FIG. 3B disclosed above, comprising similar elements and members. In this example, temperature controlled transport system 400 is configured to permit the thermal energy storage system 402 to be removed and replaced, e.g., replaced with a similarly shaped thermal energy storage system 402. Replacement allows the exchange of one thermal energy storage system 402 to be replaced with an alternate thermal energy storage system 402. As an example, a thermal energy storage system 402 comprising a first phase change material with one transition temperature may be replaced with a thermal energy storage system 402 comprising a second phase change material with a different transition temperature. Alternatively, a thermal energy storage system 402 that has reduced, degraded or exhausted thermal storage capacity may be swapped for fully-charged or new thermal energy storage system 402. In an example, the temperature controlled transport system 400 may be configured comprising a latch mechanism 404 and hinge mechanism 406 attached to heat sink assembly 408 and heat pumps 412 to remove waste thermal power. Thermal interface gasket 416 provides high thermal conductivity path between the heat pump 412 and heat sink assembly 408. In an example, with the heat sink assembly 408 in an opened position, a first thermal energy storage system 402 can be removed from the temperature controlled transport system 400 and replaced with a second thermal energy storage system 402. After such removal and replacement, the heat sink assembly 408 may be moved back into a closed position and the latch mechanism 404 reengaged to restore a high thermal conduction path between the heat pump 412, thermal interface gasket 416, and heat sink assembly 408. This is but one example of how an example temperature controlled transport system 400 as disclosed herein may be configured to permit easy removal and replacement of the thermal energy storage system 402, and it is to be understood that other configurations of such temperature controlled transport systems that provide the same objective are intended to be within the scope of temperature controlled transport systems as disclosed herein.

Figure 5:
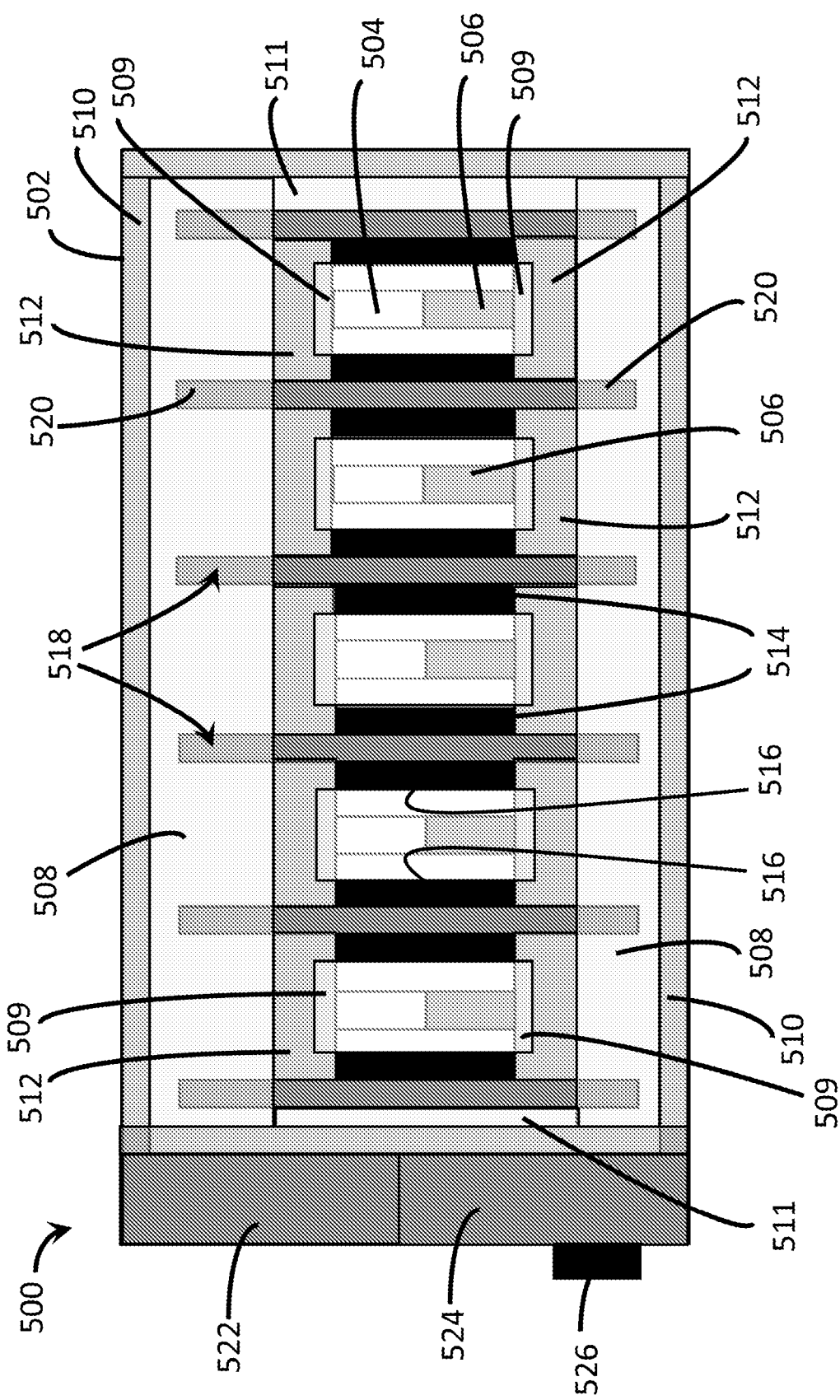
FIG. 5 is a cross-sectional side view of a seventh example temperature controlled transport system as disclosed herein.

FIG. 5 illustrates a seventh example temperature controlled transport system 500 as disclosed herein that is configured comprising a number of individual temperature controlled chambers 504 each configured to accommodate temperature controlled transport and storage of respective temperature sensitive materials or contents 506. In an example, the temperature controlled transport system 500 comprises a housing or outer case 502 as disclosed in other examples, and is configured comprising a number of individual temperature controlled chambers 504 that are positioned along a central region of the housing 502, and that are each configured to accommodate a respective separate temperature sensitive material or contents 506. In an example, a thermal energy storage system 508 is disposed in a cavity that extends inwardly from thermal insulation 510 that is positioned along inside surfaces of the housing 502, e.g., top, sides (not shown) and bottom surfaces, to thermal insulation 512 that is positioned along opposed ends and sides (not shown) of each individual temperature controlled chamber 504. Each temperature controlled chamber 504 is configured comprising two heat pumps 514 that are in good thermal contact with opposed temperature control outer chamber walls 516 of the temperature controlled chamber 504 to receive controlling thermal power therefrom. Heat transport elements 518 are in good thermal contact with each respective heat pump 514 to receive waste thermal power therefrom, such that each heat pump 514 is interposed between an inner chamber temperature control outer chamber wall 516 and a respective heat transport element 518. The heat transport elements 518 are thermally insulated from one another by the thermal insulation 512, and comprise opposed end portions 520 that are in good thermal contact with thermal energy storage medium 508. Configured in this manner, each temperature controlled chamber 504 is adjacent and separated from one another by the heat pumps 514, the heat transport elements 518, and the thermal insulation 512. In an example, the temperature controlled transport system 500 may also include a thermal energy storage system 509 positioned at each end of, or around, each temperature controlled chamber 504, and may also include a thermal energy storage system 511 disposed between the each end heat transport element 518 and the thermal insulation 510 positioned at opposed side ends of the housing 502. The temperature control portion of the heat pumps 514 are in good thermal contact with the temperature control outer chamber walls 516, which move thermal power to or from the temperature controlled chambers 504. The temperature controlled transport system 500 comprises an electrical energy storage system 522, an electronic control/EMS 524, and an electrical connector 526 that enables electric power from an external power source (not shown) to be supplied to the heat pumps 514 and to other parts of the temperature controlled transport system 500 as required. In an example, the temperature controlled transport system 500 temperature controlled chambers 504 are at least partially thermally isolated from each other, so that each can have a degree of independent thermal control. As an example, with independent thermal control, a first temperature controlled chamber 504 can be controlled to a different temperature than a second temperature controlled chamber 504, and the material or contents 506 in the second temperature controlled chamber 504 may be heated or cooled to a second temperature prior to removal while the material or contents 506 in the first temperature controlled chamber 504, which may be adjacent to the second temperature controlled chamber 504, may be maintained at a constant temperature. These independent temperatures each may be above, at or below ambient temperature. While an example temperature controlled transport system 500 comprising has been disclosed and illustrated comprising individual temperature controlled chambers 504 capable of individual temperature control, it is to be understood that variations of configuration for achieving the same or similar purpose may exist and that such variations of configuration are intended to be within the scope of temperature controlled transport systems as disclosed herein.

Figure 6:
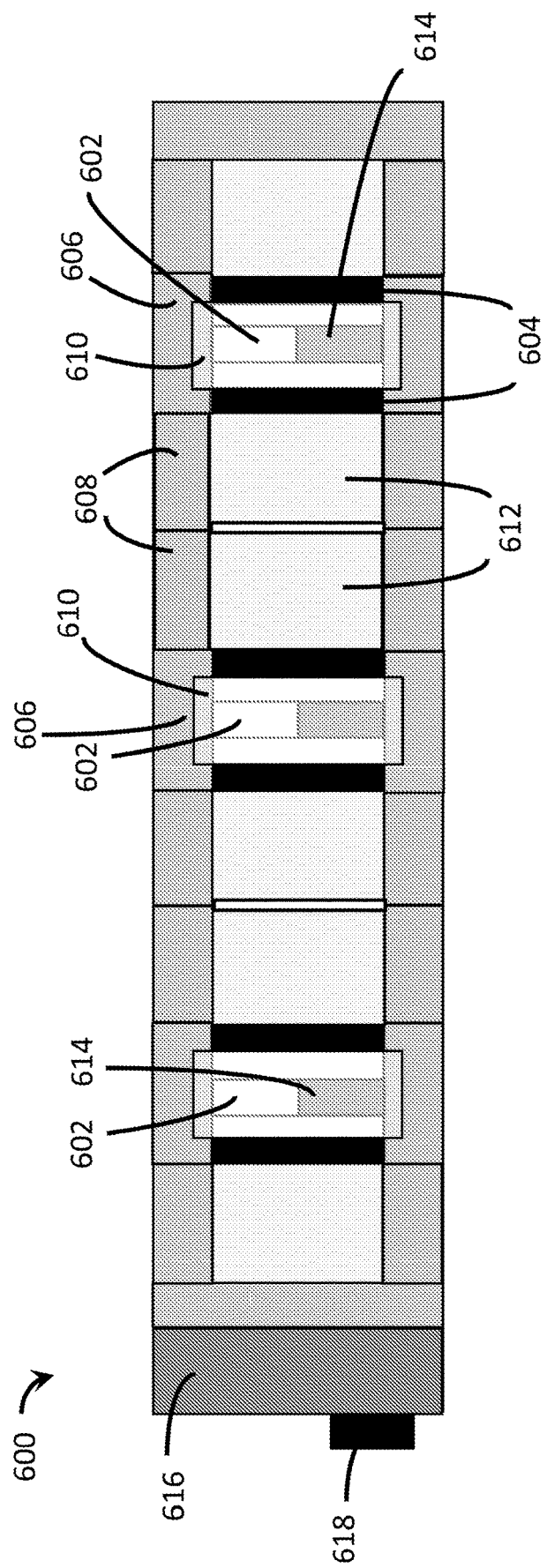
FIG. 6 is a cross-sectional side view of an eighth example temperature controlled transport system as disclosed herein.

FIG. 6 illustrates a seventh example temperature controlled transport system 600 as disclosed herein having similar general features as the temperature controlled transport system 500 of FIG. 5 disclosed above, e.g., comprising a number of individual temperature controlled chambers 602, heat pumps 604, removable sections of thermal insulation 606 and 608, removable thermal energy storage system 610, which may be on the ends of or surround temperature controlled chamber 602, and removable temperature-sensitive material or contents 614 disposed in the individual temperature controlled chambers 602. In an example, temperature controlled transport system 600 comprises removable sections of thermal insulation 606 that are positioned above or below each temperature controlled chamber 602 to facilitate removing/replacing removable temperature-sensitive materials or contents 614. In an example, the temperature controlled transport system 600 comprises removable sections of thermal insulation 608 that are positioned away from the temperature controlled chamber 602 and adjacent a thermal energy storage system 612 that is disposed under the section of thermal insulation 608 to thereby facilitate removing/replacing the thermal energy storage system 612. In an example, once a section of the desired thermal energy storage system 612 has been removed and replaced, the associated section of thermal insulation 608 removed to access the thermal energy storage system 612 is reinstalled to its original functional position. In an example, for effective operation of the temperature controlled transport system 600, the replacement thermal energy storage system 612 is preferably configured to fit in a manner providing good thermal contact with the associated heat pump 604. In an example, the temperature controlled transport system 600 may comprise more than one thermal energy storage system 612 disposed between adjacent temperature controlled chambers 602 that may be useful for providing an improved ability to maintain a desired difference in controlled temperature conditions between adjacent temperature controlled chambers 602, e.g., where the temperatures are substantially different or when a temperature-sensitive material or content 614 in one temperature controlled chamber 602 may require a temperature change not required by a temperature-sensitive material or content 614 in an adjacent temperature controlled chamber 602. In an example, the temperature control of a temperature controlled chamber 602 may be directed by an I/O feature and energy storage system 616, wherein the I/O feature 616 may comprise an electrical energy storage system 616, and wherein external electrical power may be supplied to power the heat pumps 604 by an electrical connector 618. In an example, the temperature controlled transport system 600 may be operated to change a temperature of a temperature-sensitive material or content 614 in a temperature controlled chamber 602 prior to its removal. In an example, the temperature change process may begin with identifying the specific temperature controlled chamber 602 that contains the temperature-sensitive material or content 614 to be removed and communicating a specified sample temperature prior to removal to the I/O feature 616, receiving timing information from the I/O feature 616, and receiving a message from the I/O feature 616 when the desired temperature change is completed. The temperature controlled transport system 600 may be configured to include additional thermal insulation 606 and/or 608 and/or additional thermal energy storage system 612 to help mitigate temperature-sensitive materials or contents 614 in other inner chambers from experiencing temperature change as a result of the above-described removal process. In an example, the same design concepts apply to removal and replacement of a first temperature-sensitive material or content 614 sample with a second temperature-sensitive material or content 614 in the same temperature controlled chamber 602. The first temperature-sensitive material or content 614 may have one temperature and the second temperature-sensitive material or content 614 may have a different temperature. To the extent the second temperature is within the design limits of the temperature controlled chamber 602, upon inputting storage temperature information to the I/O feature 616, the second temperature-sensitive material or content 614 may be inserted into the temperature controlled chamber 602 and temperature controlled to the desired temperature.

Figure 7:
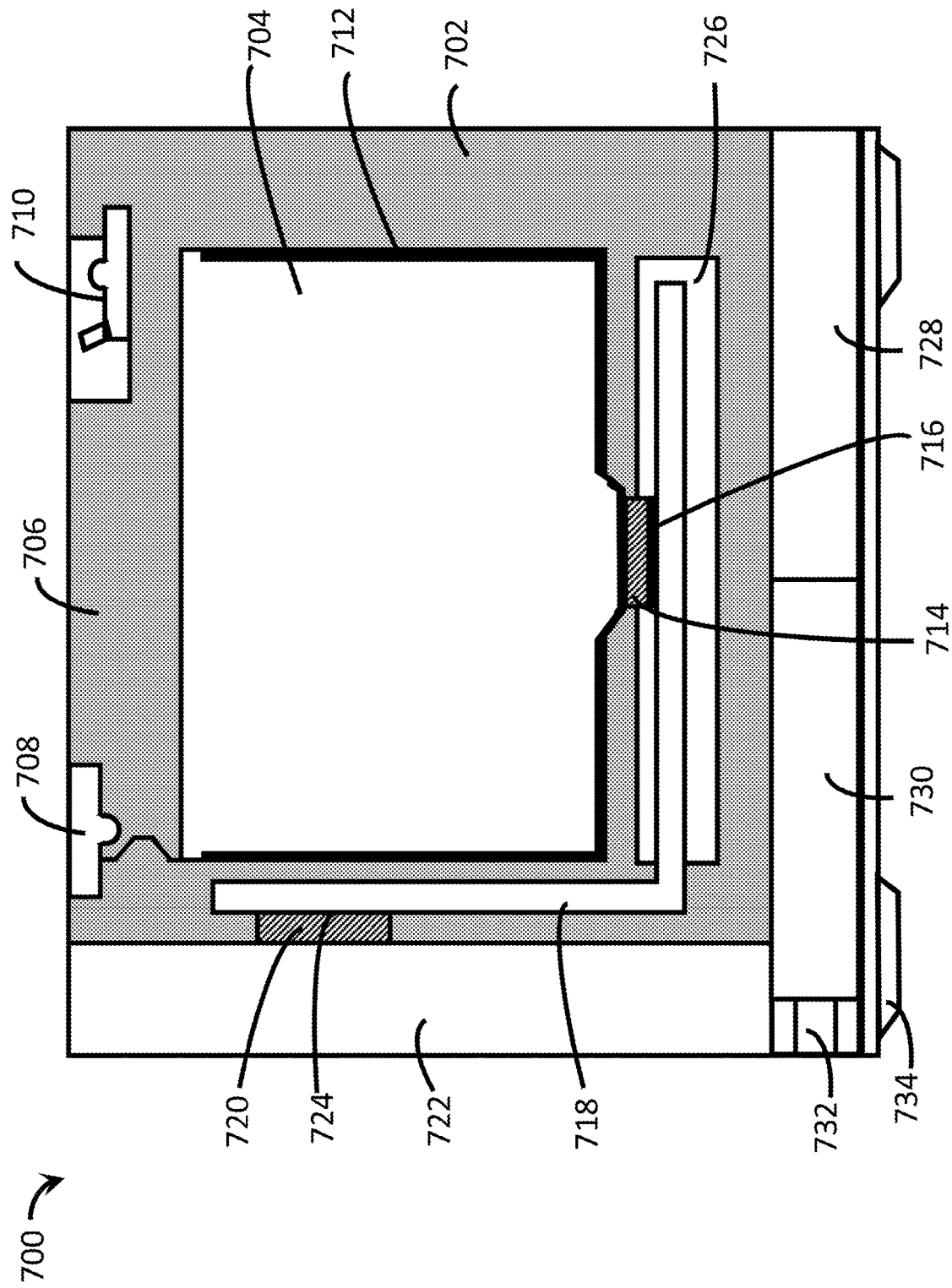
FIG. 7 is a cross-sectional side view of a ninth example temperature controlled transport system as disclosed herein.

FIG. 7 illustrates a ninth example temperature controlled transport system 700 as disclosed herein for the storage and transport of temperature-sensitive material or contents). The temperature controlled transport system 700 comprises a thermally insulated housing or body 702 extending along an outer region of the system, and a temperature controlled chamber 704 disposed within the housing and occupying an inner region of the system. In an example, a thermally insulated lid 706 is disposed over an opening in the housing 702, e.g., along a top surface of the housing 702, and may be attached to the housing by a hinge mechanism 708 to permit opening and closing of the lid 706 relative to the housing 702. A latch mechanism 710 may be used to maintain placement of the lid 706 relative to the housing 702 when the lid 706 is in a closed position, thereby sealing off the temperature controlled chamber 704. In an example, a heat spreader 712 is disposed between an inside surface of the housing 702 and the inner chamber 704. In an example, the heat spreader 712 is configured to be a heat distributor and may extend along the side surfaces and bottom surface inside of the housing 702 to transport heat to the temperature controlled chamber 704. One or more first heat pumps 714 are disposed within a cavity of the housing 702, and in an example may be positioned along a bottom portion of the housing 702 below the inner chamber 704. The heat spreader 712 is in good thermal contact with control side or surface of the heat pump 714 for temperature control of the temperature controlled chamber 704. In an example, a thermal interface material 716 is interposed between a heat rejection side or surface of the heat pump 714 that is opposite the control side of the heat pump, and a heat pipe 718. In an example, the heat pipe 718 is disposed with a region of the housing 702 that extends beneath the heat pump 714 and through thermal insulation of the housing 702 upwardly along a side wall of the housing 702. In an example, one or more second heat pumps 720 are positioned along the side wall of the housing 702 in a cavity of the thermal insulation and have a control side or surface that is in good thermal contact with the heat pipe 718. In an example, a heat sink assembly 722, e.g., formed from a thermally conductive metallic material and the like, is disposed along and outside of a side portion of the housing 702 and is in good thermal contact with the waste thermal power side or surface of the one or more second heat pumps 720. If desired, a thermal interface material 724 may be interposed between the heat sink assembly 722 and the second heat pumps 720 to ensure a desired degree of good thermal contact therebetween. In an example, the temperature controlled transport system 700 includes a thermal energy storage system 726, as disclosed in the above-described examples, that is disposed in a cavity within the housing beneath the first heat pump 714 and that is in good thermal contact with the heat pipe 718. In an example, the temperature controlled transport system 700 comprises an electrical energy storage system 728, an electronic control/EMS and I/O 730, an electrical connector 732 positioned along a bottom portion of the housing 702, and mounting elements or standoffs 734 positioned along a bottom surface of the housing 702. In an example, the general structure of the temperature controlled transport system 700 is similar to the example described above and illustrated in FIGS. 1A and 1B. The temperature controlled transport system 700 is designed having advantageous features suited for operation in multiple environments for which the combination of the heat pipe 718, thermal energy storage system 726, and electrical energy storage system 728 interact to provide uninterrupted temperature control capability, long operation times, and optimized operating efficiency.

In a first mode of operation, the temperature controlled transport system 700 contains thermally-sensitive material or contents (not shown) to be temperature controlled in an environment where external electric power is available and provides electric power through the electrical connector 732 to maintain the temperature controlled chamber 704 at the desired temperature, maintain the thermal energy storage system 726 at full thermal capacity and maintain the electrical energy storage system 728 at full electrical capacity. In this mode of operation, the first one or more heat pumps 714 control the temperature in the temperature controlled chamber 704 and convey waste heat from their heat rejection sides to the heat pipe 718. The waste heat is convected by the heat pipe 718 to the control side of second one or more heat pumps 720, and that waste heat is expelled from the system through the heat sink assembly 722. The thermal energy storage system 726 is maintained at full thermal capacity by the control side of second one or more heat pumps 720 through the heat pipe 718 pumping away any additional waste thermal power to the heat sink assembly 722 in parallel to thermal power removal from the first one or more heat pumps 714. Should external electrical power to the temperature controlled transport system 700 be interrupted, the thermal energy storage system 726 will combine with the electrical energy storage system 728 to provide temperature control capability to the first one or more heat pumps 714, and thereby not interrupt temperature control of the temperature controlled chamber 704. In an example in which the desired control of the temperature in the temperature controlled chamber 704 is below the external ambient, and the thermal energy storage system 726 is a phase change material with a phase transformation temperature between the desired temperature controlled chamber 704 temperature and ambient the orientation and the vertical length of the heat pipe 718 can be designed to prevent significant heat transport from the environment backwards through the heat sink assembly 722, the second one or more heat pumps 720 and the heat pipe 718. The vertical height between the first and second heat pumps 714 and 720, the temperature, and the fluid fill height and the wicking properties of the heat pipe 718 materials are parameters that influence the effectiveness of the design. The art for designing such performance is known to expert designers of heat pipes. In this operating state, with a loss of external electric power to the temperature controlled transport system 700 to operate the second one or more heat pumps 720, the heat pipe 718 can be designed to function/operate to isolate the second one or more heat pumps 720 from the first one or more heat pumps 714 without any added mechanical valves or other moving parts. Thus, the heat pipe 718 may be designed to eliminate an undesirable thermal leakage path in the temperature controlled transport system 700. Upon the return of external electric power, the temperature controlled transport system 700 returns automatically to its normal mode of operation.

In a second mode of operation, the temperature controlled transport system 700 is disposed in a refrigerator or a cold box (not shown) and is provided with external electric power through the electrical connector 732. If the refrigerator or cold box temperature is below the target control temperature in the temperature controlled chamber 704, the heat pipe 718 operates to greatly reduce heat transport from the refrigerator or cold box to the temperature controlled chamber 704, and thereby prevents thermal leakage (undesired cooling) through the second one or more heat pumps 720.

In a third mode of operation, the temperature controlled transport system 700 is being transported under conditions where external electric power is not available and the external temperature is above the target control temperature in the temperature controlled chamber 704, electric power is supplied to the one or more first heat pumps 714 by the electrical energy storage system 728. The thermal energy storage system 726 absorbs waste heat from the one or more first heat pumps 714. electric power may or may not be supplied to the second one or more heat pumps 720 depending on the state of charge of the electrical energy storage system 728 and the temperature of the thermal energy storage system 726. As an example, if the thermal energy storage system 726 has exhausted its thermal energy storage capacity, the temperature has begun to rise in the temperature controlled chamber 704 and there is still charge in electrical energy storage system 728, then in such instance, the electronic control/EMS and I/O 730 can be designed so that electric power can be provided to the first heat pumps 714, or electric power can be provided to the first heat pumps 714 and the second heat pumps 720 until the electrical energy storage system 726 is depleted. Generally, the combined sources of thermal and electrical stored energy produce the most cost effective and energy efficient operation as compared to eliminating the thermal energy storage system 726 and increasing the size of the electrical energy storage system 728.

Figure 8:
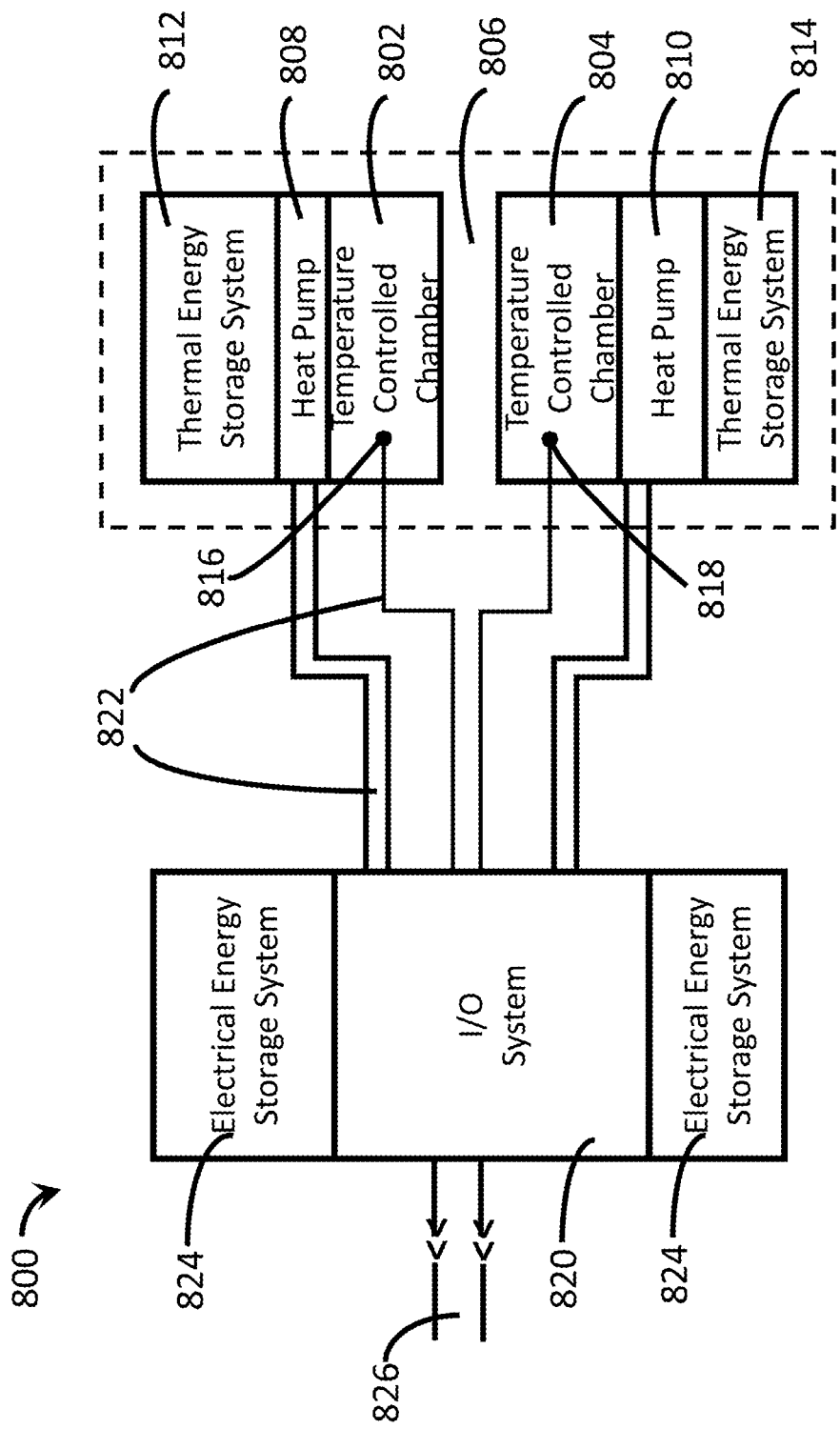
FIG. 8 is a schematic view of an example temperature controlled transport system as used with temperature controlled transport systems as disclosed herein.

FIG. 8 illustrates a schematic layout of an example temperature control system 800 comprising functional control, sensing systems, electrical power sources, and I/O for temperature controlled transport systems as disclosed herein including those depicted in FIGS. 1 through 7 and FIGS. 11 through 14 For purposes of reference and explanation, FIG. 8 is an example temperature control system 800 for a temperature controlled transport system as disclosed here comprising two temperature controlled chambers 802 and 804 that are separated from one another by thermal insulation 806. A heat pump 808 is configured and positioned to provide thermal power to control and maintain the temperature of temperature controlled chamber 802, and heat pump 810 is configured and positioned to provide thermal power to control and maintain the temperature of temperature controlled chamber 804. The heat pump 808 is in good thermal contact with a thermal energy storage system 812, and heat pump 810 is in good thermal contact with thermal energy storage system 814. The thermal energy storage systems 812 and 814 are thermally insulated from each other. The heat pumps 808 and 810 may each be made of more than one heat pump module, and the number of heat pump components comprising heat pump 808 may be different than the number of heat pump components for heat pump 810. A temperature sensor 816 is configured and positioned to monitor the temperature of the temperature controlled chamber 802, and a temperature sensor 818 is configured and positioned to monitor the temperature of the temperature controlled chamber 804. An I/O feature or system 820 receives information from the temperature sensors 816 and 818, and the temperature sensors 816 and 818, the heat pumps 808 and 810 are in electrical communication with the I/O system 820 through electrical conduits 822.

In an example temperature control system 800, the I/O system 820 is configured to function both as a power control, input/output system and as an energy management system (EMS). The I/O system 820 receives electric power from one or more electrical energy storage systems 824 and/or from an external power source 826, such as that provided from a conventional wall socket (not shown). The I/O system 820 is configured to condition electrical power to operate, e.g., separately operate, the heat pumps 808 and 810 to the certain desired control temperatures in each of the temperature controlled chambers 802 and 804, e.g., which desired control temperatures may have been input by a user to the I/O system 820 as described above. The I/O system 820 may be configured to provide state of charge and safety monitoring for the electrical energy storage systems 824. The I/O system 820 may be configured to have other capabilities, e.g., such as to receive information from external sources, and/or provide or export information on current temperature controlled chamber temperatures, location and temperature histories of temperature controlled chambers 802 and 804. I/O system 820 may have an output function configured to provide other types of information that may include, and that is not limited to, the state of charge, remaining capacity, current draw and voltage of heat pumps, estimated operating time remaining, faults related to the performance status of the above subsystems and components, tracking location information, temperature histories and periodic status reporting, and any other energy management I/O that can be collected, processed, stored, retrieved, transmitted and any other related functions known to those familiar with control, sensing, communication and monitoring systems. The I/O system 820 may be configured to provide such information remotely via wireless transmission, may be configured to provide such information via wired connection, and/or may be configured to provide such information locally by use of a display, acoustic transmission or the like mounted or other connection with the I/O system 820.

Figures 9A, 9B:
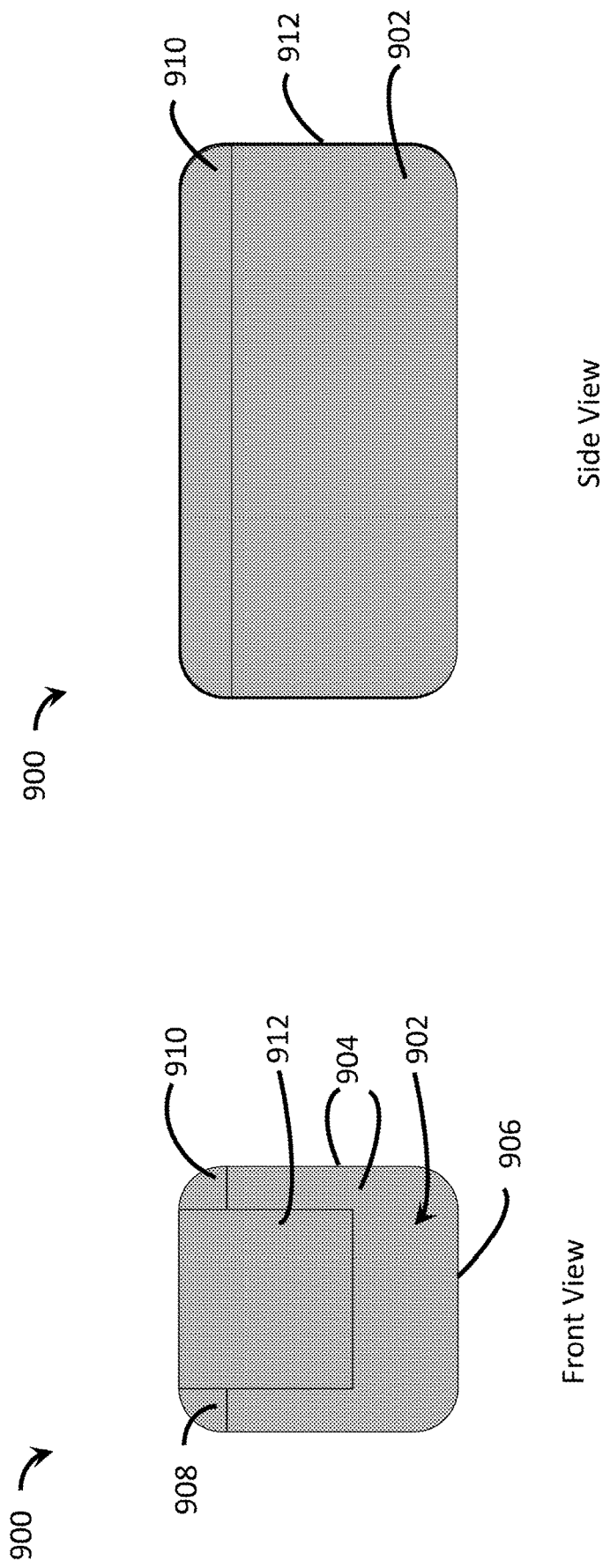
FIG. 9A is a front view of a first example temperature controlled transport storage package as disclosed herein.
FIG. 9B is a side view of the first example temperature controlled transport package of FIG. 9A.

FIG. 9A illustrates a front view of a temperature controlled package 900 as disclosed herein that is configured having a temperature controlled chamber (not shown) for containing a temperature-sensitive material or content (not shown) including and not limited to vaccines, complex organic materials, frozen specimens, living organisms, or the like. In an example, the temperature controlled package 900 may be of light weight construction and/or be compact in size. In an example, the temperature controlled package 900 is configured to utilize one or more thermal management system that is external to the temperature controlled package 900 to provide a desired controlled temperature to the temperature controlled chamber of the temperature controlled package 900 and the contents within the temperature controlled chamber. In an example, the temperature controlled package 900 and external thermal management system (not shown) may be configured to provide temperature control for small numbers of doses of vaccines or any other temperature-sensitive material disposed in the temperature controlled package 900. In an example, the temperature controlled package 900 comprises a temperature-sensitive material or content to be temperature controlled, thermal insulation to maintain an environment to keep the material at a controlled temperature, an enclosure to protect the material, and optionally a label or other indicia for identification, storage temperature, shipping instructions and for providing other pertinent information related to the materials and/or the effective handling and delivery of the materials. In an example, the temperature controlled package 900 comprises a housing or body 902 formed of a material having a desired degree of structural rigidity. In an example, the body may be formed from a material that may or may not be disposable, e.g., to accommodate a single-use application of the temperature controlled package 900. In an example, the body 902 may be formed from a foam material and the like, such as rigid foam that may also have desired insulation properties. In an example wherein the temperature controlled package 900 is to be disposable after use, the material used to form the body 902 may be biodegradable, such as biodegradable foam or the like. In an example, the temperature controlled package body 902 has a closed configuration, e.g., with closed sides 904 and a closed bottom 906, with an opening at 908 at a top end for providing access to the temperature controlled chamber 912. In an example, the temperature controlled package 900 comprises a lid or cover 910 that is configured to fit over and cover the body opening 908. The lid 910 may be made from the same or different material as the body 902. When the lid 910 is disposed over the body opening 908 it operates together with the body 902 to house and protect the temperature-sensitive material disposed therein for temperature control during storage and transportation. In an example, the temperature controlled package 900 may comprise a seal 912 that may function to secure the lid 910 to the body 902, and that may be disposed partially or completely over the lid 910 and extend over at least a portion of the body 902, e.g., along opposed closed sides 904. In an example, the seal 912 may prevent moisture penetration and may be a tamper-proof seal that becomes torn or otherwise evidences removal of the lid 910 from the body 902. In an example, the seal 912 may also function as a label providing information in the form described above. In an example, the temperature controlled package 900 may be small and light weight for delivery of medicines, vaccines and any other compact temperature-sensitive material by vehicle delivery, such as by delivery by the use of a drone or other remote-controlled delivery vehicle or device. In such type of use, the temperature controlled package 900 may be advantageously disposable, recyclable, light weight, and low cost. In an example, the temperature controlled package body 902 and lid 910 may be made from a biodegradable foam, a rigid plastic inner and outer shell with down or fiber filling, Styrofoam, or any other light weight construction/assembly that provide an effective degree of both outer protection and thermal insulation. In an example, the temperature controlled package 900 may be configured and sized as called for by a particular end-use application. In an example, such as that where the temperature controlled package 900 may be used to thermally store and transport medicines or vaccines, the body 902 may be configured having a generally square shape with equally-sized side, top, and bottom surfaces. In an example, such as that illustrated in FIG. 9A, the body 902 may have top, side, and bottom surfaces that are sized similarly of about 5 to 10 cm. While this configuration and size example temperature controlled package 900 has been provided for purposes of reference, it is to be understood that temperature controlled packages may be configured and/or sized differently than illustrated and described and that such is intended to be within the scope of temperature controlled packages as disclosed herein.

FIG. 9B illustrates a side view of the temperature controlled package 900 of FIG. 9A, comprising the body 902, the removable lid or cover 910 disposed over an opening of the body 902, and a seal and/or label 912 that is applied over a top surface of the lid 910 and to opposed sides of the body 902. In an example, the temperature controlled package 900 may be sized to accommodate a particular end-use application. For purposes of example and reference, the example temperature controlled package illustrated in FIG. 9A can have a side length of from about 5 to 15 cm, though it is to be understood that temperature controlled packages may be sized and shaped differently and that all such different sizes and/or shapes are intended to be within the scope of temperature controlled packages as disclosed herein.

Figures 10A, 10B:
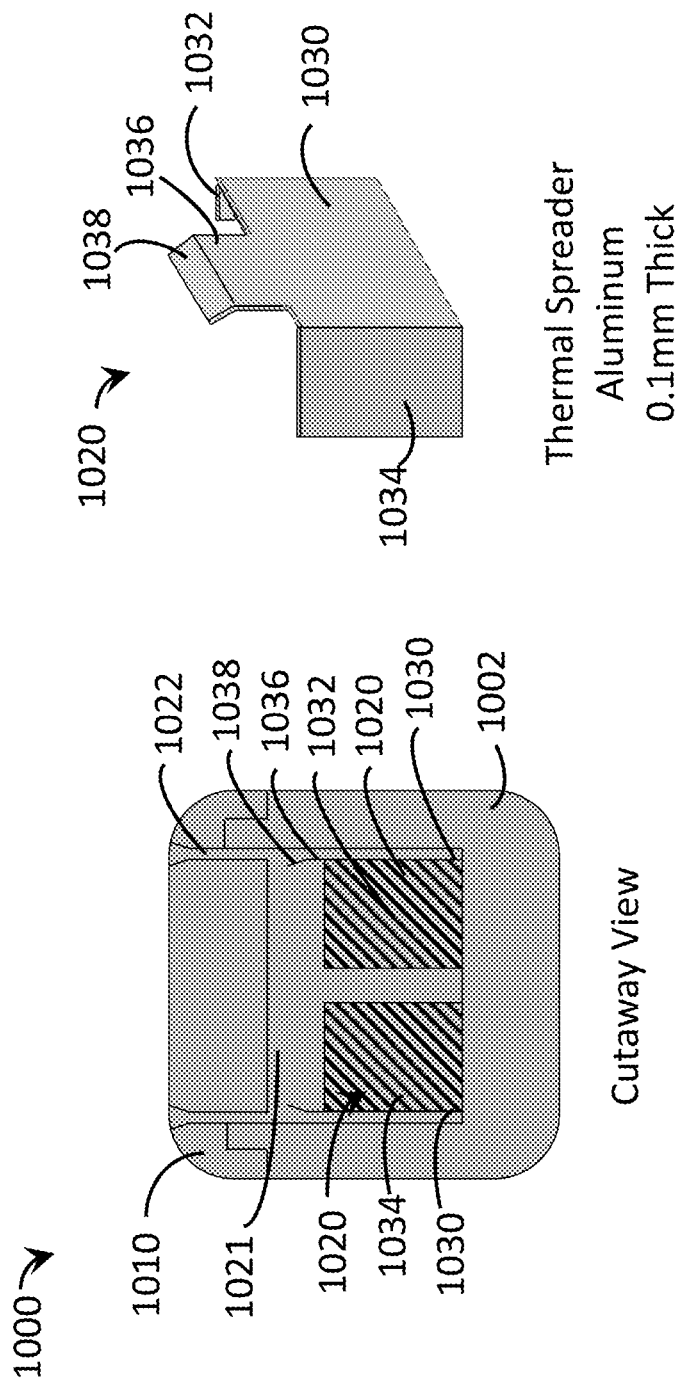
FIG. 10A is a cross-sectional front view of the first example temperature controlled transport package of FIGS. 9A and 9B.
FIG. 10B is a perspective view of an example heat spreader as used with the first example temperature controlled transport package of FIGS. 9A, 9B, and 10A.

FIG. 10A illustrates a cutaway view of the temperature controlled package 1000 as disclosed herein taken through an orthogonal section of the front view of FIG. 9A. The temperature controlled package 1000 comprises the body 1002 and the removable lid or cover 1010 disposed over an opening of the body 1002. Disposed in an inner region of the body 1002 can be one or more heat spreaders 1020 that are configured to distribute thermal power to a temperature controlled chamber 1021 disposed within the temperature controlled package 1000. In an example, the heat spreaders 1020 may be in good thermal contact with a wall surface or formed a wall surface of the temperature controlled chamber 1021, and may be configured having a surface area that is greater than a thermal transport element uses to provide the thermal energy to thereby ensure a desired degree of temperature control of the temperature controlled chamber 1021 to thereby provide a generally uniform controlled temperature controlled chamber environment. A feature of the temperature controlled package 1000 as disclosed herein is that the device or system for generating thermal power useful for providing the temperature control to the temperature controlled chamber 1021 is external from, and not itself part of, the temperature controlled package 1000. Accordingly, in an example, the temperature controlled package 1000 is configured to receive one or more thermal transport elements (not shown) configured to facilitate the transport of thermal power from an external thermal power generating device or system to an inner region of the temperature controlled package 1000 thereby providing the desired temperature control to the temperature controlled chamber 1021. In an example, the thermal transport elements may be removably inserted into the temperature controlled package 1000 to enable temperature control of the temperature controlled chamber 1021 when installed therein, and to enable removal and portability of the temperature controlled package 1000, e.g., once the temperature controlled package 1000 has been transported to a desired location, e.g., a use location for the temperature-sensitive materials or contents stored therein. In an example, the temperature controlled package 1000 may be configured comprising one or more openings or slots 1022 that extend through the lid or cover 1010 and that are configured to provide access for receiving one or more external thermal transport elements (not shown) for passing into the temperature controlled package 1000 and for making thermal contact with one or more heat spreaders 1020 disposed therein. In an example, the temperature controlled package 1000 may be configured comprising two openings or slots 1022 disposed through the lid or cover 1010 as illustrated in FIG. 10A. In an example, the openings or slots 1022 may comprise distal ends configured to ensure desired ease of registration and engagement with respective external thermal transport elements when entering the temperature controlled package 1000.

FIG. 10B illustrates an example heat spreader 1020 that is disposed in the temperature controlled package 1000 as illustrated in FIG. 10A. In an example, the heat spreader 1020 may be configured having an integral one-piece construction comprising a middle wall section 1030, and two side wall sections 1032 and 1034 extending from opposed sides of the middle wall section 1030. The heat spreader 1020 is configured in such manner so as to provide a desired spread or distribution of thermal power received from an external thermal power source to the temperature controlled chamber 1021. Configured having the three wall sections, the heat spreader 1020 enables coverage over corresponding three wall surfaces of the temperature controlled chamber 1021, to thereby provide an enhanced degree of thermal power transfer to the temperature controlled chamber 1021. In an example, the temperature controlled package 1000 may comprise two of the heat spreaders 1020 of FIG. that are oriented facing one another. With reference to FIG. 10A, the example temperature controlled package 1000 is configured comprising two of the heat spreaders 1020 illustrated in FIG. 10B. The heat spreaders 1020 are positioned opposite one another with each middle wall section 1030 facing outwardly towards opposed portions of the body 1002, and with the side wall section 1032 and 1034 of each heat spreader extending towards one another so as to surround the respective wall surfaces of the temperature controlled chamber 1021 (where one side wall section of each heat spreader 1020 is not shown in the cutaway view). In an example, the heat spreader 1020 includes a top wall section 1036 that extends outwardly from the middle wall section 1030 and that is configured having an inwardly deflected lip 1038. With reference back to FIG. 10A, the inwardly deflected lip 1038 is configured to facilitate registration and engagement of an external heat transport element passing downwardly through the slots 1022 in the lid or cover 1010 for continued downward passage to make good thermal contact with the middle wall section 1030 of the heat spreader 1020. In an example, the heat spreader 1020 is formed from a conductive material such as a metal or the like and, for a lightweight and/or disposable temperature controlled package application, the heat spreader 1020 may be formed from a light weight metal such as aluminum or the like. In a particular example, the heat spreader 1020 may be formed from aluminum having a thickness of from about 0.1 to 0.5 mm. As another example, the heat spreader 1020 may be a portion or surface of the body 1002 with good thermal conductivity such as an inner skin formed from the body construction material or a second added material with good thermal power distribution properties. While a heat spreader 1020 having a particular configuration has been disclosed and illustrated, it is to be understood that heat spreaders may be configured differently for use with temperature controlled packages as disclosed herein and that all such different configurations are intended to be within the scope of this description.

Figure 11:
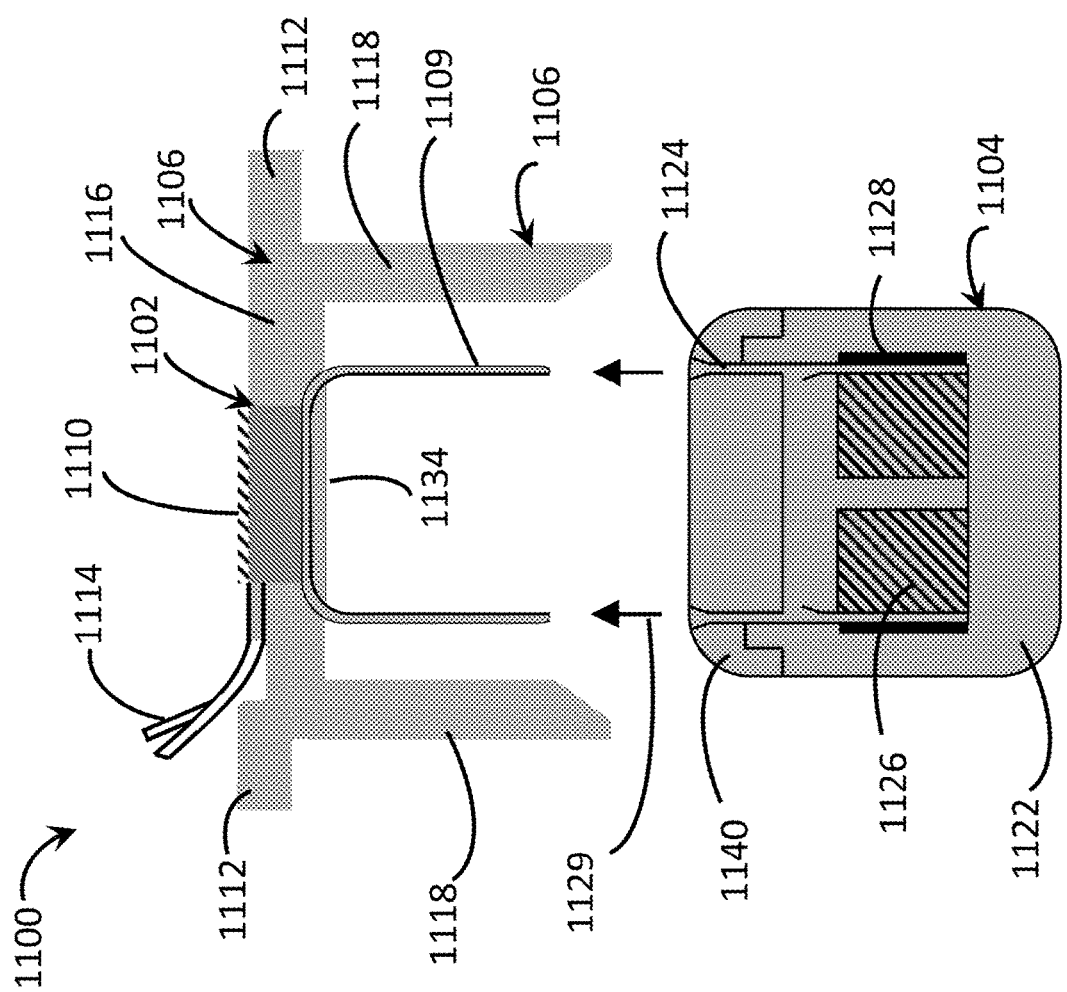
FIG. 11 is a cross-sectional front view of a first example temperature controlled transport system of FIG. 10A as used with a first example temperature controlled transport system as disclosed herein.

FIG. 11 illustrates an example modular temperature controlled transport system 1100 that is configured comprising a temperature control device 1102 (e.g., one module) that is separate from, and is configured to be removably combined with a thermal storage device or package 1104 (e.g., another module). In an example, the temperature controlled transport system 1100 can be configured to provide transportable temperature control and temperature control functions for transportable temperature controlled packages 1104, such as the temperature controlled packages described above and illustrated in FIGS. 9A, 9B, 10A, and 10B. In an example, the modular temperature control device 1102 has an outer support, or protective structure 1106 that is configured to provide mounting or attachment support to a number of different elements. In an example, the structure 1106 is configured to accommodate the mounting or attachment of one or more heat pumps 1108, one or more heat transport elements 1110, one or more heat spreaders 1109, mounting provisions 1112, and electrical connections 1114. In an example, the heat spreaders 1109 are in good thermal contact with a temperature control side/surface of the one or more heat pumps 1108, and the heat transport element 1110 is in good thermal contact with a waste thermal power rejection side/surface of the one or more heat pumps 1108. In an example, the structure mounting provisions 1112 may be configured to facilitate mounting or attaching the structure to a portion or mounting fixture of an external object, such as a vehicle or the like. As illustrated, the structure 1106 is configured to accommodate the temperature control device 1102 and related elements useful for transporting thermal power to the separate temperature controlled package 1104. In an example, the structure 1106 is configured having a first structural member 1116 to which the above-noted thermal power generating and transporting elements are attached or mounted. In an example, the structure 1106 is configured comprising a pair of second structural members 1118 that extend perpendicularly from the first structural member 1116. In an example, the second structural members 1118 are spaced apart a distance forming a docking space or port 1120 therebetween for placement of the temperature controlled package 1104 therein. In an example, the second structural members 1118 may be sized to extend from the first structural member 1118 a length or distance that is sufficient to cover at least a portion, if not a major or an entire portion, of the temperature controlled package 1104 when disposed within the docking port 1120 for receiving thermal power. In an example, the heat spreaders 1109 extend downwardly from the first structural member 1116 between the second structural members 1118.

In an example, the temperature controlled package 1104 is the same as that described above and illustrated in FIGS. 9A, 9B, and 10A, comprising a lid or cover 1140 disposed over an opening of the body 1122. The lid or cover 1140 comprises one or more slots 1124 extending through openings in the lid 1140 into the inner region of the body 1122 to the one or more heat spreaders 1126 that are in good thermal contact with an inner chamber surrounded at least partially if not completely by the one or more heat spreaders 1126. In an example, the temperature controlled package 1104 may include one or more thermal energy storage systems 1128, of the type described earlier, that may be placed adjacent and in good thermal contact with the heat spreaders 1126, e.g., against one or more wall sections of the heat spreaders 1126. The one or more thermal energy storage systems 1128, can be kept at full thermal energy capacity by being in good thermal contact with heat spreaders 1126. The thermal energy stored in thermal energy storage systems 1128, can extend temperature control for a time after the temperature controlled package 1104 is disconnected from heat spreaders 1109. The temperature controlled package 1104 is placed into position to receive thermal power from the temperature control device 1102 by moving the temperature controlled package 1104 in an upward direction 1129 towards the structure 1102 between the second structural members 1118 for entering the docking port 1120. The second structural members 1118 may have ends 1130 configured with tapered surfaces directed inwardly towards one another to assist with the engagement and registration of the temperature controlled package 1104 as it is moved towards and into the docking port 1120. As the temperature controlled package 1104 is moved upwardly into the docking port 1120, the heat spreaders 1109 engage and register with the respective slots 1124 in the lid or cover 1140. Upward movement of the temperature controlled package 1104 in the docking port 1120, or relative movement of the temperature controlled package 1104 inwardly into the docking port 1120, is continued until a top surface 1132 of the temperature controlled package lid 1140 contacts a bottom surface 1134 of the first structural member 1116 to thereby provide a physical indication that the temperature controlled package 1104 is fully disposed into the docking port 1120 such that the heat spreaders 1109 are positioned within the body inner region a desired depth to provide thermal power transfer to the heat spreaders 1126 to thereby maintain the inner chamber at a desired controlled temperature. In the event of loss of electrical power, a system malfunction, or when the temperature controlled package 1104 is removed from the docking port 1120 and separated from the temperature control device 1102, e.g., separated from the thermal power generated by the heat pumps 1108, for a time, the optional thermal energy storage system 1128 can provide thermal control and a degree of temperature stability to the temperature controlled chamber. Because of the modular design of the temperature control device 1102, e.g., heat pumps 1108, heat spreaders 1109, and other temperature control components being separate from the temperature controlled package 1104, the portion of the system not associated with thermal energy generation, that is, the temperature controlled package 1104 that may thereby be separately transportable can be very inexpensive, extremely light weight, biodegradable and disposable. In an example, the temperature controlled transport system 1100 structure 1106 may be attached to a frame member (not shown) that is in good thermal contact with parts that are capable of rejecting thermal power from the heat pumps 1108 and a temperature control system (not shown) as used to direct thermal power to the heat pumps 1108. As an example, the frame member can be part of a vehicle such as a drone or the like, a chamber in a storage facility, a temperature controlled storage chest, a delivery van storage rack, or any other object having provisions for supplying electric power and for storing packages to be dispensed. In an example, electrical power can be provided through the electrical conductors 1114 to the heat pump 1108. In an example, the power source for providing such electrical power may be from a battery, an ultracapacitor, a generator, a landline or any other suitable portable or stationary electrical power source (not shown). In one embodiment, wherein the temperature controlled transport system 1100 is configured for use with a vehicle such as a delivery drone, electric power to the heat pumps can be provided by the power source of such vehicle, e.g., a delivery drone (not shown). In an example, the temperature controlled package 1104 can be orientation-independent. Orientation-independent means that the temperature controlled transport system 1100 can be operated upside down, on its side, or in any other orientation.

Figure 12:
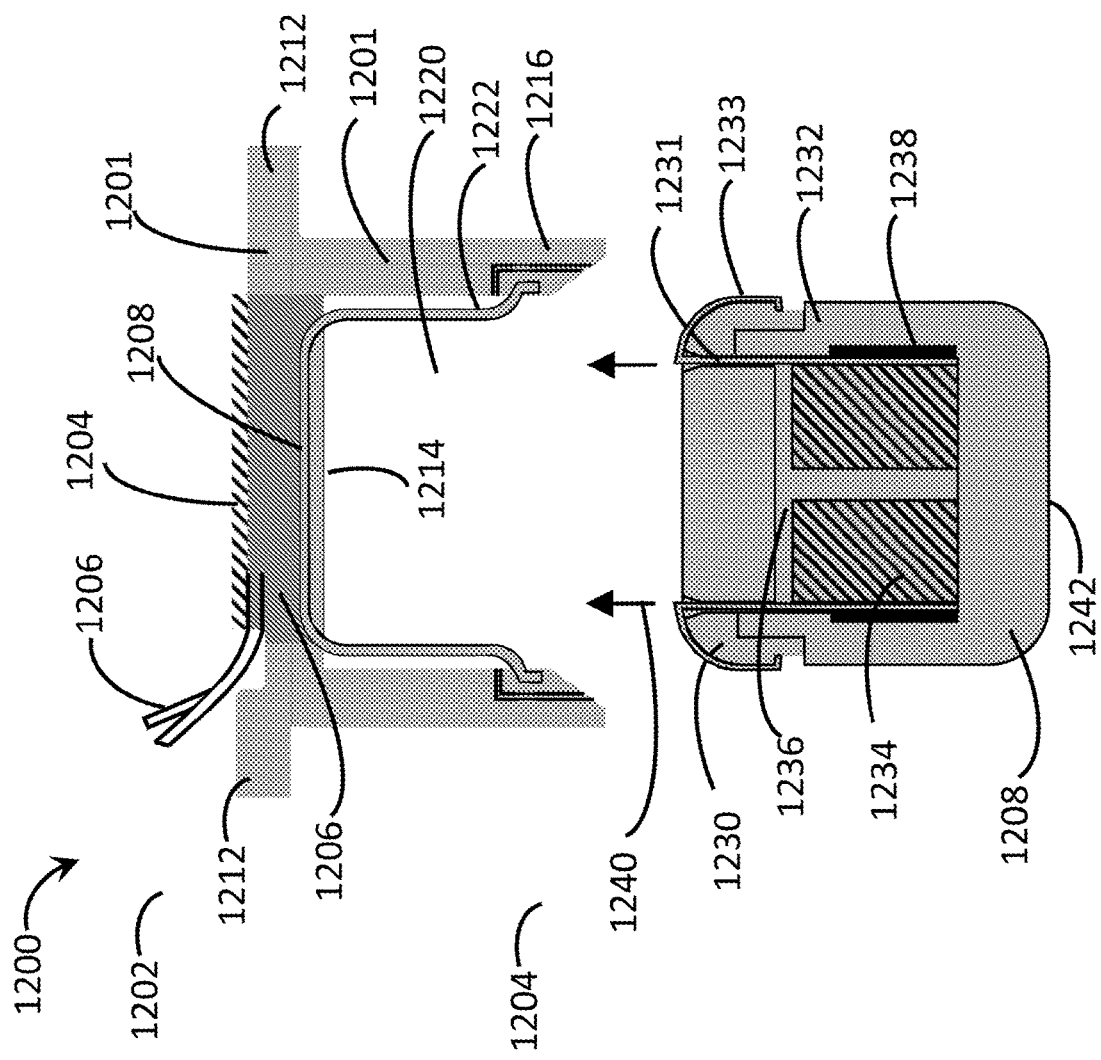
FIG. 12 is a cross-sectional front view of a second example temperature controlled transport system of FIG. 10A as used with a second example temperature controlled transport system as disclosed herein.
Figure 13:
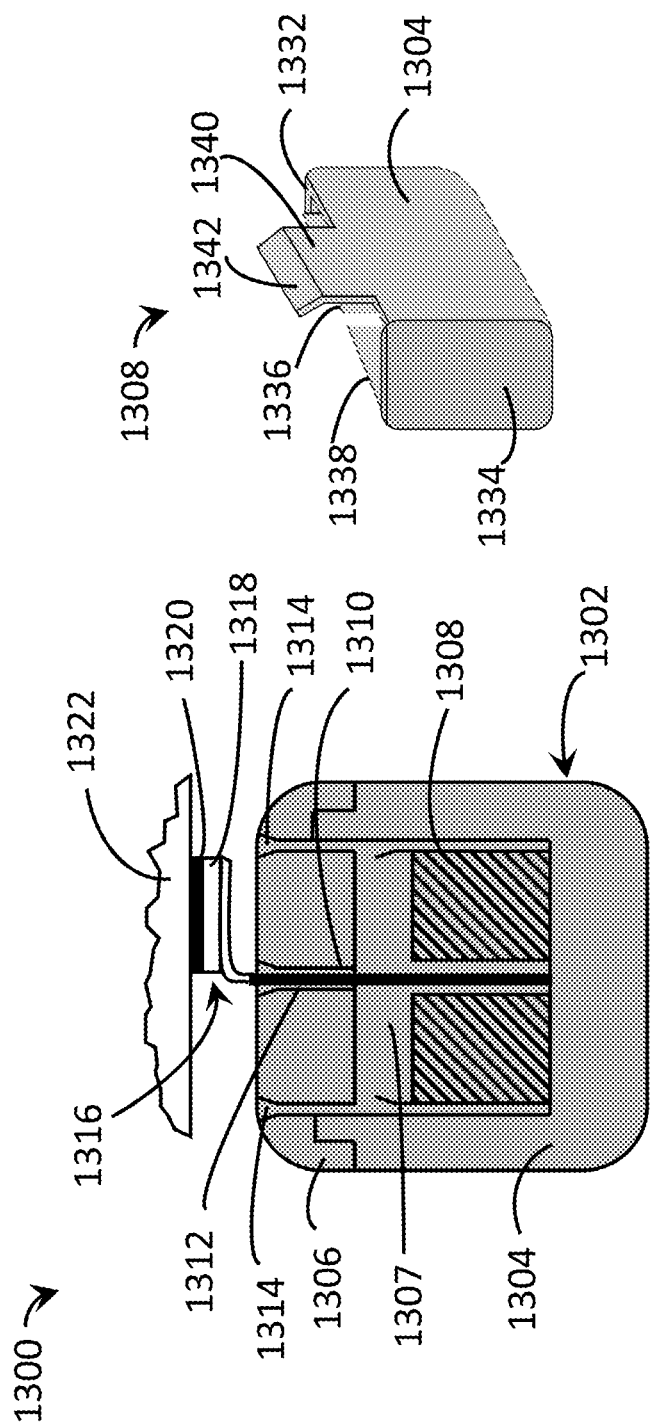
FIG. 13A is a cross-sectional front view of a third example temperature controlled transport system as used with a third example temperature controlled transport system as disclosed herein.
FIG. 13B is a perspective view of an example heat spreader as used with the third example temperature controlled transport system of FIG. 13A.

FIG. 12 illustrates an example modular temperature controlled transport system 1200 comprising a temperature control assembly or system 1202 (e.g., a first module containing a heat pump to provide thermal temperature control) that is separate from, and is configured to be removably combined with, a temperature controlled package 1204 (e.g., a second module containing material to be temperature controlled). In an example, the modular temperature controlled transport system 1200 can be configured to provide transportable temperature control and temperature control functions for transportable temperature controlled packages 1204, such as the temperature controlled packages described above and illustrated in FIGS. 9A, 9B, 10A, 10B and 11. In an example, the modular temperature controlled transport system 1200 has an outer support, or protective structure 1201 configured to provide mounting or attachment support to packages 1204 that can have a number of different shapes, lengths and control temperatures. In an example, the structure 1201 is configured to accommodate the mounting or attachment of one or more heat pumps 1206, one or more heat spreaders 1208, one or more heat transport element 1210, mounting provisions 1212, and electrical connections 1214. In an example, the heat transport element 1208 are in good thermal contact with a temperature control side/surface of the one or more heat pumps 1206, and the heat transport elements 1210 is in good thermal contact with a waste heat rejection side/surface of the one or more heat pumps 1206. In an example, the structure mounting provisions 1212 may be configured to facilitate mounting or attaching the structure to a portion or mounting fixture of an external object, such as a frame member of a vehicle or the like. As illustrated, the structure 1202 is configured to transport thermal power to the separate temperature controlled package 1204. In an example, the structure 1202 is configured having a first structural member 1201 to which the above-noted thermal power generating and transporting elements are attached or mounted. In an example, the structure 1201 is configured comprising a pair of second structural members 1216 that extend generally perpendicularly downward from the first structural member 1201. In an example, the second structural members 1216 are spaced apart a distance forming a docking space or port 1220 therebetween for placement of the temperature controlled package 1204 therein. In an example, the second structural members 1216 may be sized to extend from the first structural member 1201 a length or distance that is sufficient to cover at least a portion, if not a major or an entire portion, of the temperature controlled package 1204 when disposed within the docking port 1220 for receiving thermal power. In an example, heat spreaders 1222 are a continuation of heat transport element 1208 and extend downwardly from heat transport element 1208 of structural member 1201.

In an example, the temperature controlled package 1204 is similar to that described above and illustrated in FIGS. 10A, 10B, and 11A, comprising a lid or cover 1230 disposed over an opening of the body 1232. The lid or cover 1230 comprises one or more slots 1231 extending through openings in the lid 1230 into the inner region of the body 1232 to the one or more heat spreaders 1234 that are in good thermal contact with temperature controlled chamber 1236 surrounded at least partially if not completely by the one or more heat spreaders 1234. In an example, the temperature controlled package 1204 may include one or more thermal energy storage systems 1238, of the type described earlier, that may be placed adjacent and in good thermal contact with the heat spreaders 1234, e.g., against one or more wall sections of the heat spreaders 1234. When docked in structure 1202 and structure 1202 is controlling the temperature of heat spreaders 1234, the one or more thermal energy storage systems 1238 can be kept at full thermal energy storage capacity. The temperature controlled package 1204 is placed into position to receive thermal power from the temperature control device 1202 by moving the temperature controlled package 1204 in an upward direction 1240 towards the structure 1202 between the second structural members 1216. As the temperature controlled package 1204 is moved upward into the docking port 1220, the heat spreaders 1222 engage and register with outward folded ends of heat spreaders 1231 and 1234. Upward movement of the temperature controlled package 1204 in the docking port 1220, or relative movement of the temperature controlled package 1204 inward into the docking port 1220, is continued until the folded extensions 1233 of heat spreaders 1231 of the temperature controlled package 1204 make good thermal contact with heat spreaders 1222. In the event of loss of electrical power, a system malfunction, or when the temperature controlled package 1204 is removed from the docking port 1220 e.g., separated from the thermal power generated by the heat pumps 1206, for a time, the optional thermal energy storage systems 1238 can provide thermal control and a degree of temperature stability to the temperature controlled chamber. Because of the modular design of the temperature control device 1202, e.g., heat pumps 1206, heat transport elements 1208 and heat spreaders 1222 and other temperature control components being separate from the temperature controlled package 1204, the portion of the system not associated with thermal energy generation, that is, the temperature controlled package 1204 that may thereby be separately transportable can be very inexpensive, extremely light weight, biodegradable and disposable. As an example, the frame member can be part of a vehicle such as a drone or the like, a chamber in a storage facility, a temperature controlled storage chest, a delivery van storage rack, or any other object having provisions for supplying electric power and for storing packages to be dispensed. In an example, electrical power can be provided through the electrical conductors 1214 to the heat pump 1206. In an example, the power source for providing such electrical power may be from a battery, an ultracapacitor, a generator, a landline or any other suitable portable or stationary electrical power source (not shown). In one embodiment, wherein the temperature control system is configured for use with a vehicle such as a delivery drone, electric power to the heat pumps can be provided by the power source of such vehicle, e.g., a delivery drone (not shown). In an example, the temperature controlled package can be orientation-independent. Orientation-independent means that the temperature controlled transport system 1200 can be operated upside down, on its side, or in any other orientation.

FIG. 13A illustrates a cutaway view of a modular temperature controlled transport system 1300 comprising a temperature controlled package 1302 that is similar to that described above and illustrated in FIG. 10A. The temperature controlled package 1302 comprises a closed body 1304 having a lid or cover 1306 disposed over a body opening, and a temperature controlled chamber 1307 located in an inner region of the body 1304 that is accessible through the body opening. The temperature controlled package 1302 comprises heat spreaders 1308 that are disposed in the body inner region, and that are configured to spread or distribute thermal power to the temperature controlled chamber 1307 for purposes of providing a desired controlled temperature thereto. In an example, the lid or cover 1306 is configured comprising a slot 1310 disposed therethrough and that extends from the lid 1306 to the body inner region. Unlike the example temperature controlled package 1000 illustrated in FIG. 10A, the slot 1310 in this example is located at or near a center of the lid or cover 1306, and is configured to accept removable input of a heat transport element 1312 therein. The slot 1310 is configured to guide the heat transport element 1312 downwardly into the inner region to be in good thermal contact with the heat spreaders 1308. In an example, the temperature controlled chamber 1307 is divided into two portions and the heat transport element 1312 is configured to transfer thermal power to the heat spreaders 1308, which are configured to spread or distribute the received thermal power to the two temperature controlled chamber portions to thereby provide a generally uniform controlled temperature in the two temperature controlled chamber portions and to the temperature-sensitive materials or contents (not shown) disposed therein. If desired, the temperature controlled package 1302 may optionally comprise slots 1314 that are disposed through the lid or cover 1306 and that are configured in the manner described above and illustrated in FIG. 11A, to thereby enable flexibility of temperature controlled package 1302 use with differently configured thermal energy storage systems, e.g., one having a single heat transport element 1312 as illustrated in FIG. 13A, or one having two heat spreaders 1209 as illustrated in FIGS. 11 and 12. The temperature controlled transport system 1300 comprises a temperature control system 1316 that is separate from the temperature controlled package 1302, and that comprises one or more heat pumps 1318, wherein the thermal transport element 1312 is in good thermal contact with a control thermal power side/surface of the heat pumps 1318. A heat transport element 1320 is in good thermal contact with a waste thermal power side surface of the heat pumps 1318, and is in contact with an external heat sink 1322. In an example, the temperature controlled transport system 1300 is configured similar to that described above and illustrated in FIG. 12, wherein the temperature control system 1316 may be attached or otherwise connected to frame or other supporting structure (not shown) of an object, and wherein electric power is provided to the heat pumps 1318 by a suitable portable or fixed power source connected by electrical connectors, which electric power delivery may be controlled by an electric controller configured to provide electric power calculated to maintain the temperature controlled chamber 1307 at a desired controlled temperature. Also, the temperature controlled package 1302 is configured to be removably attached and detached from the temperature control system 1316 to thereby facilitate transportation or delivery of the temperature controlled package 1302 for use of its temperature-sensitive material or contents.

FIG. 13B illustrates an example heat spreader 1308 as described and illustrated in the temperature controlled package 1302 illustrated in FIG. 13A. Advantageously, the one or more heat spreaders 1308 may be made of low cost, low weight, high thermal conductivity material such as those described above for the heat spreader 1020 illustrated in FIG. 10B. Advantageously, the configuration of the heat spreader 1308 and of temperature controlled chamber 1307 of FIG. 13A are preferably designed so that temperature within temperature controlled chamber 1307 is uniform and the thermal power required to maintain the desired temperature is minimized for the form factor of material to be temperature controlled. In an example, like the heat spreader described above and illustrated in FIG. 10B, the heat spreader 1308 may be configured having an integral one-piece construction comprising a middle wall section 1330, two side wall sections 1332 and 1334 extending from opposed sides of the middle wall section 1330, and rear wall sections 1336 and 1338 extending from respective side wall sections 1332 and 1334. The heat spreader 1308 is configured in such manner so as to provide a desired spread or distribution of thermal power received from an external thermal power source to the temperature controlled chamber 1307. Configured having the five wall sections, the heat spreader 1308 enables coverage over corresponding five wall surfaces of the temperature controlled chamber 1307, or alternatively forms five wall surfaces of the temperature controlled chamber 1307, to thereby provide an enhanced degree of thermal power transfer to the temperature controlled chamber 1307. In an example, the temperature controlled package 1302 of FIG. 13A may comprise two of the heat spreaders 1308 of FIG. 13B that are oriented facing one another. With reference to FIG. 13A, the example temperature controlled package 1302 is configured comprising two of the heat spreaders 1308 illustrated in FIG. 13B. The heat spreaders 1308 are positioned opposite one another with each middle wall section 1330 facing outwardly towards opposed portions of the body 1302, the rear wall sections 1336 and 1338 of each heat spreader 1308 positioned adjacent one another thereby forming two temperature controlled chamber compartments, wherein the rear wall sections 1336 and 1338 of each heat spreader 1308 are positioned to be in good thermal contact with the heat transport element 1312 of FIG. 13A. Heat spreaders 1308 can also be positioned in an alternative configuration (not shown) in temperature controlled package 1302 where middle wall section 1330 of each of two heat spreaders 1308 is in direct contact with heat transport element 1312 with rear wall sections 1336 and 1338 facing outwardly towards opposed portions of the body 1302. In an example, the heat spreaders 1308 includes a top wall section 1340 that extends outwardly from the middle wall section 1330 and that is configured having an inwardly deflected lip 1342. The inwardly deflected lip 1342 is configured to facilitate registration and engagement of an external heat transport element passing downwardly through the slot 1310 in the lid or cover 1306 to facilitate use with heat transport elements 1312 similar to those illustrated in FIG. 12. While a heat spreaders 1308 having a particular configuration has been disclosed and illustrated, it is to be understood that heat spreaders may be configured differently for use with temperature controlled packages as disclosed herein and that all such different configurations are intended to be within the scope of this description.

Figure 14:
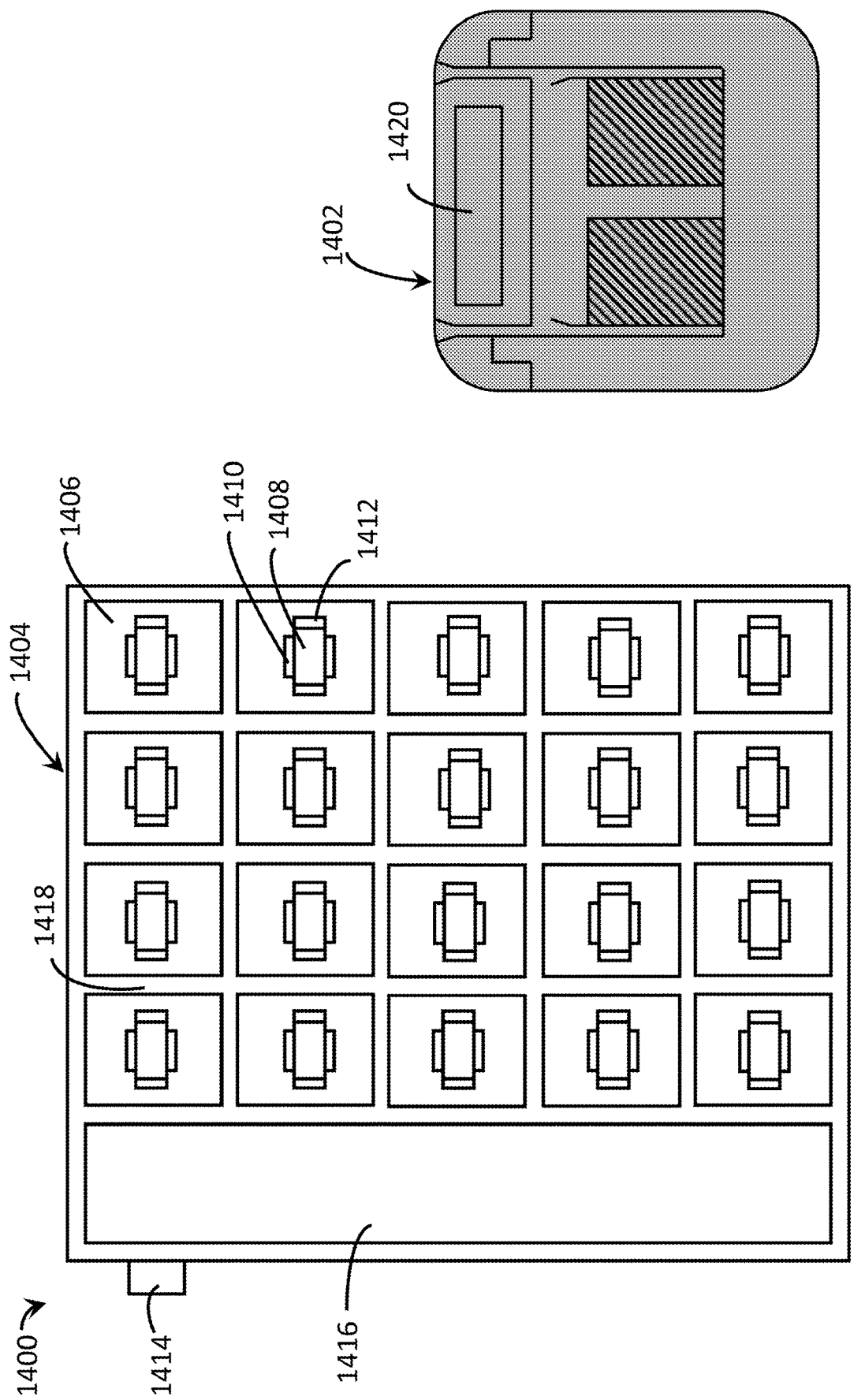
FIG. 14 is a perspective view of an example temperature controlled transport system comprising a number of individual temperature controlled transport packages such as those shown in FIGS. 11, 12 and 13A.

FIG. 14 illustrates a temperature controlled transport system 1400 that is configured to accommodate a number of individual and removable temperature controlled packages 1402. In an example, the temperature controlled transport system 1400 comprises a housing structure 1404 comprising a bank of storage compartments or drawers 1406 that may be arranged in rows and columns. Each of the storage compartments 1406 is configured to accommodate or contain the temperature controlled packages 1402. In an example, the temperature controlled packages 1402 may be the same or similar to those described above and illustrated in FIGS. 9A, 9B, 10A, 10B, 11, 12, 13A, and 13B. Each temperature controlled package 1402 may be disposed into a thermal connection port or socket 1408 of a storage compartment 1406 for the purposes of thereby connecting the temperature controlled package 1402 with a thermal power generating and transfer system for temperature control, storage and transportation of temperature-sensitive materials or contents in temperature controlled chambers of the temperature controlled packages 1402 to be temperature controlled. In an example, the connection port 1408 comprises a thermal connection to heat pumps 1410 and heat transport elements 1412 such as those described and illustrated in FIGS. 11, 12 and 13A. Electronic controls, electric power supply and heat pumps may be centrally located and in, or connected to, the housing structure 1404 or may be distributed among the storage compartments 1406. In an example, the temperature controlled transport system 1400 has an electrical connector 1414 to provide electrical power from an external electric source to the housing structure 1404 and through one or more electronic control 1416 to provide thermal and/or electrical power distribution, controls, monitoring systems, I/O systems, displays and the like as is well known to designers and users of traceable environment control systems. The electronic control 1416 also can provide electrical and/or thermal power to each temperature controlled package 1402. In an example, the temperature controlled transport system 1400 may be designed with comprehensive I/O capabilities. Each storage compartment 1406 may be either independently temperature controlled, sections of storage compartments 1406 may be independently temperature controlled, or the bank of storage compartments 1406 may be set to a specified temperature. In an example, thermal insulation 1418 and spacing may be provided between the individual storage compartments 1406 and may be designed and/or sized to achieve an appropriate degree of thermal isolation between adjacent storage compartments 1406 depending on the degree of temperature control required. In an example embodiment, the storage compartments 1406 may be provisioned and surrounded by thermal insulation 1418 that is appropriate to maintain each temperature controlled package 1402 at a temperature dependent on the specific temperature-sensitive material or content disposed in each. In an example, the temperature controlled transport system 1400 may be designed and/or configured with the ability to maintain each individual storage compartment 1406 temperature at a setpoint either above or below ambient. Temperature controlled transport systems 1400 comprising such a distributed temperature control system provides more precise temperature control over a wider range of temperatures with greater energy efficiency. In an example, each temperature controlled package 1402 is removable from the temperature controlled transport system 1400 and the related thermal control system for transport of the temperature controlled package 1402, e.g., for a next phase/leg of the package journey connected to another thermal control system for temperature control in that phase of transport. Transport may include a vehicle including a drone, plane, car, truck, van, bicycle, or any other form of delivery to its next destination. In an example, each temperature controlled package 1402 may include its own means for tracking or traceability, such as by barcode or the like, so that the thermal control system for temperature control in that phase of transport may identify the temperature controlled package 1402 and provide package temperature profile, temperature setpoints, package destination, package contents, tracking information, humidity, and any other pertinent information useful for the package's journey.

Figure 15A:
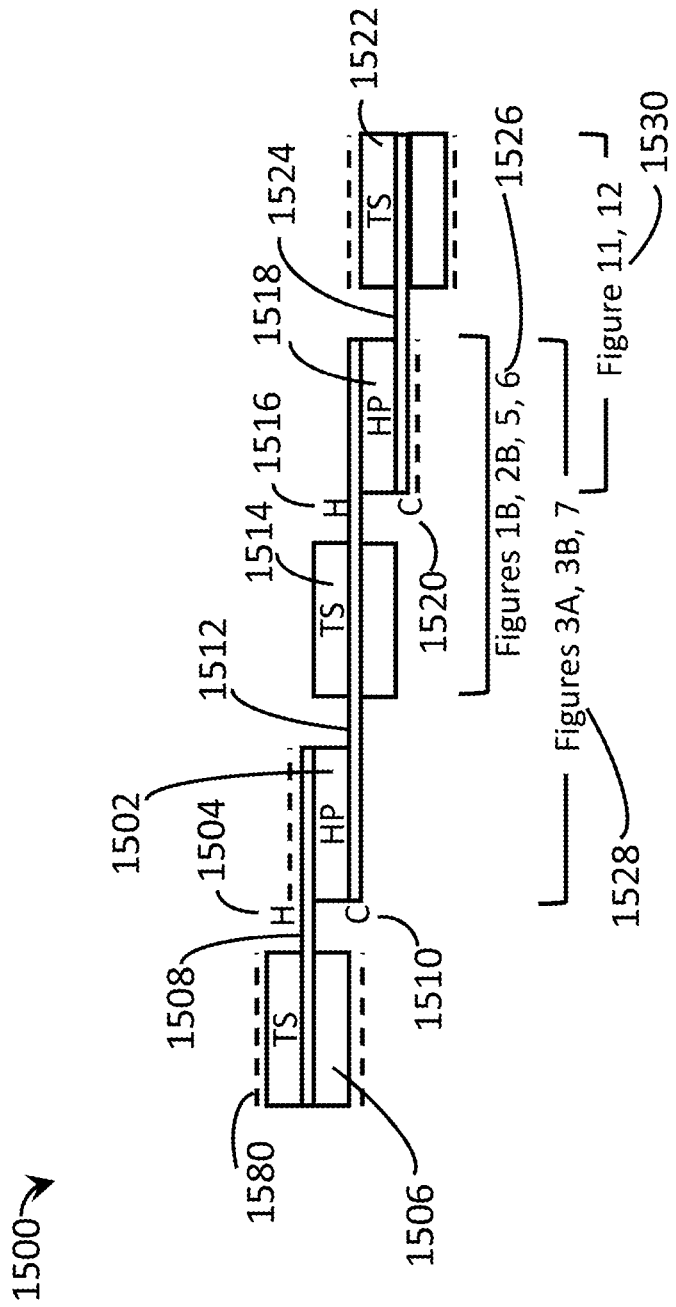
FIG. 15A is a schematic view of a first example arrangement of heat pumps, thermal energy storage system, and heat transport elements as used with example temperature controlled transport systems and devices as disclosed herein.
Figure 15B:
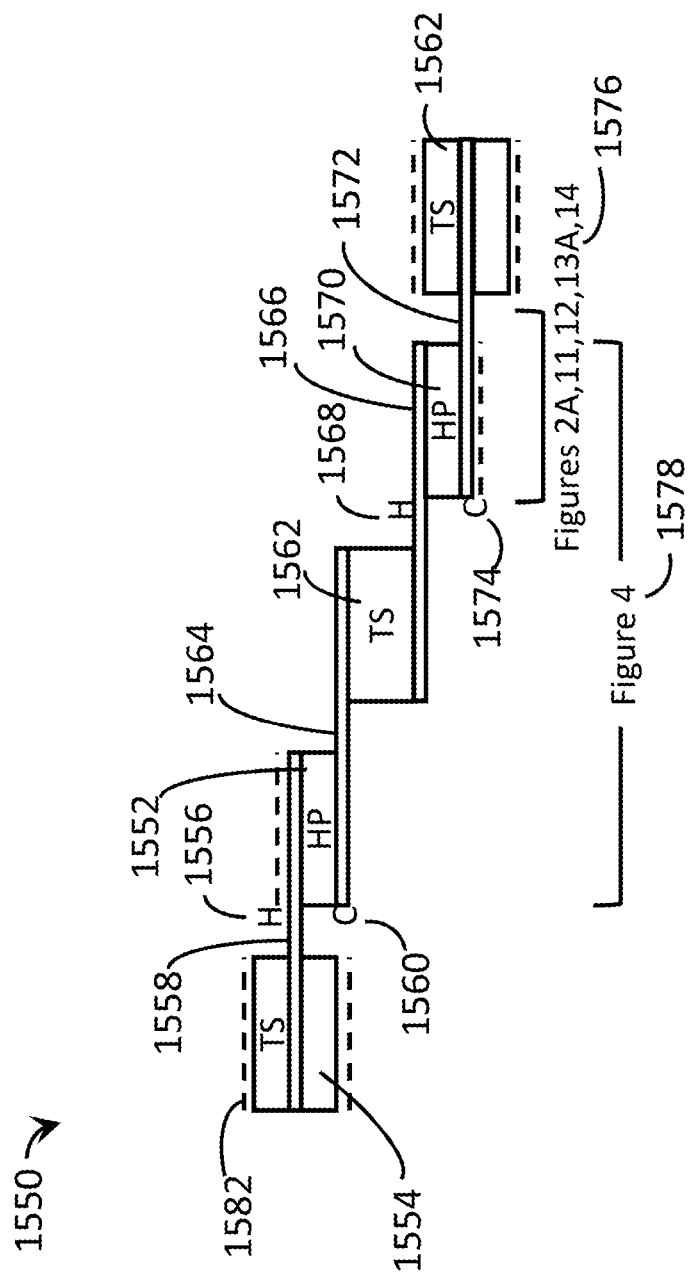
FIG. 15B is a schematic view of a second example arrangement of heat pumps, thermal energy storage system, and heat transport elements as used with example temperature controlled transport systems and devices as disclosed herein.

FIG. 15A is a schematic representation 1500 of combinations of heat pumps, heat transport members (which may be heat transport elements, heat spreaders, and heat pipes), and thermal energy storage system (or thermal energy storage medium) for which heat pumps and thermal energy storage system are thermally in a series-parallel relationship. Particular combinations of thermally-linked heat pumps, heat transport members and thermal energy storage systems are beneficial and depend on the function and environment in which temperature controlled chambers are designed to operate. Shown is a representative compilation of some but not all possible structures. FIGS. 15A and 15B depict combinations and configurations of heat pumps, heat transport members, and thermal energy storage system not shown in FIGS. 1 to 7, and 9 to 14 that are intended to be part temperature controlled transport systems and/or devices as disclosed herein. For example, configurations that involve multiple heat pumps and/or heat transport members and/or thermal energy storage system are not shown but are intended to be part of temperature controlled transport systems and/or devices as disclosed herein.

With reference to FIG. 15A, schematic representation 1500 depicts a heat pump 1502 thermally connected to thermal energy storage system 1506. The waste heat rejection side 1504 of the heat pump 1502 is connected to the thermal energy storage system 1506 by a heat transport member 1508. A temperature control side 1510 of the heat pump 1502 is connected to a heat transport member 1512, a thermal energy storage system 1514, and a waste heat rejection side 1516 of a heat pump 1518. Similarly, a temperature control side 1520 of the heat pump 1518 is connected to a thermal energy storage system 1522 through a heat transport member 1524. The heat transport members 1508, 1512, and 1524 make good thermal contact with the sides/surfaces of the heat pumps and the thermal energy storage system they connect with. Configuration 1526 is an example design that may be used in the example temperature controlled transport systems described above and illustrated in FIGS. 1B, 2B, 5, and 6. Configuration 1528 is an example design that may be used in the temperature controlled transport systems described above and illustrated in FIGS. 3A, 3B, and 7. Configuration 1530 is an example design that may be used in the temperature controlled transport system described above and illustrated in FIGS. 11 and 12.

FIG. 15B shows a similar schematic representation 1550 of thermally-linked combinations of heat pumps, heat transport members, and thermal energy storage system (or thermal energy storage medium). Shown is this schematic representation 1550 is a second compilation of possible structures. Those combinations that may relate to one or more of the specific configurations of temperature controlled transport systems and/or devices as illustrated in FIGS. 1 to 7, and 9 to 14 are identified therein. In an example, the illustrated in FIG. 15B have a series relationship between the heat pumps and the thermal energy storage system as opposed to the series-parallel relationship depicted in FIG. 15A. Schematic representation 1550 depicts a heat pump 1552 connected to a thermal energy storage system 1554. A waste heat rejection side 1556 of the heat pump 1552 is connected to the thermal energy storage system 1554 through a heat transport member 1558, and a temperature control side 1560 of the heat pump 1552 is connected to a thermal energy storage system 1562 by a heat transport member 1564. A heat transport member 1566 connects a waste heat rejection side 1568 of a heat pump 1570 to thermal energy storage system 1562. A heat transport member 1572 connects a temperature control side 1574 of the heat pump 1570 to a thermal energy storage system 1562.

In an example, configuration 1576 is an example design that may be used in the thermally controlled transport system as described above and illustrated in FIGS. 2A, 11, 12, 13A, and 14. In an example, configuration 1578 is an example design that may be used in the thermally controlled transport system described above and illustrated in FIG. 4.

For purposes of explanation and reference, FIGS. 15A and 15B depict limited example variations of thermally-linked configurations of heat pumps, thermal connections among heat exchangers, heat transport members and thermal energy storage system. Nevertheless, it is intended within the scope of temperature controlled transport systems as disclosed herein that the various heat exchangers and thermal energy storage system may be positioned in locations not explicitly shown in FIGS. 15A and 15B if they are thermally connected along the same heat transport members. As an example, the temperature controlled transport system 700 illustrated in FIG. 7 depicts thermal energy storage system 726 as connected to heat pipe 718 at three locations; on the left, directly under, and on the right of heat pump 714. Similarly, in FIG. 15A, all of the horizontal portion of heat transport member 1512 is a very good thermal conductor, thus thermal connections anywhere along the length of heat transport member 1512 create equivalent thermal pathways and therefore are functionally equivalent to the description of the heat pipe 718 in FIG. 7. Since operating conditions exist for which the vertical portion of heat pipe 718 has performance that deviates from the condition that thermal transport media are very good thermal conductors, this unusual property of heat pipes is explained in the description of the temperature controlled transport system 700 illustrated in FIG. 7 so as not to confuse this case with the general properties of heat transport members.

FIGS. 15A and 15B do not show explicitly the location of heat spreaders, heat collection and rejection fins and the like in relation to heat transport members, heat pumps, and thermal energy storage system. Nevertheless, dashed lines 1580 and 1582 show typical locations of heat transport members that may be configured in the form of either heat spreaders, heat collection and/or rejection fins. Specific examples described above and illustrated in FIGS. 1 to 7, and 9 to 14 may show specific locations, but the examples are sufficient to allow a design engineer to use the design principles shown in FIGS. 15A and 15B to develop other related connections among the functional parts as appropriate, wherein all such related connections are understood to be within the scope of the temperature controlled transport systems and thermal generating and storage systems as disclosed herein.

Figure 16:
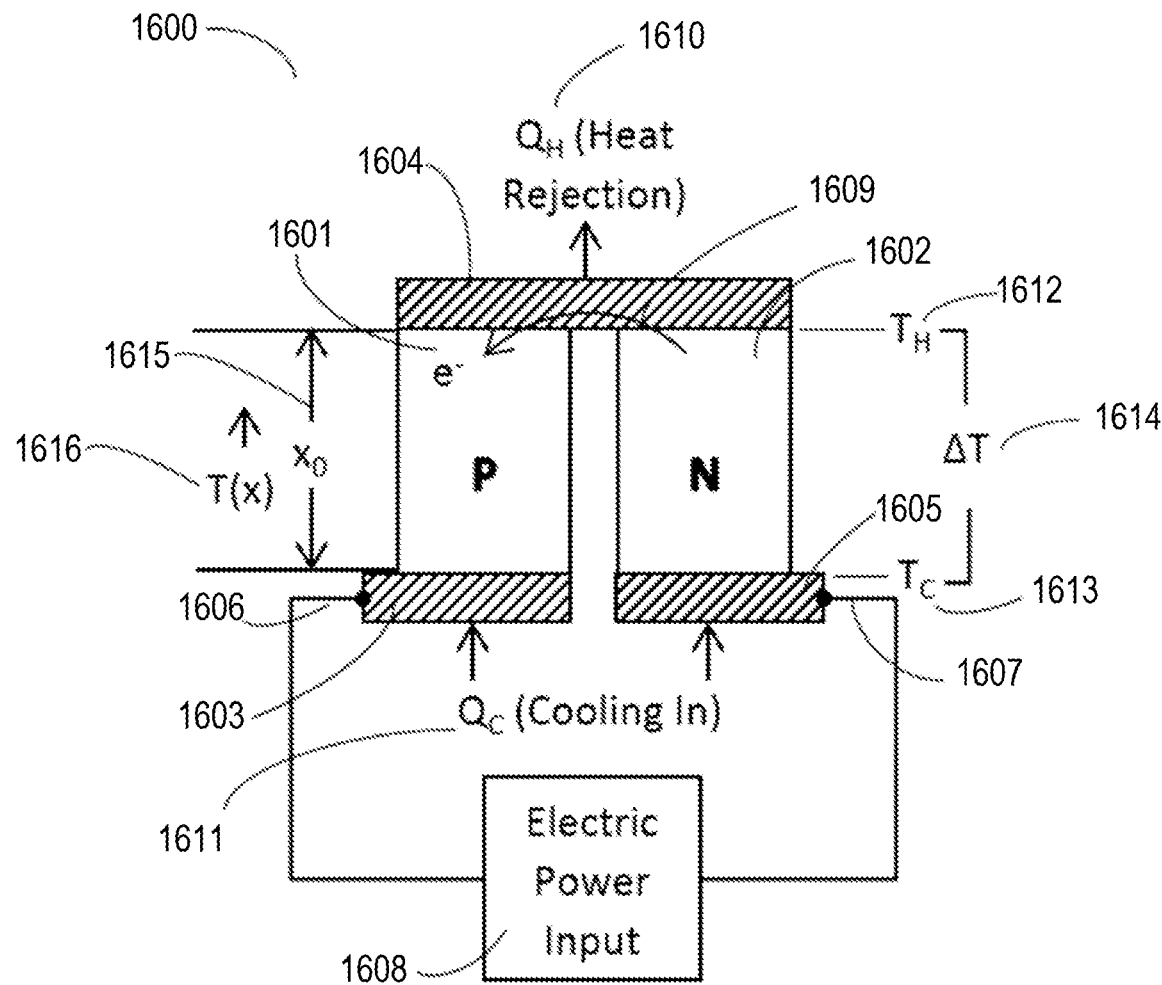
FIG. 16 schematically illustrates an example thermoelectric (TE) couple.

Additionally, as provided herein, to design more efficient and higher capacity thermoelectric (TE) systems, it may be advantageous to develop a more comprehensive description of the processes and properties that affect TE device performance than previously available. As background, FIG. 16 schematically illustrates an example CTE couple 1600 including a p-type element 1601, and n-type element 1602, cold side electrodes 1603 and hot side electrode 1604. A power supply 1608 connected to cold side electrodes 1603 at position 1606 and position 1607 produces an electron flow 1609 in the direction indicated when voltage is applied. The elements each have a length $x_0$ 1615. When TE system 1600 is in operation, the hot side is at temperature Tx 1612 and the cold side at a temperature $T_C$ 1613, at a temperature differential DT 1614, produce temperature profile T(x) 1616 within the legs 1601 and 1602 and extract thermal power $Q_C$ 1611 at the cold side and reject heat $Q_H$ 1610 at the hot side.

TE system 1600 is the basic model used herein to describe CTE and DTP TE systems.

To address factors affecting performance that extend beyond the design and computational models that are used in traditional CTE TE system design, newly developed comprehensive basic equations that govern DPT TE system design are provided herein. Solutions to these equations are employed to develop the design of new DTP TE devices with improved performance. Throughout the discussion that follows, the performance of the new DTP TE systems is compared to that of the CTE designs taught in the literature and in commercial product application notes.

In some examples, the present DTP thermoelectric system designs are based on new material design considerations that are believed to be fundamentally different than those produced using CTE material system designs.

The underpinnings of TE device performance improvements may be best understood by considering the fundamental one-dimensional transport equation that governs performance of a thermoelectric device:

$$\frac{d}{dx}\left[\lambda(x)\frac{dT(x)}{dx}\right] - T(x)j(x)\frac{dS(x)}{dx} = -j(x)^2\rho(x). \quad (1)$$

Figure 17:
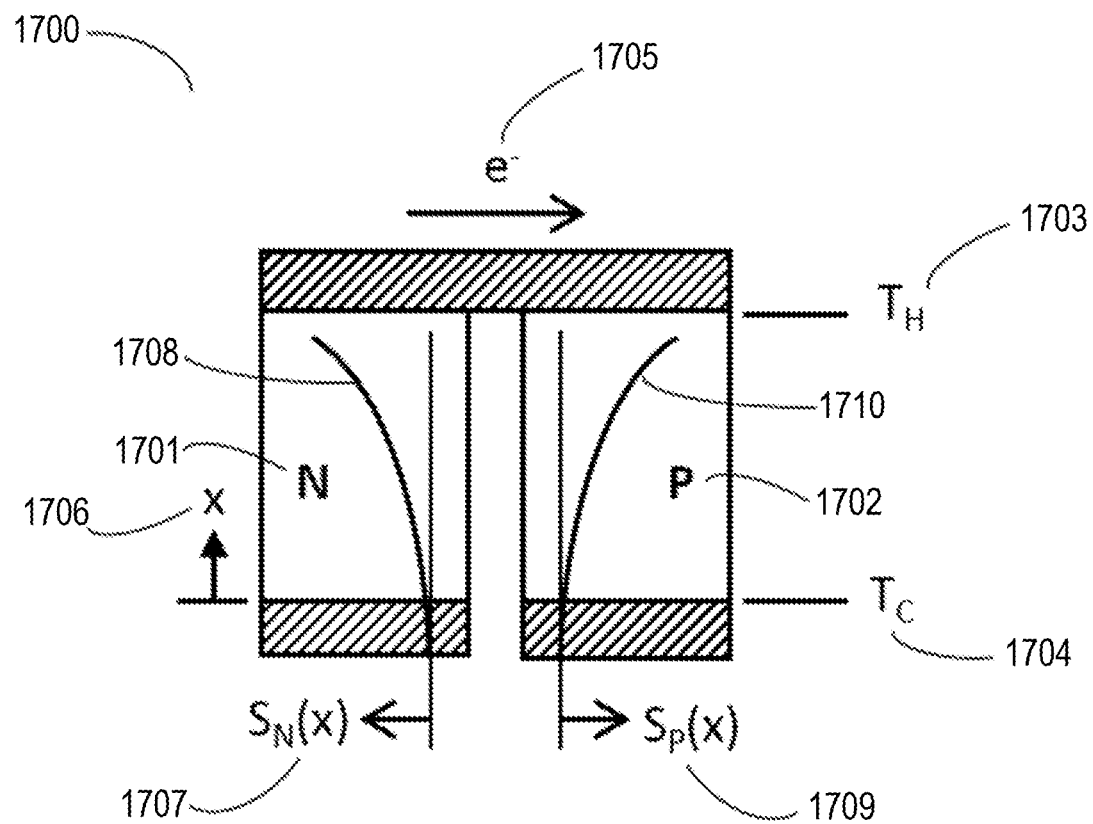
FIG. 17 schematically illustrates an example magnitude of the Seebeck coefficient as a function of distance in the direction of current flow for an example distributed transport property (DTP) TE element.

In equation 1, x is the primary direction of current flow (as distinguished from other, e.g., diffusive, directions of current flow), $\lambda(x)$ is the TE material thermal conductivity which can vary with position x, T(x) is the temperature in the TE element as a function of x, j(x) is the current density, S(x) is the Seebeck coefficient as a function of x, and $\rho(x)$ is the electrical resistance as a function of x. FIG. 17 schematically illustrates an example DTP TE couple 1700 including TE elements 1701 and 1702, a hot side Tx 1703, a cold side $T_C$ 1704 and electron flow 1705. Position x 1706 is the distance from the cold side $T_C$ 1704. In this example, for explanatory purposes, both the n-type TE element 1701 and the p-type element 1702 are assumed to be of equal length and constant width and thickness. Here, and in the remainder of this analysis (unless stated otherwise), properties vary only with x. For nonlimiting example configurations for DTP TE couple 1700, see International Patent Application No. PCT/US2020/016247, filed on Jan. 31, 2020 and entitled "Thermoelectric Elements and Devices with Enhanced Maximum Temperature Differences Based on Spatially Varying Distributed Transport Properties," the entire contents of which are incorporated by reference herein. In some examples, DTP TE couple 1700 may be used in heat pump systems such as described in greater detail elsewhere herein, e.g., with reference to FIGS. 1 to 15.

In CTE TE systems, the same TE material is used throughout each TE element length. Thus, the Thompson term, T(x)j(x)dS(x)/dx in Equation (1) becomes zero since S, the Seebeck coefficient for the same material, is constant and does not change with position x. Since uniform properties are assumed in nearly all current textbooks and supplier literature that cover TE device design, in presentations where TE equations are derived, the Thompson term does not appear in the initial equation. See, for example Angrist, Direct Energy Conversion, 4th ed., Boston: Allyn and Bacon, Inc. (1982), the entire contents of which are incorporated by reference herein. The resulting simpler expressions for COP, Max DT, temperature profile and other derived expressions used herein are called CTE solutions.

In the DTP governing equations provided herein, the Thompson term is retained, and transport properties are changed in the primary direction of current flow x in accordance with advantageous design rules that result from the more comprehensive DTP formulation. These newly presented equations form the basis for a more complete and useful set of solutions to Equation (1), and the solutions to these equations provide for and enable designs that increase device performance.

If the terms in equation (1) are rearranged, when current flows, the Thompson term and the Joule heating term are seen to partially offset each other:

$$\frac{d}{dx}\left[\lambda(x)\frac{dT(x)}{dx}\right] - T(x)j(x)\frac{dS(x)}{dx} + j(x)^2\rho(x) = 0. \quad (2)$$

The Thompson term is a linear function of current density, j, while the Joule heating term contains current density squared ($j(x)^2\rho(x)$), so it may be understood that these terms completely offset one another at each location, x, at zero current density and at a non-zero value of current density. The terms will partially offset each other at all other current densities.

As provided herein, the Thompson term magnitude may be chosen (subject to physical material limitations) to offset the Joule heating term, and/or to optimize COP, and/or to optimize any other desired operating metric or combination of desired operating metrics. Subject to constant ZT throughout the TE element, where ZT refers to the thermoelectric figure of merit (ZT=S²/(λρ), the optimum performance may be achieved in DTP systems when, at optimum TE efficiency, the temperature profile within the TE element is:

$$T(x) = T_C\left(\frac{T_H}{T_C}\right)^{\frac{x}{x_0}} = T_C e^{D\frac{x}{x_0}} \quad (3)$$

where $T_C$ is the cold end temperature, $T_H$ is the hot end temperature, $x_0$ is the TE element length, and $$D = \ln\left(\frac{T_H}{T_C}\right)$$

and the transport properties. S(x), λ(x), and ρ(x) continuously vary with position along the element length in the following fashion:

$$S(\varepsilon, x) = S_C e^{A(\varepsilon)\frac{x}{x_0}} \text{ where } A(\varepsilon) = \frac{ZT\varepsilon^2 + \ln^2\left(\frac{T_H}{T_C}\right)}{ZT\varepsilon - \ln\left(\frac{T_H}{T_C}\right)} \quad (4)$$

$$\lambda(\varepsilon, x) = \lambda_C e^{B(\varepsilon)\frac{x}{x_0}} \text{ where } B(\varepsilon) = \frac{ZT\varepsilon^2 + \ln^2\left(\frac{T_H}{T_C}\right)}{ZT\varepsilon - \ln\left(\frac{T_H}{T_C}\right)} \quad (5)$$

$$\rho(\varepsilon, x) = \rho_C e^{C(\varepsilon)\frac{x}{x_0}} \text{ where } C(\varepsilon) = \frac{\varepsilon + \ln^2\left(\frac{T_H}{T_C}\right)}{1 - \frac{\ln\left(\frac{T_H}{T_C}\right)}{ZT\varepsilon}}. \quad (6)$$

As provided herein, the temperature profile presented in Equation (3) may be used to design and implement the optimum profile within a TE element with constant ZT. Also, Equations (4), (5) and (6) may be used in the thermoelectric element design, for example to select appropriate material properties within the thermoelectric leg that change in the direction of current flow that provide as close to optimal of a solution to these equations, within the constraints of real-world material systems, cost constraints, and the like, as noted elsewhere herein.

FIG. 17 schematically illustrates a notional indication of example (e.g., optimum) Seebeck profiles 1708 and 1710 as a function of distance from the cold end 1704. In some examples, the thermal conductivity and electrical resistivity may have a similar profile form, that is, they increase smoothly in magnitude in a nonlinear fashion toward the hot end 1703.

Figure 18:
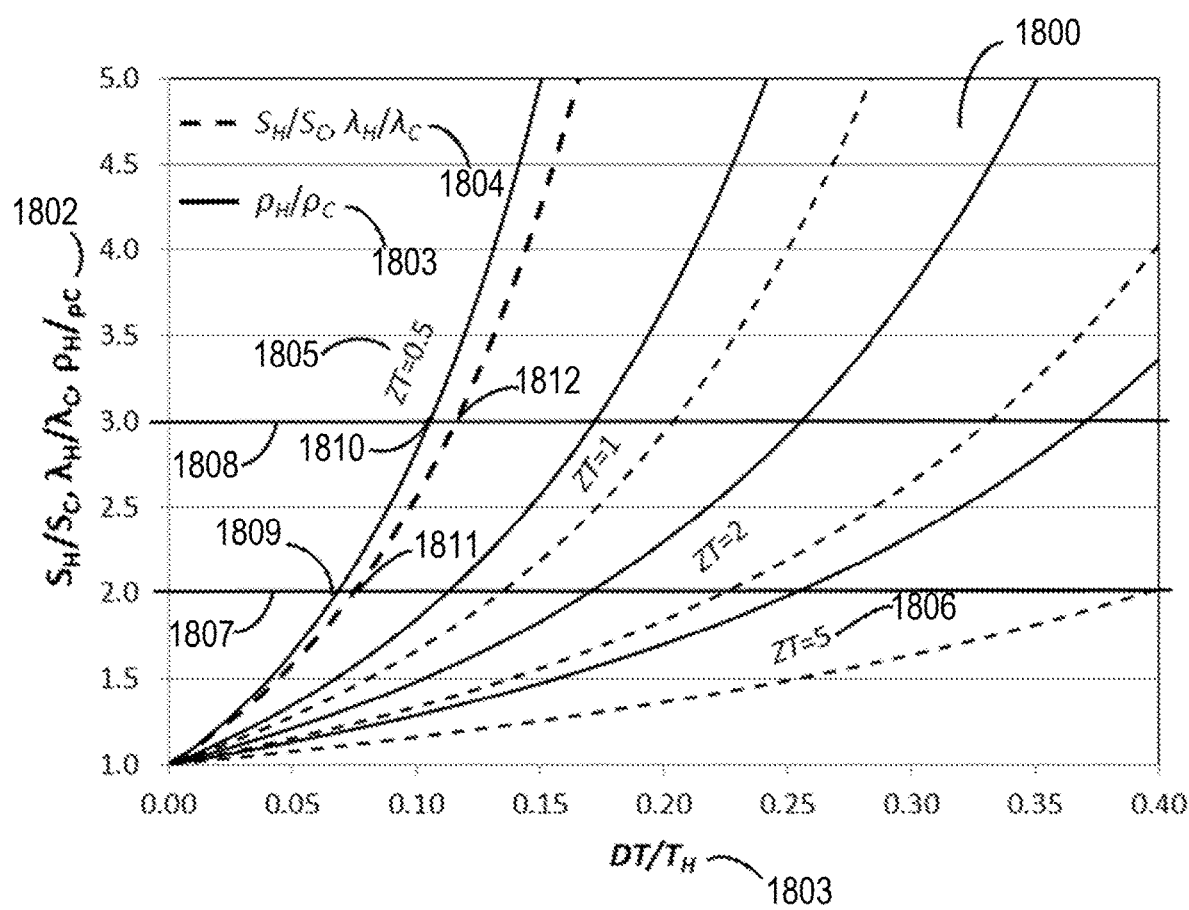
FIG. 18 is a plot of the variation of Seebeck coefficient, thermal conductivity, and electrical resistivity in the direction of current flow in example DTP TE elements as a function of DT/TH.

FIG. 18 is a plot of the variation of Seebeck coefficient, thermal conductivity, and electrical resistivity in the direction of current flow in example DTP TE elements as a function of DT/$T_H$. More specifically, FIG. 18 presents a graph 1800 of the ratio of transport properties at the hot to cold ends derived from Equations (4), (5) and (6). In FIG. 18, the horizontal axis 1803 is DT/$T_H$ the ratio of hot side to cold side temperature differential (DT) to the hot side temperature ($T_H$). The vertical axis 1802 are the ratios of each of the hot to cold side for each of the three transport properties. The ratios 1804 for Seebeck coefficient and thermal conductivity are the same. The ratio for electrical resistivity 1803 is lower. Ratios are presented for several example values of ZT ranging from ZT=0.5 (curve 1805) to ZT=5.0 (curve 1806). Horizontal line 1807 indicates at a ratio of 2.0, and represent the ratios obtainable for some example TE material systems. As an example, horizontal line 307 intercepts ZT curve 1805 at a resistivity ratio 1803 at point 1809. Thus subject to a maximum obtainable resistivity ratio of 2.0, the maximum DT/$T_H$ 1803 for which optimum DTP performance can be realized is about 0.07. Similarly, ZT=0.5 1805 intercepts horizontal line 1808 at point 1810, and thus for a realizable resistivity ratio 1803 of 3.0, the maximum DT/$T_H$ 1803 for which optimum TE performance can be realized is about 0.11. Other limitations result from corresponding realizable transport ratios 1804 at points 1811 and 1812. To fully express the capability of DTP and achieve a hypothetical optimum performance, all three transport properties must follow these relationships. Therefore, in producible (real-world) TE systems, the transport properties of TE designs should approximate the ideal DTP values as closely as production and material considerations, cost, and usage may allow.

Figure 19:
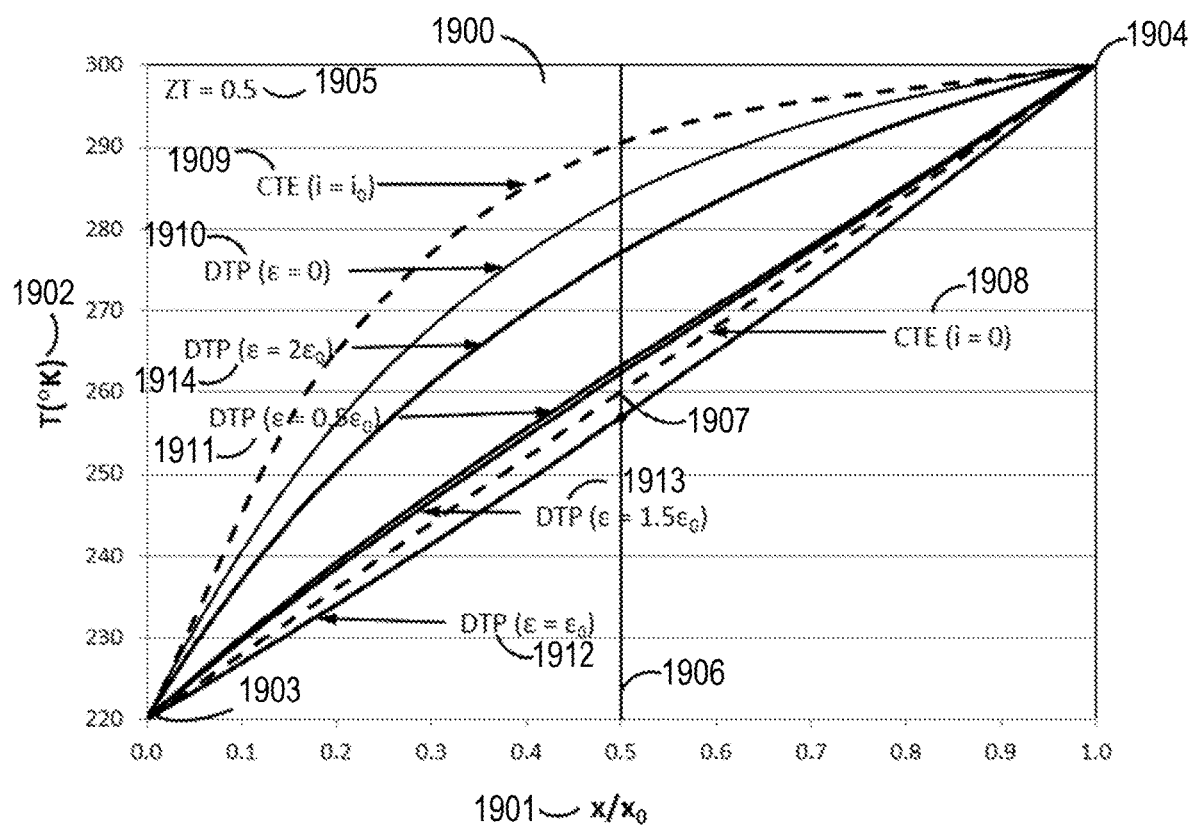
FIG. 19 is a plot of temperature profiles within example CTE and DTP TE elements for a representative variety of operating currents.

The importance of controlling transport properties, and hence producing DTP TE elements in TE couples can be shown by referring to FIG. 19 which shows typical temperature profiles for example couples such as CTE couple 1600 of FIG. 16 and DTP TE couple 1700 of FIG. 17 at several operating currents. Temperature profile graph 1900 has horizontal axis x/$x_0$ 1901, the position in the direction of current flow and vertical axis TE element temperature 1902. In this example, the TE element cold end temperature 1903 is 220 K and the hot end temperature 1904 is 300 K. Plots are presented for ZT=0.5 1905 with dashed curves 1908 and 1909 given for temperature profiles at zero current 1908 and the current that produces the highest efficiency 1909. Similarly, curves 1910, 1911, 1912, 1913 and 1914 present example DTP TE element temperature profiles for currents ranging from zero (that is, ε=0) to two times the current that produces optimum efficiency (ε=2ε₀). Vertical line 1906 identifies the midpoint along the TE element length 1901. For example, point 1907 indicates that a CTE TE element temperature at its midpoint is 260 K. The profile at zero current is linear because CTE properties do not change with position or temperature. As current increases, Joule heating adds a parabolic component to the profile. The profile at optimum COP (i.e. when i=i₀) 1909 indicates the amount the temperature profile is distorted when typical current flows through a TE element. With DTP TE elements, and the assumption that transport properties are temperature independent, (but position dependent), the profile at zero current 1910 is not linear because the thermal conductivity of the TE material varies along the element length in a programmed fashion. At small values of the current, £, the Thompson term dominates, and the temperature profile 1911 becomes increasingly less distorted and at optimal operating current co, the temperature profile 1912 becomes the ideal file in accordance with Equation (3) and is slightly concave upward. At that condition, the Thompson term and the Joule heating term cancel each other so that the profile is optimum. At greater current 1913 and 1914 the temperature profile becomes concave downward since Joule heating dominates.

Figure 20:
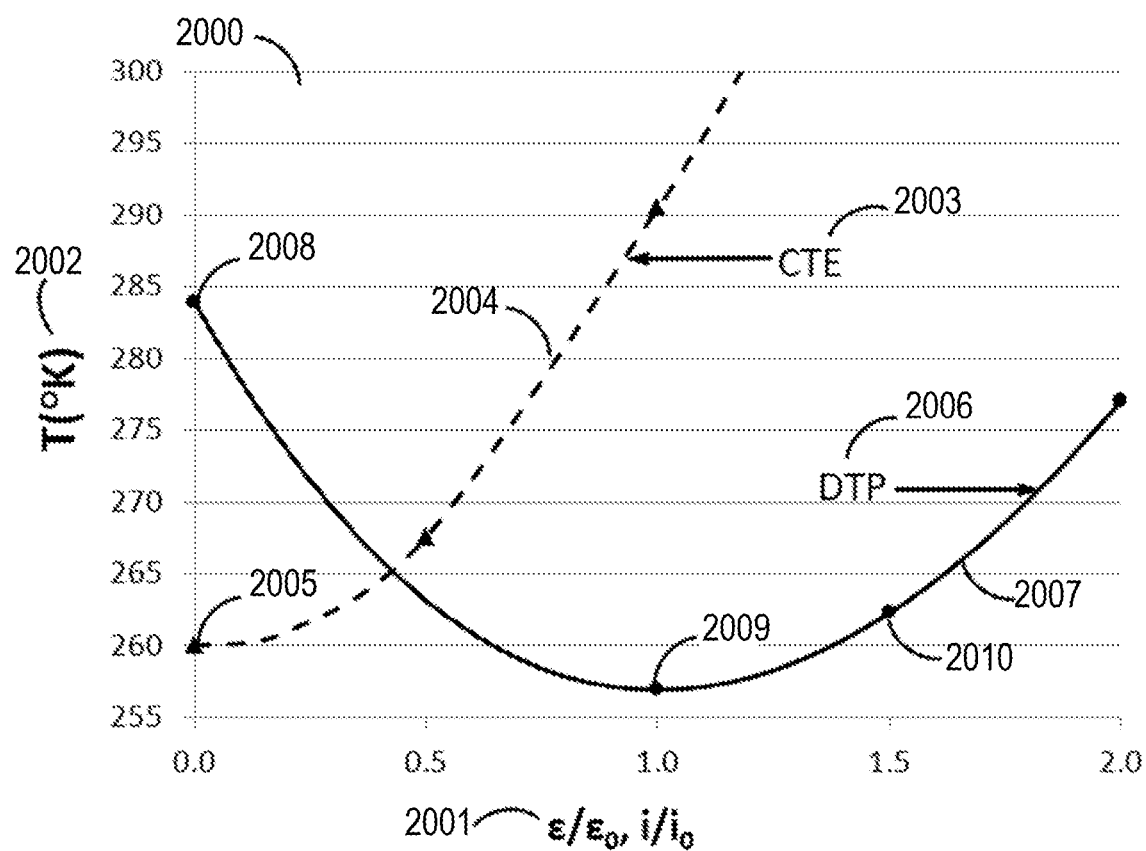
FIG. 20 is a plot depicting the temperature profile at the center point of example CTE and DTP TE elements as a function of position along the element length for different operating currents.

FIG. 20 is a plot depicting TE element midpoint temperature as a function of current. The horizontal axis, 2001 is the ratio of both CTE and DTP currents to their respective currents that produce peak efficiency (COP). The vertical axis 2002 is the temperatures at the midpoint for both the example CTE and DTP TE elements modeled in FIG. 19, that is, the temperature on line 1906 of FIG. 19. Dashed temperature plot 2004 presents the midpoint temperature for CTE TE elements (under the conditions associated with FIG. 19). Similarly, solid curve 2006 is the plot for a DTP element. Points 2005 and 2008 are temperatures 2004 and 2007 respectively for the example CTE 2003 and DTP 2007 TE elements at zero current. As currents 2001 increase, CTE midpoint temperature 2004 increases due to Joule heating, while DTP midpoint temperature 2006 decreases due to the dominance of the Thompson effect over Joule heating, reaching a minimum and the optimum temperature profile at current 2001 value of 1.0 2009. The DTP profile 2006 becomes less distorted from the ideal profile as current increases. Large distortions of DTP profile 2006 occur at higher current 2001 that with the CTE profile 2004, so DTP TE elements can be operated efficiently at higher currents 2001. As a result, cooling capacity, which increases with input current, can be higher. Further, the DTP optimum midpoint temperature, 2009 is not reached by CTE profile 2005, at any current. Thus, efficiency of CTE TE elements will be lower and therefore DTP efficiency will be greater than for CTE systems. While FIGS. 19 and 20 are specific examples, they represent the relative characteristics of CTE and DTP systems more generally, and it can be stated that for ideal CTE and DTP systems, DTP systems will have higher peak efficiency (COP) and will have higher cooling capacity.

The basic transport equations for CTE and the new transport equations for DTP govern the efficiency and cooling capacity of the respective thermoelectric systems they describe. In CTE devices, the cooling capacity as a function of current is:

$$q_{CCTE}(i) = \lambda\left(ZT_C^2 i\left(1 - \frac{i}{2}\right) - \Delta T\right) \quad (7)$$

which leads to a maximum cooling capacity of:

$$q_{CCTE}(i_{MAX}) = \lambda\left(\frac{ZT_C^2}{2} - \Delta T\right). \quad (8)$$

The maximum COP may be expressed as:

$$COP_{CCTE}(i_0) = \frac{T_C}{\Delta T}\left(\frac{M_A - \frac{T_H}{T_C}}{M_A + 1}\right) \quad (9)$$

and COP as a function of current, i, may be expressed as:

$$COP_{CCTE}(i) = \frac{q_{CCTE}(i)}{q_{HCTE}(i) - q_{CCTE}(i)}, \quad (10)$$

in which: $q_{HCTE}(i) = \lambda\left(ZT_C T_H i\left(1 + \frac{i}{2}\right) - \Delta T\right). \quad (11)$ In DTP systems, the newly developed cooling capacity equation as a function of current is:

$$q_{CDTP}(i) = T_C \lambda_C \left[ZTi - \ln\left(\frac{T_H}{T_C}\right)\right]. \quad (12)$$

Note that for DTP, there is no theoretical maximum cooling capacity since the current, ε, is unbounded. However, in attainable designs in the real world, there will be a practical maximum subject to the limitations in the range of Seebeck and the other transport properties that are available with a high ZT as noted in the discussion of FIG. 18.

The COP of the newly developed DTP cooling system does have a peak value:

$$COP_{CDTP}(\varepsilon_0) = \frac{1}{\left(\frac{T_H}{T_C}\right)^{\left(\frac{M+1}{M-1}\right)} - 1}. \quad (13)$$

Figure 21:
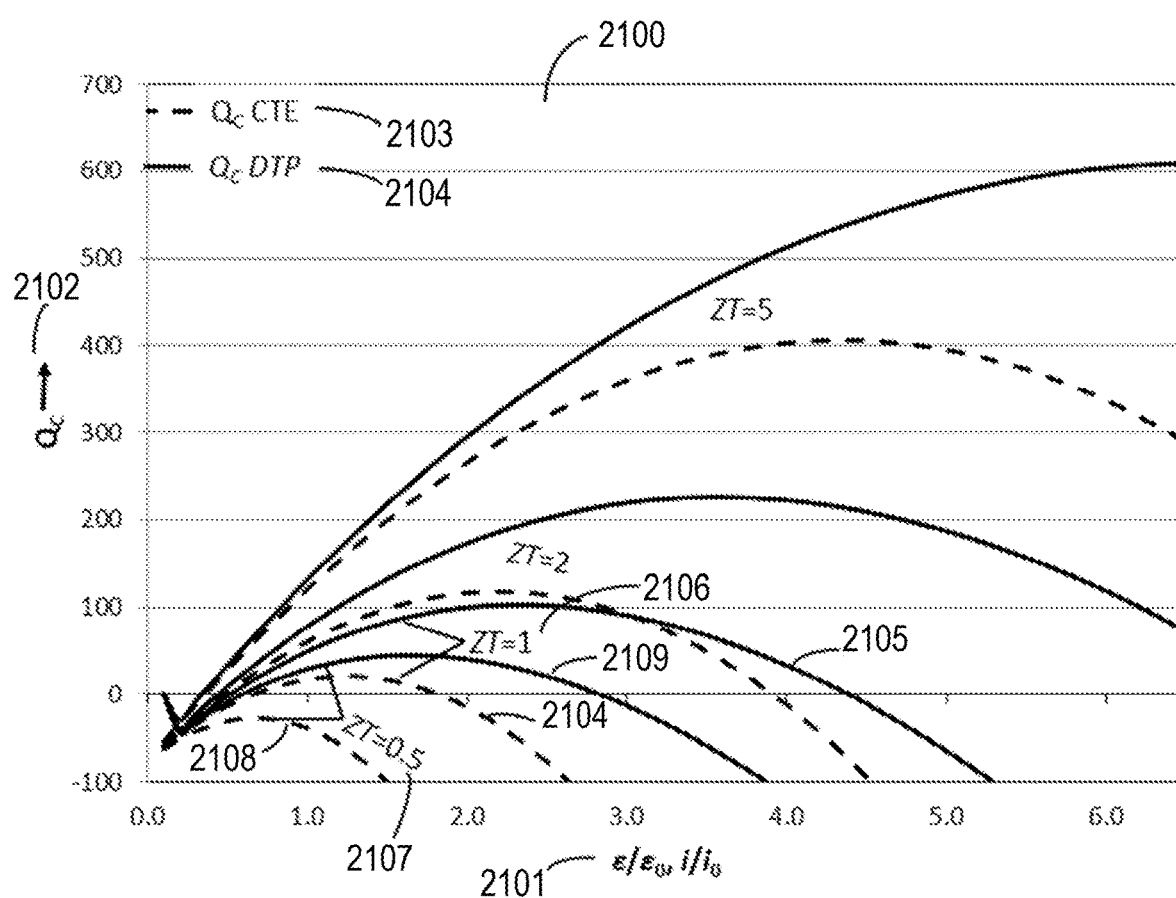
FIG. 21 is a plot depicting example CTE and DTP TE couple cooling capacity as a function of input current for a representative DT and ZTs (figure of merit $ZT=S2/(\lambda.p)$)

The COP as a function of current may be expressed as:

$$COP(\varepsilon) = \frac{q_{CDTP}(\varepsilon)}{q_{HDTP}(\varepsilon) - q_{CDTP}(\varepsilon)}, \quad (14)$$

where: $q_{HDTP}(\varepsilon) = T_H \lambda_C e^{A(\varepsilon)}\left(ZT\varepsilon - \ln\left(\frac{T_H}{T_C}\right)\right)$ FIG. 21 presents graph 2100 in which the horizontal axis 2101 is the ratio of both CTE and DTP currents to their respective currents that produce peak efficiency (COP) and a vertical axis 2102 is cooling capacity, $Q_C$ for couples such as example CTE couple 1600 of FIG. 16 and example DTP TE couple 1700. CTE cooling capacities are curves 2103 and DTP cooling capacity curves are 2104. Results are shown for several ZTs. The curves are representative of TE systems operating near Max DT. CTE curve 2104 shows the cooling capacity 2102 for CTE systems as a function of current. Similarly, DTP curve 2105 shows cooling capacity for the same DT and ZT values. The computations demonstrate that DTP 2105 $Q_C$ values range of operating current 2101 are always higher than CTE 2104 values. Similarly, for ZT=0.5 2107 DTP 2109 $Q_C$ values range of operating current 2101 are always higher than CTE 2108 values. In this particular design case CTE values 2108 are always less than zero, meaning that under this condition no cooling power $Q_C$ 2102 is produced. In contrast, the corresponding DTP 2109 TE device produces positive cooping power $Q_C$ 2102. This result demonstrates the higher performance of the DTP system.

Figure 22:
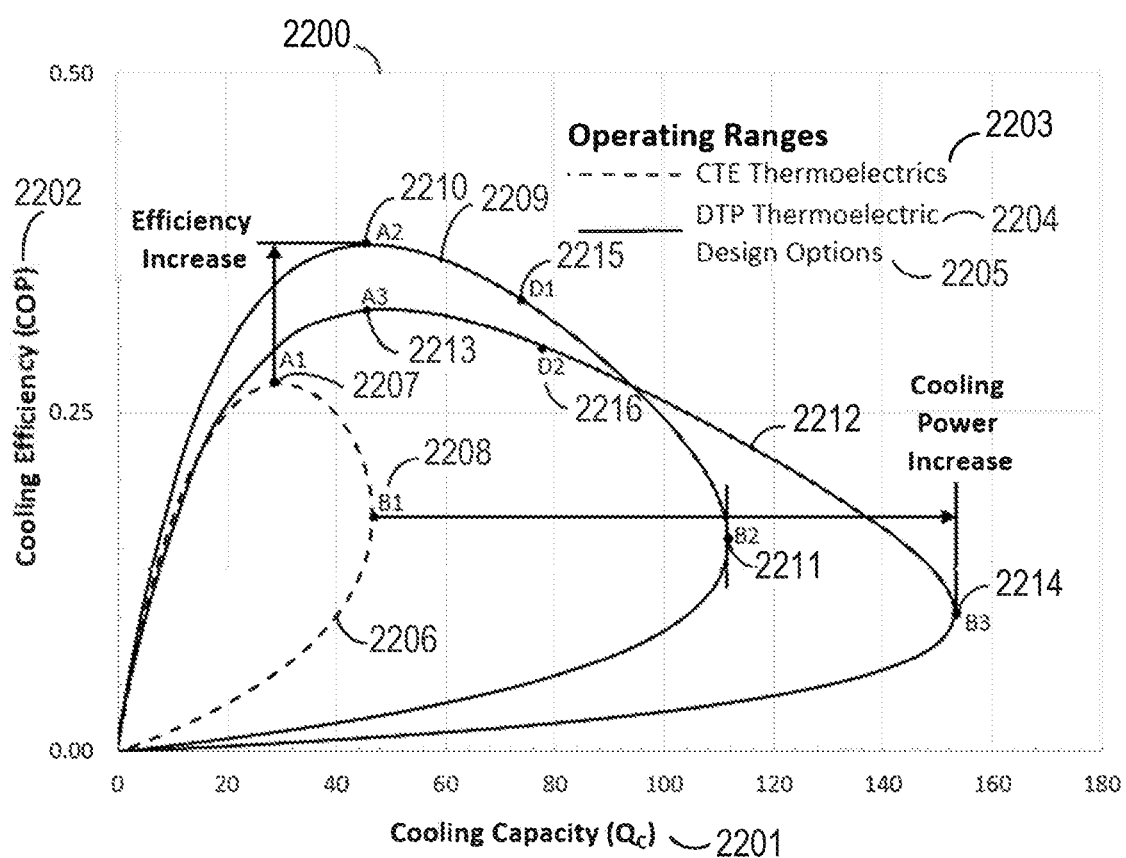
FIG. 22 is a plot depicting the relationship between COP and cooling capacity for example CTE and DTP TE elements in a typical operating condition.

FIG. 22 depicts properties of DTP systems that differ from those of CTE system couples such as CTE couple 1600 of FIG. 16 and DTP TE couple 1700. The graph represents a particular example of a descriptive operating condition. Horizontal axis 2201 is cooling capacity, $Q_C$ and vertical axis 2202 is COP. CTE operation range is denoted by curve 2203 and DTP operating curves are 2204 and 2205 denote performance options for DTP TE systems. Curve 2206 for CTE systems is a plot of the relationship between COP verses $Q_C$ for all currents for which a positive $Q_C$ is generated. As is evident, curve 2206 is a closed loop with peak COP at point A1 2207 and peak $Q_C$ at point B1 2208. The CTE device operation is anywhere on curve 2206. Similarly, loop curve for DTP TE system 2209 has peak COP at point A2 2210 and peak $Q_C$ at point B2 2211. However, unlike CTE curve 2206, DTP systems can have transport properties of different functional form with position (but only one such set of transport properties produces optimum COP), and so other performance curves, such as loop curve 2212 are producible. In loop curve 2212, peak COP point A3 is lower than the corresponding point A2 2210 for loop curve 2209, and the peak cooling capacity 2201 at point B3 2214 is greater than peak $Q_C$ (point B2 2211) for design loop curve 2209. In all, a broad range of loop curves are possible, each with a tradeoff of peak COP 2202 and Peak $Q_C$ 2201. Loop curve 2209 design is preferable to that of loop curve 2212 if maximum efficiency is the primary goal and loop curve 2212 would be preferred if cooling capacity was most important. Thus, within the property limitations of TE materials, performance of DTP systems can be tailored to best meet the functional requirements of particular cooling applications. The ability to select design relationships between COP and $Q_C$ is a distinct feature of DTP design that is new to the art of TE device design.

Figure 23:
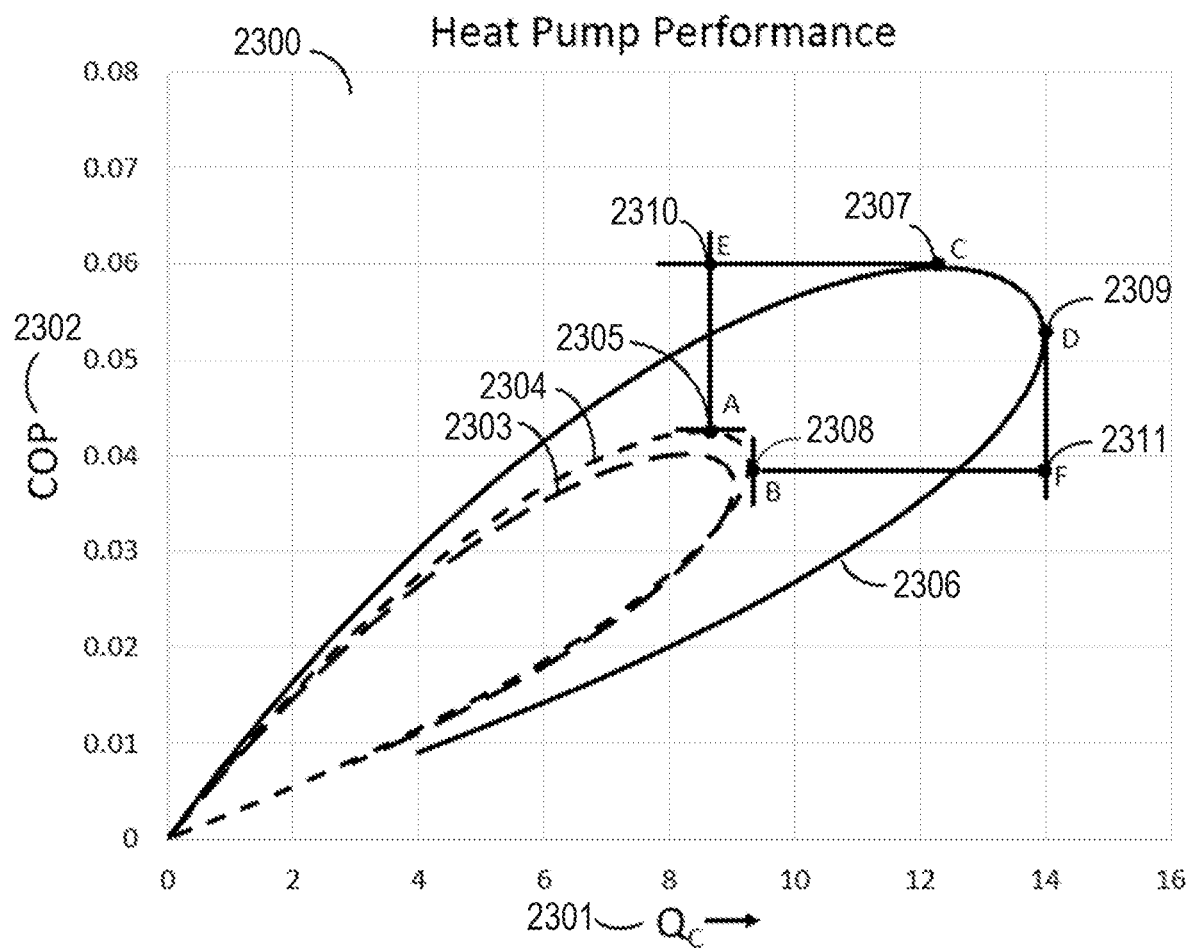
FIG. 23 is a plot comparing the design performance of example commercially available CTE elements and an example DTP TE element designed with commercially available TE materials.

FIG. 23 presents computations that describe the relative performance example high-performing commercially available TE CTE couples including different TE materials than each other, where the p-type leg includes a single homogeneous TE material and the n-type leg includes a different single homogeneous material, with that of an example DTP TE couple designed with the same TE materials which optimize COP by employing DTP design. Graph 2300 has horizontal axis cooling capacity, $Q_C$ 2301, and vertical axis 2302 COP. Loop curve 2303 is the computed performance of one of the CTE material systems. Loop curve 2304 is a similar curve for the highest performing material. For loop curve 2304, point A 2305 denotes the highest attainable value of COP 2302 and point B 2308 the highest $Q_C$ 2301. Loop curve 2306 shows the properties of the best DTP design operating under the same conditions utilizing best commercially available TE materials. Loop Curve 2306 has peak COP 2302 at point C 2307 and peak $Q_C$ 2301 at point D 2309. Comparing peak COP 2302 from CTE loop curve 2304 with DTP loop curve 2306, the gain is depicted as point E 2310 and the gain for peak $Q_C$ 2301 as point F 2311. Graph 2300 displays the difference in DTP and CTE performance. As an example, for DTP system 2306, the maximum COP 2302 shown as point C 2307 is about 0.060 while the maximum COP 2302 of CTE system 2304 at point A 2305 is about 0.042. Thus, the COP for the DTP system 2306 is greater than that of the CTE system 2305 as is readily observed as the difference between the COP 2302 value at point A 2305 and the DTP curve value at point E 2310. Similarly, for DTP system 2306, the maximum $Q_C$ 2301 shown as point D 2309 is about 14.0 while the maximum $Q_C$ 2301 of CTE system 2304 at point B 2308 is about 9.4. Thus, the value for $Q_C$ 2301 for the DTP system 2306 is greater than that of the CTE system 2305 as is readily observed as the difference between the $Q_C$ 2301 value at point B 2305 and the DTP curve value at point F 2311.

Figure 24:
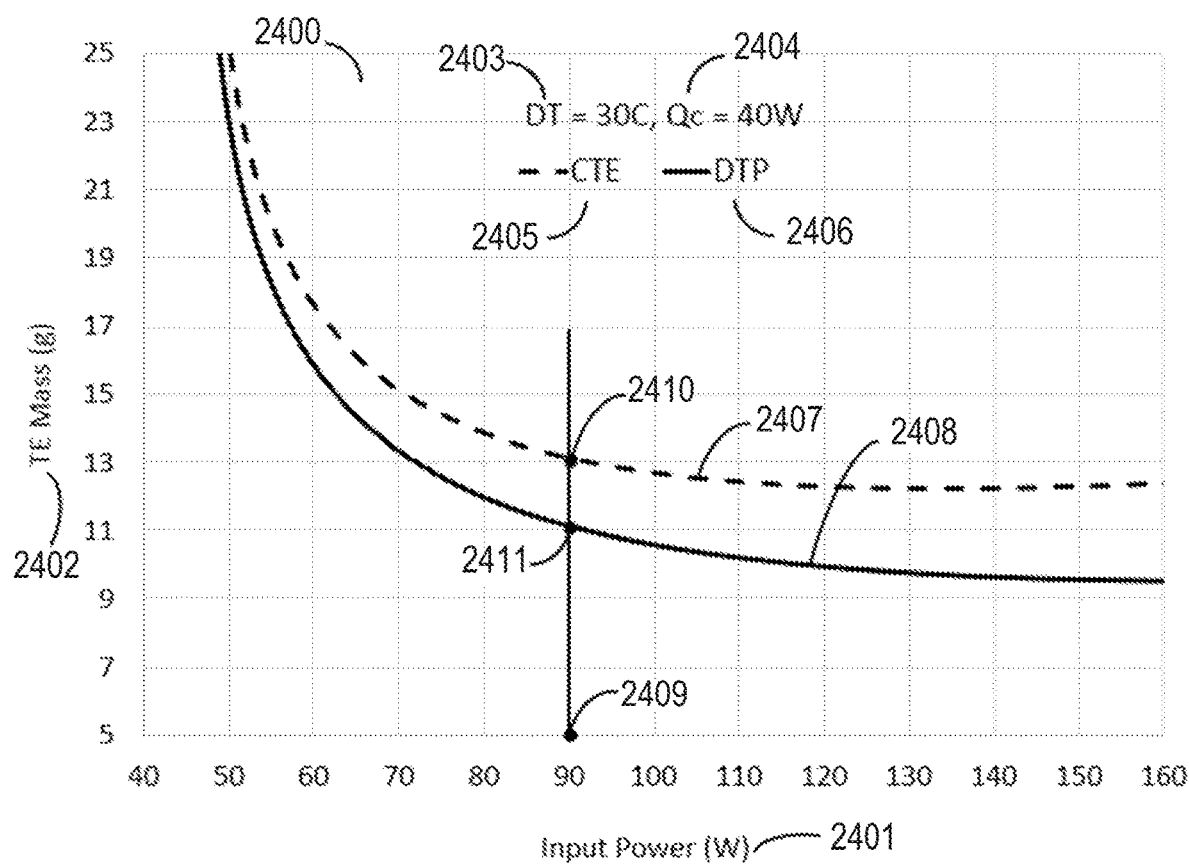
FIG. 24 is a plot comparing material usage of example CTE TE elements versus that of example DTP TE elements operating under the same conditions.

FIG. 24 depicts graph 2400 with horizontal axis 2401, input power and vertical axis 2402, TE mass for DT=30° C. 2403, $Q_C$=40 W for both CTE 2405 and DTP 2406 TE systems. Graph 2400 is a specific example of the relative weights of the TE material requirements for the two system designs each operating at the same hot side and cold side temperature, each constructed of commercially available TE materials and each producing the same $Q_C$. Here, the relevant difference is CTE 2405 compared to DTP 2406. Curve 2407 is the weight of TE material required of the CTE system and curve 2408 is the weight for the corresponding DTP system. As an example, consider a design power input of 90 Watts point 2409, with cooling output $Q_C$=40 W 2404. CTE curve 2408 requires an amount of TE material indicated by point 2410 and similarly, point 2411 indicates the amount of DTP material required. Thus, in this particular example about 15% less TE material is required to achieve the same performance with a DTP material as for a CTE material. The material reduction may, for example, result in the need for 15% fewer TE elements of the same size and weight. As such, in addition to the reduced material usage, beneficial reductions in size and weight are provided by the DTP system as compared to that of the CTE system. Other operating conditions would also display a range of material usage for DTP systems, with some showing small reductions and other considerably larger reductions.

The ability to reduce the mass of thermoelectric material utilized for a given thermal power output is a valuable attribute of DTP devices. For example, such a reduction in mass has the benefit to preserve and extend limited resources such as the amount of tellurium contained in conventional bismuth telluride TE material systems and in other TE material systems containing other costly, hard to obtain, or rare materials.

Figure 25:
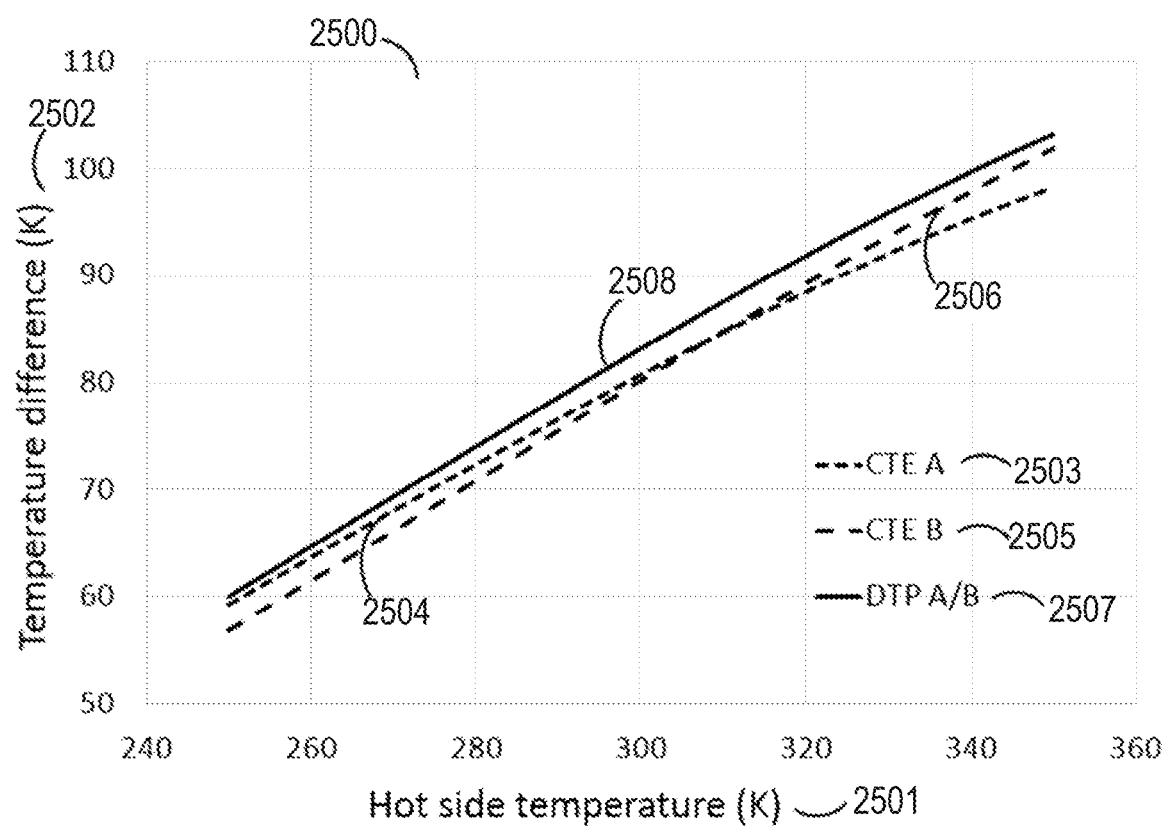
FIG. 25 is a plot comparing the performance of two example CTE TE elements, using respective materials, with the same two materials fabricated into an example DTP TE element.

FIG. 25 is another example of important differences between CTE and DTP TE couples. Graph 2500 has horizontal axis hot side temperature 2501 and vertical axis has maximum temperature difference (Max DT) 2502. In this example, CTE material system A 2503 is the commercial TE material that exhibits the highest Max DT for materials designed to operate with their hot side below room temperature. CTE material B 2505 exhibits the highest Max DT for materials designed to operate at high hot side temperatures curve 2506. Material AB 2507, designed from materials A 2503 and B 2505 using DTP design principles, produces Max DT curve 2508. In Graph 2500, the conditions are that each of the three system designs operate in the same environment, at the same hot side temperature, are constructed from TE elements of the same height and the TE elements have the same contact resistance at end terminations. Graph 2500 shows that by using the same TE materials in an optimum DTP configuration, Max DT is greater for DTP curve 2508 over the entire operating range. Thus, employing DTP teachings, the same TE materials can produce greater Max DT performance over a broad range of operating conditions.

Figure 26:
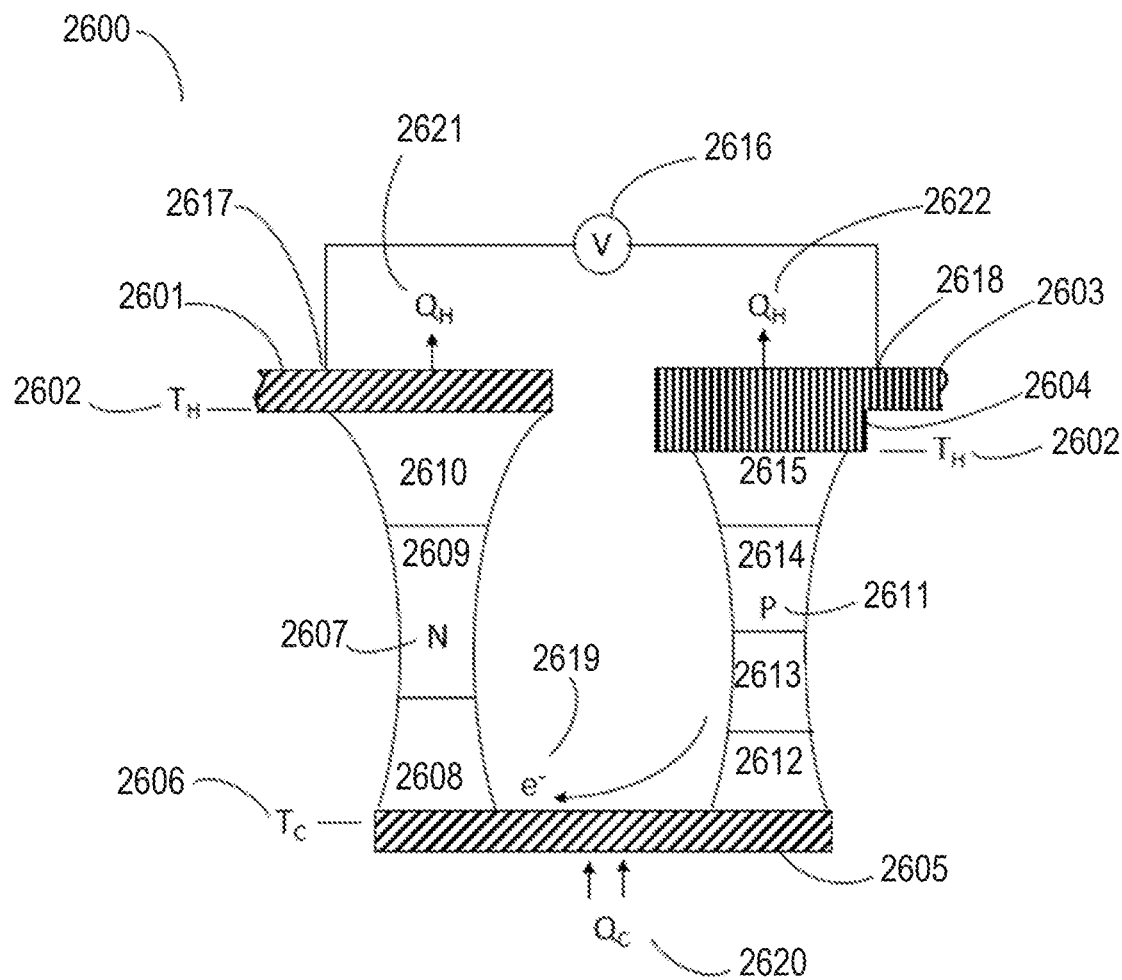
FIG. 26 schematically illustrates an example design option for a DTP TE couple.

To depict some of the freedoms in the design of DTP elements, FIG. 26 is a schematic of a TE couple 2600 including TE elements that vary in cross sectional area in the direction of current flow and the elements include different TE materials. TE couple 2600 has hot side electrodes 2601 and 2603 each at temperature Tx 2602. Electrode 2603 is depicted as being a different thickness than electrode 2602. Cold side electrode 2605 is at temperature $T_C$ 2606. N-type TE element 2607 includes n-type TE material segments 2608, 2609 and 2610. P-type TE element 2611 includes p-type TE material segments 2612, 2613, 2614 and 2615. Electric power source 2616 is connected to hot side electrode 2601 though connection 2617 and to hot side electrode 2603 through connection 2618. In operation, when power is applied so that electrons 2619 flow in the direction shown, cold electrode 2605 absorbs thermal power $Q_C$ 2620 and rejects heat $Q_H$ 2621 and 2622 through hot side electrodes 2601 and 2603. Advantageously, the three n-type TE materials 2608, 2609 and 2610 that comprise n-type TE element 2607, each have Seebeck coefficients, thermal conductivities and electrical resistivities that, in magnitude, are progressively larger toward hot end 2602. Thus, while the TE materials within each individual TE segment, 2608, 2609 and 2610 have traditional TE material properties that do not vary, the entire n-type TE element 2607 functions as a DTP TE element. A similar description holds for p-type TE element 2611.

Simulations demonstrate that sufficient Thompson effect, which is generated at the boundaries where the segments connect, can produce a significant portion of the DTP effect if the transport properties varied continuously. For further details, see the following references authored by the present inventors, the entire contents of each of which references are incorporated by reference herein: Crane and Bell, "Maximum temperature difference in a single-stage thermoelectric device through distributed transport properties," International Journal of Thermal Sciences 154: 106404, pages 1-9 (2020); and Bell, "Optimally distributed transport properties can produce highest performance thermoelectric systems," Phys. Status Solidi A: 1900562, pages 1-7 (2019). As demonstrated, more segments can produce heat pumping performance closer to that of elements with continuously varying transport properties. For example, a TE element including 5 or more segments in general, can have nearly the same performance as that of a TE element fabricated from the same TE material system but with continuously vary transport properties.

Referring to FIG. 25, material system AB is an example of a segmented DTP TE couple. In that embodiment, the DTP couple is designed using two segments (materials A and B) in each leg of the couple, The resulting Max DT, while greater than that of material A or B alone, could exhibit higher performance if several segments with properties between those of A and B could be used it its design.

Figure 27:
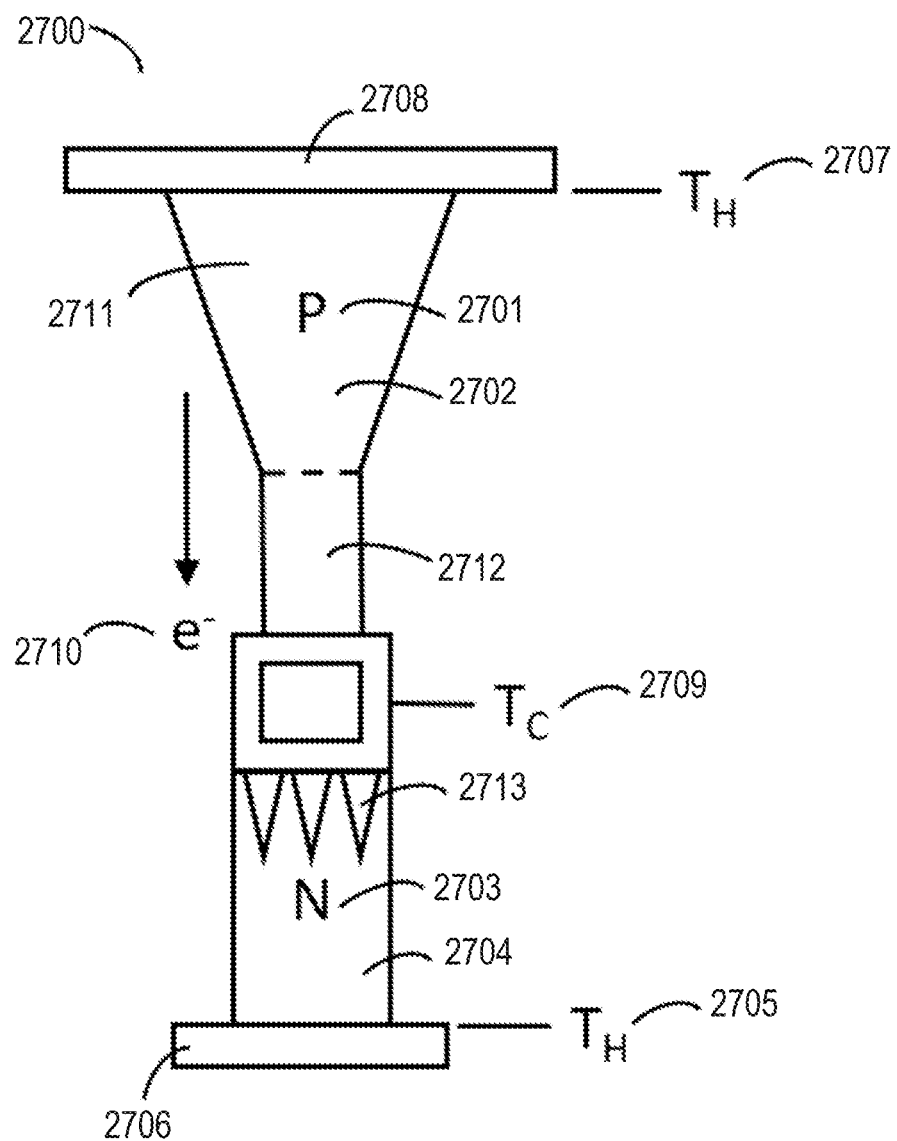
FIG. 27 schematically illustrates an example design option for a DTP TE element in a stack configuration.

FIG. 27 depicts a DTP TE couple arranged in a stack configuration. Stack TE schematic 2700 has a p-type TE element 2701 including segment 2702 and segment 2703. TE element 2701 is in electrical and thermal contact with hot side electrode 2704 at temperature 2705 and on the cold side to electrode 2706 at temperature 2707. Advantageously, the thermal and electrical contacts have interfacial resistances that are less than 2% of the TE element resistances. In some examples, n-type TE element 2708 is a monolithic DTP TE element. TE element 2708 is in good electrical and thermal contact with hot side electrode 2709 at hot side temperature 2710 and on the cold side electrode 2706 at cold side temperature 2707.

For explanatory purposes, and to demonstrate the range of design freedom that can be employs to optimize DTP TE couple design freedom, TE DTP couple 2700 is depicted as having a complex design. P-type TE element 1701 is shown as having a conical shape and is mated to cylindrically shaped segment 2703. More discussion of the effects of area change in the direction of current flow on DTP performance can be found in see the following reference authored by the present inventors, the entire contents of which reference are incorporated by reference herein: Crane and Bell, "Maximum temperature difference in a single-stage thermoelectric device through distributed transport properties," International Journal of Thermal Sciences 154: 106404, pages 1-9 (2020). (As one example, cross sectional area change can be employed to modify the relationship between thermal and electrical resistance to better optimize DTP performance.). As noted above, N-type TE element 2708 has DTP structure. At its cold end it has slots 2712 extending downward into the body of n-type TE element 2708 to vary cross sectional area at the cold end.

Advantageously, cold electrode 2706 is fabricated from a material with high electrical and thermal conductance such as copper or silver. The hollow cold side electrode 2706 depicted can provide a temperature controlled environment for samples, electronic circuits, laser systems, sensors, and any other item of appropriate size requiring temperature control.

Stack design 2700 has different mechanical and heat loss performance characteristics than the couple design of FIG. 16. Advantageously, compressive loads are applied to hot electrodes 2704 and 2709 so that the system is under compressive load in operation. Some TE materials, such as Bismuth Telluride are physically weak and can fail under modest tensile or shear load, and therefore benefit from being appropriately loaded in compression. Further, stack design 2700 can better control parasitic losses, including those from thermal conduction and convection, electrical resistances, and cold side radiant heating.

Figure 28:
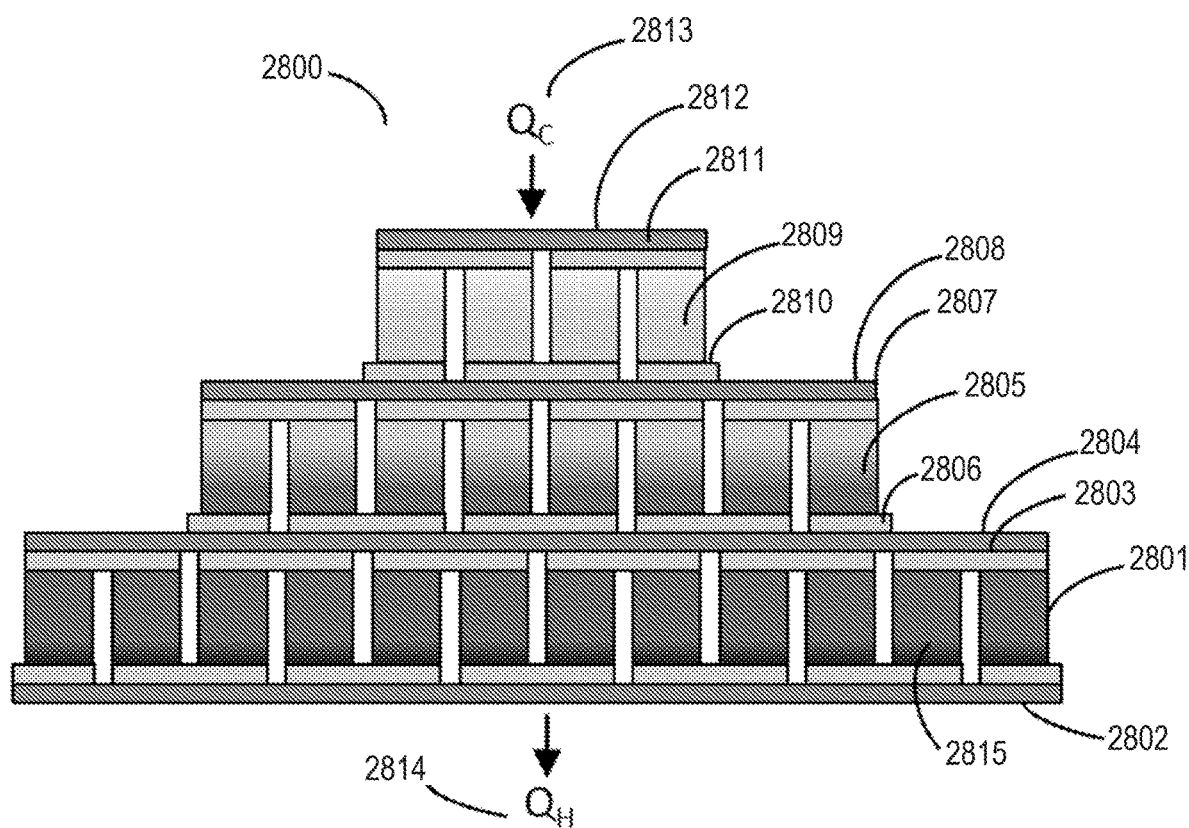
FIG. 28 schematically illustrates an example TE element cascade design.

FIG. 28 depicts a TE cascade 2800, comprising a first TE array 2801, with hot side 2802 and cold side 2803 in good thermal contact with substrate 2804. A second TE array 2805 with hot side 2806 in good thermal contact with substrate 2804. Hot side 2807 of TE array 2805 is in good contact with substrate 2808. Similarly, a third TE array 2809 with hot side 2810 is in good thermal contact with substrate 2808. Cold side 2811 of TE array 2809 is in good contact with cold side substrate 2812. TE arrays 2801, 2805 and 2809 are comprised of n-type and p-type TE couples 2815 connected electrically in series or series parallel arrangements with the hot sides 2802, 2806 and 2810 of the couples on the bottom side of each array and the cold side 2803, 2807 and 2811 at the top of each array. Thus, cooling $Q_C$ 2813 plus electric power input into array 2809, not shown, is rejected by the hot side of array 2809 and absorbed by cold side of array 2805. Similarly, thermal power from the hot side of array 2809 plus electric power input into array 2805, not shown, is rejected at the hot side of array 2805 and absorbed by cold side of array 2801. That thermal power plus the electric power input into array 2801, not shown is rejected to hot side 2802.

TE cascades 2800 are commercially available from several sources. Their primary usage is to produce DTs that are beyond the Max DT of single stage CTE devices or are beyond the cooling capacity of single stage CTE devices at the required DT. Cascades, 2800 are commercially available with up to six arrays. Generally, each additional array may provide a diminishing contribution to DT. Importantly, because of the efficiency limitations of each CTE array, COP is very low for several stage cascades.

Figure 29:
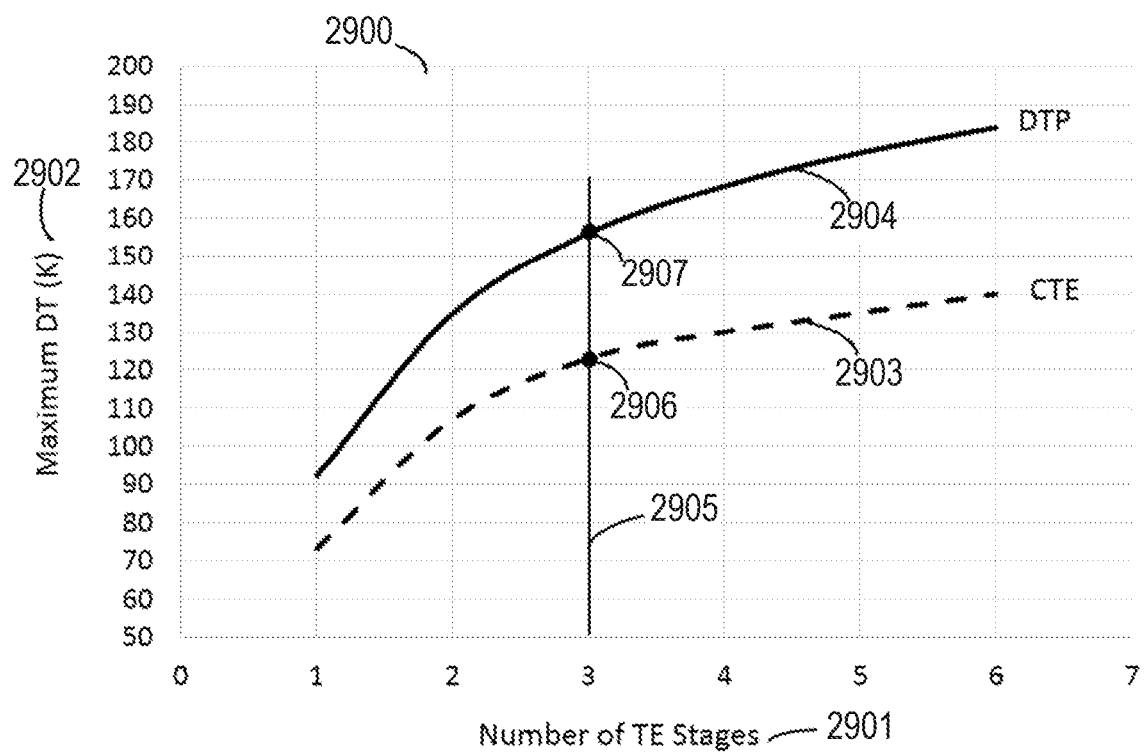
FIG. 29 is a plot comparing example CTE and DTP TE element performance as a function of the number of cascade stages.

Since DTP TE systems can increase TE system efficiency and heat pumping capacity, DTP TE cascade designs exhibit important performance characteristics not available in CTE cascades. FIG. 29 presents a performance comparison between CTE and DTP cascade TE system designs. Graph 2900 has as the horizontal axis TE cascade stages 2901 and vertical axis Max DT 2902. CTE cascade system curve 2903 and DTP curve 2904 are plots of the Max DT attainable with commercially available CTE cascades and DTP cascade designs using present TE materials operating at a hot side of 300 K. As an example, the performance of 3 stage CTE and DTP cascades, vertical line 2905 intersects CTE curve 2903 at point 2906 corresponding to a Max DT of about 122 K. Line 2906 intersects DTP TE curve 2904 at point 2907 corresponding to a Max DT of about 156 K. The 156 K value is not attainable with commercial CTE cascades with up to 6 stages. These design results show the potential compounding benefits from increased COP and $Q_C$ of DTP TE designs in cascade applications.

Figure 30:
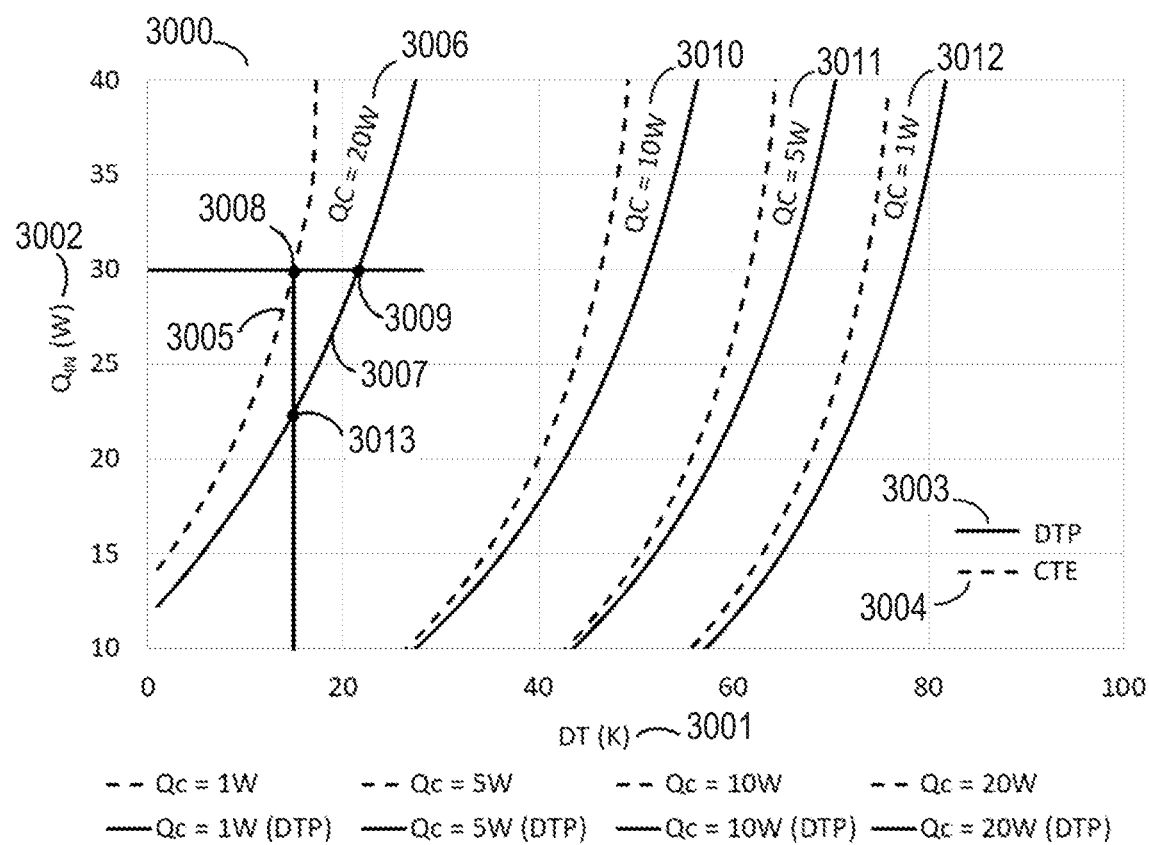
FIG. 30 is a plot comparing example CTE and DTP TE elements in terms of input power and temperature difference for a fixed size and different heat loads.

FIG. 30 depicts graph 3000 with horizontal axis DT 3001 and vertical axis input power $Q_{IN}$ 3002. Solid lines 3003 denote DTP and dashed 3004 denote CTE properties. For a CTE module with fixed TE mass and module physical dimension, dashed curve 3005 presents the relationship between the electrical power input 3002 and the maximum DT 3001 that can produce cooling power output $Q_C$ of 20 w 3006. Similarly, solid DTP curve 3007 presents the relationship between the electrical power input 3002 of a DTP module with the same fixed TE mass and the maximum DT 3001 for which a cooling power output $Q_C$ of 20 w 3006 can be produced. As an example, point 3008 on CTE curve 3005 at 30 W of power input $Q_{IN}$ 3002, will produce $Q_C$=20 W of cooling power 3006 at a Max DT 3001 of about 17 K point 3008. Similarly, point 3009 on DTP curve 3007 has the same input power $Q_{IN}$=30 W 3002 and will produce 20 W of cooling power at a higher Max DT 3001 of about 21K. Thus, under the same input power and module size constraints, the DTP module can operate at about a 23% greater DT 3001. Similarly, for $Q_C$=10 W 3010, $Q_C$=5 W 3011 and $Q_C$=1 W 3012, DTP modules provide greater Max DT 3001 at all power input levels $Q_{IN}$ 3002. As another example, for a DT 3001 of 17 K and output of $Q_C$=20 W 3006, a CTE module operating at point 3008 of curve 3005 will require a power input $Q_{IN}$ of 30 W while a DTP module of the same size which operates on curve 3007 at point 3013 will require a power input $Q_{IN}$ 3002 of about 22 W. Thus, in this example, the amount of power input $Q_{IN}$ 3002 for use in operation is reduced about 27% for a DTP module as compared to a CTE module.

DTP modules can also operate at a combination of temperature difference, input power and output power $Q_C$ that exceed the capabilities of CTE modules of the same size. For example, a DTP module can operate at point 3009 at DT 3001 of about 22 K, an operating condition for which CTE module, curve 3005, cannot operate at any power level $Q_{IN}$ 3002. These attributes of DTP compared to CTE provide another demonstration of the flexibility to design thermoelectric devices with less input power and thermoelectric material mass, for every temperature difference and heat load.

Compared to CTE elements, which are produced from a single material, the transport properties that change along the direction of current flow of segmented DTP TE elements, may be more favorably manufactured using different processes or processes new to TE element fabrication. Herein, some potentially useful production technologies and methods are described.

In segmented DTP elements made with discrete sections, each section may be metalized on both ends and the segments solder connected to one another. The solder, or solders, can be a conventional solders used within the electronics or other industries or solders tailored to meet the performance requirement of particular DTP TE systems. For example, it may be advantageous to use solders and fluxes formulated to reduce interface thermal and electrical losses at the ends of a TE element to less than 2% of the resistance of the TE element itself, so the interfacial resistances are small compared to the resistance of the TE material portion of an element and do not reduce performance below an acceptable amount. Also, it may be advantageous to use solder systems or TE material surface treatments so that the solder does not wick along the TE leg in the direction of current flow and by controlling wicking, reduce short circuiting from element side wetting to acceptable levels. Also, solders may be used that have mechanical properties that provide stress reduction from thermal coefficient of expansion (CTE) mismatch at segment and TE element end interfaces.

The joining of dissimilar materials, such as a section of an organic TE material adjacent to a section of an inorganic TE material, may benefit from solder connection. Similarly, if CTE mismatch is relatively large, as might be the case in organic/inorganic TE material interfaces, joining of the materials may benefit by connection through low rigidity porous metal interfaces or other conductive material interface systems such as conductive epoxies.

Alternatively, the DTP TE material sections may be fabricated from partially consolidated material powders that are placed in layers to form the DTP segments and spark sinter bonded and consolidated. As another alternative, the TE materials may be coextruded and fabricated into TE elements or systems by current production methods or methods developed for DTP TE device assembly. These processes may produce segmented elements that have reduced or eliminated interfacial resistances. Alternatively, TE segments may be bonded through compression bonding at pressures, time and temperatures that do not degrade the TE material properties. For some material systems it may be beneficial to treat or otherwise prepare the surfaces by adding intermediary materials that enhanced bond quality or by special surface treatments that improve joint properties, reduce interfacial losses, or increase mechanical strength and durability.

As another alternative, the TE materials may be fabricated by additive manufacturing (AM), screening, or other printing processes. These processes may be employed to produce DTP TE segmented elements with interfacial resistances that are reduced or eliminated. Further, AM, screening, or printing processing may be used to construct DTP TE elements with thin layers to be consolidated into DTP elements consisting of as few as two segments to more than 5 segments. With these methods, consolidation may be performed without the use of any interfacial solder, adhesive, or other constituents that may add undesirable interfacial resistances.

DTP TE elements with continuously varying properties may be produced using TE material growth from a melt similar to one of the methods used to fabricate CTE elements but adapted to provide suitable DTP properties by varying the melt constituents in the direction of material growth.

Another method for varying DTP properties within a TE element can be selective doping, in which ion implantation of varying density and depth in used to tailor the Seebeck coefficient, electrical resistivity and or the thermal conductivity of the TE element in the direction of current flow. Implantation may be especially beneficial to reduce interfacial resistances at boundaries of TE segments and at TE element ends. Implantation may also be of benefit to modify the Seebeck coefficient at element ends and interfaces to modify the Thompson effect at such locations and to reduce interfacial losses. Either in combination with ion implantation or separately, the DTP TE element and segments may benefit from thermally induced diffusion of dopants controlled in a manner that produces the change in one or more transport property to produce higher performing DTP TE elements or segments.

Yet another method of varying DTP properties is to subject certain TE materials, such as BiSb based materials to magnetic fields and magnetic field gradients. For example Seebeck coefficient can vary with magnetic field strength at temperature between 50 K and 200 K (Goldsmid, Electronic Refrigeration, 1986, FIG. 4.22). In this embodiment, the TE material itself may not have a compositional change either over the entire length of a DTP TE element or a portion of its length, and the magnetic field gradient may produce transport property variations that may be tailored to produce a DTP TE device.

As provided herein, any combinations of the above processes, material modifications, segment connection methods and connection material systems and environmental exposure may be combined to produce DTP TE elements. See also the following reference authored by the present inventors, the entire contents which reference are incorporated by reference herein: Crane and Bell, "Maximum temperature difference in a single-stage thermoelectric device through distributed transport properties," International Journal of Thermal Sciences 154: 106404, pages 1-9 (2020).

Heating Operation.

In the description of FIGS. 16, 26, and 27 and the usage of TE couples 1600, 2600, and 2700 are described in terms of their cooling capability. As an example, thermal power is extracted from cold sides 1603 and 1605 and heat is rejected from hot side 1604. The hot side heat rejection is $Q_H$ 1610. In steady state operation, conservation of energy requires that:

$$Q_H = Q_C + Q_{IN} \tag{15}$$

where $Q_{IN}$ is the power supplied by electric power input 108 and all other sources of power acting on the TE couple 1600. For explanatory purposes in this discussion of heating operation, it is assumed that power supplied by electric power input 108 is the sole source of $Q_{IN}$. Then, dividing Equation (15) by $Q_{IN}$ provides that:

$$COP_H = COP_C + 1 \tag{16}$$

where $COP_H$ is the heating efficiency and $COP_C$ is the cooling efficiency. $COP_C$ has heretofore been identified as COP. It is important to notice that in steady state operation, since the two differ by a constant, whatever design processes and operating conditions maximize $COP_C$, they also maximize $COP_H$. In steady state, the performance optimizations ascribed to the cooling power of cold sides of the TE couples in FIGS. 16, 26, and 27 apply to hot side heat output $Q_H$ 2610. These performance characteristics are a direct result of Equation (16).

If heating output is a design objective, either in addition to cooling or instead of cooling, the hot side of DTP designs can provide heating efficiency and thermal pumping capacity greater than that of CTE systems. As a result, in steady state operation of DTP designs, thermal power (heat) is utilized from the hot side of a DTP system, the resulting heat pump performance can be superior to the thermal power output of comparable CTE system in the same manner as cooling efficiency and cooling capacity can be superior to that of CTE systems. However, and to further clarify performance capability of DTP TE systems, if in steady state operation, the electron flow shown in FIG. 16 is reversed, so hot side 1604 becomes cold (thermal power absorbing) and cold sides 1603 and 1605 become hot (thermal power rejecting) generally, $COP_H$ for a DTP system will be lower than that of a comparable (reference) CTE system.

The differences in COP and $Q_C$ between CTE and DTP TE couples, modules, and devices (parts) are a function of the ratio between DT of the measurement condition and Max DT of the CTE part. The functional relationship is discussed and described in the following references authored by the present inventors: Crane and Bell, "Maximum temperature difference in a single-stage thermoelectric device through distributed transport properties," International Journal of Thermal Sciences 154: 106404, pages 1-9 (2020); and Bell, "Optimally distributed transport properties can produce highest performance thermoelectric systems," Phys. Status Solidi A: 1900562, pages 1-7 (2019). For clarity, when general statements are made herein comparing COP and $Q_C$ between CTE and DTP parts, and no specific temperature differential is noted, the ratio DT/(Max DTcte) is 0.9, where Max DTcte is for the comparable CTE part temperature measurement condition. Further, the measurements are made within the design operating temperature range of the TE part. This definition of the measurement condition holds for claims herein in which COPs and Qcs of CTE and DTP systems are contrasted. These conditions hold as well for loop curves 2303, 2304 and 2306 in FIG. 23.

It will be appreciated that one or more DTP TE materials, elements, or couples having any suitable DTP design, such as described with reference to FIGS. 16 to 30, may be used in any suitable heat pump system as used with temperature controlled transport systems such as described above with reference to FIGS. 1 to 15. Heat pump systems as disclosed herein may additionally or alternatively include one or more CTE TE materials, elements, or couples.

It is to be understood that any respective features/examples of each of the aspects and embodiments of the disclosure may be implemented together in any appropriate combination, and that any features/examples from any one or more of these aspects may be implemented together to achieve the benefits as described herein.

All of the references described above are hereby incorporated by reference herein in their entireties.

While various illustrative examples are described above, it will be apparent to one skilled in the art that various changes and modifications may be made therein without departing from the invention. The appended claims are intended to cover all such changes and modifications that fall within the true spirit and scope of the invention.

What is claimed is:

1. A temperature controlled system for storing, transporting and/or delivering temperature-sensitive contents, the temperature controlled system comprising:
   at least one temperature controlled package comprising an insulated body and a lid forming at least one insulated temperature controlled chamber located within the at least one temperature controlled package, at least one opening or slot being defined through insulation of the insulated body or the lid to provide access to an inner region of the at least one temperature-controlled package while the lid is coupled to the body to form the at least one insulated temperature controlled chamber;
   at least one solid state heat pump mounted to a vehicle; and
   at least one heat transport element that is in thermal communication with the at least one solid state heat pump and mounted to the vehicle,
   the at least one heat transport element being insertable into the at least one temperature controlled package by being extended through the at least one opening or slot and through insulation of the insulated body or lid, while the lid is coupled to the body to form the at least one insulated temperature controlled chamber, to thermally contact the inner region and thereby thermally couple the at least one insulated temperature controlled chamber to the at least one solid state heat pump and couple the at least one insulated temperature controlled chamber to the vehicle for transport,
   the at least one heat transport element being removable from the insulated body and the lid of the at least one temperature controlled package, while the lid is coupled to the body to form the at least one insulated temperature controlled chamber, via the at least one opening or slot to thereby thermally decouple the insulated body and the lid of the at least one insulated temperature controlled chamber from the at least one solid state heat pump and decouple the at least one insulated temperature controlled chamber from the vehicle for delivery; and at least one of the following:
- at least one electrical energy storage system to provide electrical power to the at least one solid state heat pump;
- at least one electrical connector for accepting electrical power from a source of electricity other than the at least one electrical energy storage system to provide electrical power to the at least one solid state heat pump;
- at least one thermal energy storage system located within the at least one temperature controlled package;
- at least one electronic control/energy management system to control the at least one solid state heat pump; and at least one input/output feature to control the at least one solid state heat pump.

2. The temperature controlled system of claim 1, wherein the at least one solid state heat pump comprises a thermoelectric device.

3. The temperature controlled system of claim 1, wherein the at least one solid state heat pump comprises a distributed transport property thermoelectric device.

4. The temperature controlled system of claim 1, wherein the at least one solid state heat pump comprises a cascade of at least two solid state heat pumps in thermal series arrangement.

5. The temperature controlled system of claim 1, wherein the system comprises the at least one thermal energy storage system located within the at least one temperature controlled package, and wherein the at least one thermal energy storage system comprises a phase change material.

6. The temperature controlled system of claim 1, wherein the at least one insulated temperature controlled chamber comprises a first temperature controlled chamber and a second temperature controlled chamber, wherein the first and second temperature controlled chambers can be controlled to at least one of the following:
- different temperatures than one another;
- below and/or above ambient temperatures at different times than one another; or
- below and/or above ambient temperatures at the same time as one another.

7. The temperature controlled system of claim 1, comprising the at least one electronic control/energy management system to control the at least one solid state heat pump, wherein the at least one electronic control/energy management system is configured to record information about at least one of the following:
- temperature history of contents placed in the at least one insulated temperature controlled chamber;
- accessible retention of fault conditions experienced by the temperature controlled system;
- a location of the temperature controlled system; and
- transmission of at least some information that is collected by the temperature controlled system.

8. The temperature controlled system of claim 7, further comprising the at least one input/output feature to control the at least one solid state heat pump, wherein the at least one electronic control/energy management system is configured to at least one of the following via the at least one input/output feature:
- receive and/or respond to external signals;
- receive an input command that changes the temperature of the insulated temperature controlled chamber;
- transmit signals; or
- display information.

9. The temperature controlled system of claim 1, further comprising the at least one input/output feature to control the at least one solid state heat pump, that is configured to at least one of the following:
- read a barcode or other type of input for setting control information; or
- allow temperature control information input to be programmable.

10. The temperature controlled system of claim 1, wherein the temperature controlled system comprises the at least one thermal energy storage system located within the at least one temperature controlled package, and wherein the at least one thermal energy storage system is removable from the at least one temperature controlled package or is reusable.

11. The temperature controlled system of claim 1, wherein the at least one temperature controlled package is separable from one or more of:
- the at least one electrical energy storage system,
- the at least one electronic control/energy management system, and
- the at least one input/output feature.

12. The temperature controlled system of claim 1, wherein the at least one temperature controlled package comprises a plurality of packages, and wherein the system further comprises a distributed bank of storage compartments for storing and/or transporting respective packages of the plurality.

13. The temperature controlled system of claim 12, wherein at least some of the storage compartments of the distributed bank of storage compartments are configured to provide independent temperature control of the respective packages of the plurality stored and/or transported therein.

14. The temperature controlled system of claim 1 wherein the at least one temperature controlled package is disposable.

15. The temperature controlled system of claim 1, further comprising a delivery system comprising a distributed bank of storage compartments, wherein the at least one solid state heat pump, the at least one of the thermal energy storage system, the electrical power source, the electronic control/energy management system, and the input/output feature are part of the delivery system, and wherein the at least one temperature controlled package is separable from the distributed bank of storage compartments.

16. The temperature controlled system of claim 1, wherein the at least one temperature controlled package comprises at least one internal heat spreader located within the lid or the insulated body that, when the at least one heat transport element is inserted into the at least one temperature controlled package, is in thermal contact with the at least one heat transport element.

17. The temperature controlled system of claim 16, wherein the at least one internal heat spreader is located on or in thermal contact with an inner wall of the at least one insulated temperature control chamber.

18. The temperature controlled system of claim 1, wherein the at least one temperature controlled package comprises at least one internal thermal energy storage system located within the lid or the insulated body that, when the at least one heat transport element is inserted into the at least one temperature controlled package, is in thermal contact with the at least one heat transport element.

19. The temperature controlled system of claim 1, wherein the at least one solid state heat pump comprises a cascade of at least one of the following:

at least two solid state heat pumps in thermal series arrangement; or at least one solid state heat pump and at least one thermal storage system in thermal series arrangement.

20. The temperature controlled system of claim 1, wherein at least two openings or slots are defined through the insulated body or the lid, and at least two heat transport elements are in thermal communication with the at least one solid state heat pump and are insertable into the at least one temperature controlled package by being extended through the at least two openings or slots and through insulation of the insulated body or lid to thermally contact the inner region and thereby thermally couple the at least one insulated temperature controlled chamber to the at least one solid state heat pump.

21. The temperature controlled system of claim 1, wherein the at least one opening or slot is defined through the lid.

22. The temperature controlled system of claim 1, wherein the heat transport element is elongated.

* * * * *